US012624711B2

(12) United States Patent
Han

(10) Patent No.: US 12,624,711 B2
(45) Date of Patent: May 12, 2026

(54) METHOD AND APPARATUS FOR REDUCING POSITIVE PRESSURE OF ACTUATING CYLINDER OF UNIVERSAL HINGED SUPPORT

(71) Applicant: Fangyuan Han, Beijing (CN)

(72) Inventor: Fangyuan Han, Beijing (CN)

( * ) Notice: Subject to any disclaimer, the term of this patent is extended or adjusted under 35 U.S.C. 154(b) by 306 days.

(21) Appl. No.: 18/686,780

(22) PCT Filed: Aug. 24, 2021

(86) PCT No.: PCT/CN2021/114306
§ 371 (c)(1),
(2) Date: Aug. 16, 2024

(87) PCT Pub. No.: WO2023/023937
PCT Pub. Date: Mar. 2, 2023

(65) Prior Publication Data
US 2024/0376910 A1 Nov. 14, 2024

(51) Int. Cl.
*F15B 7/10* (2006.01)
*B66F 7/22* (2006.01)

(52) U.S. Cl.
CPC . *F15B 7/10* (2013.01); *B66F 7/22* (2013.01)

(58) Field of Classification Search
CPC ................. B66F 3/26; B66F 7/22; F15B 7/10
See application file for complete search history.

(56) References Cited

U.S. PATENT DOCUMENTS

| | | | | |
|---|---|---|---|---|
| 12,305,736 B2 * | 5/2025 | Nose | ...................... | H02K 1/278 |
| 12,330,722 B2 * | 6/2025 | Chung | ................... | B64U 10/70 |
| 2023/0167797 A1 * | 6/2023 | Vamvas | .................. | B63B 35/44 290/53 |
| 2026/0011262 A1 * | 1/2026 | O'Reilly | .................. | G09B 9/02 |
| 2026/0016386 A1 * | 1/2026 | Moore | ..................... | G01N 3/56 |

FOREIGN PATENT DOCUMENTS

| | | | | |
|---|---|---|---|---|
| CN | 103143940 A | 6/2013 | | |
| CN | 103440794 A | 12/2013 | | |
| CN | 104440921 A | 3/2015 | | |
| CN | 209637300 U | 11/2019 | | |
| CN | 118068683 A * | 5/2024 | ............. | G05B 11/42 |

(Continued)

*Primary Examiner* — Christopher P Ellis
(74) *Attorney, Agent, or Firm* — Maschoff Brennan

(57) ABSTRACT

A method and apparatus for reducing a positive pressure of an actuating cylinder of a universal hinged support. An application object is the actuating cylinder of the universal hinged support. The apparatus comprises a foundation, a base frame, a force application apparatus, a direction adaptation apparatus, a universal swing rod apparatus, and an integral external connection apparatus. The method comprises: step 1, determining main design parameters and the type of the force application apparatus; step 2, structural design of the apparatus: designing the structure of the apparatus after the main design parameters and the type of the force application apparatus are determined; and step 3, calculating, testing, and evaluating an actual gravity moment or positive pressure and an effect of weight compensation, determining whether to meet design requirements, and calculating or testing the evaluated gravity moment and a reduction ratio.

20 Claims, 32 Drawing Sheets

(56) References Cited

FOREIGN PATENT DOCUMENTS

| | | | | | |
|---|---|---|---|---|---|
| CN | 118998243 | A | * | 11/2024 | B05B 15/70 |
| CN | 120002610 | A | * | 5/2025 | B25J 13/088 |
| CN | 121062966 | A | * | 12/2025 | |
| CN | 121335781 | A | * | 1/2026 | |
| DE | 10 2010 051 480 | A1 | | 5/2012 | |
| JP | H09-178605 | A | | 7/1997 | |
| KR | 20230066086 | A | * | 5/2023 | B25J 9/1692 |
| WO | WO-2017132751 | A1 | * | 8/2017 | F16M 11/043 |
| WO | WO-2020007506 | A1 | * | 1/2020 | G09B 9/16 |
| WO | WO-2021133229 | A1 | * | 7/2021 | B25J 9/1638 |

* cited by examiner

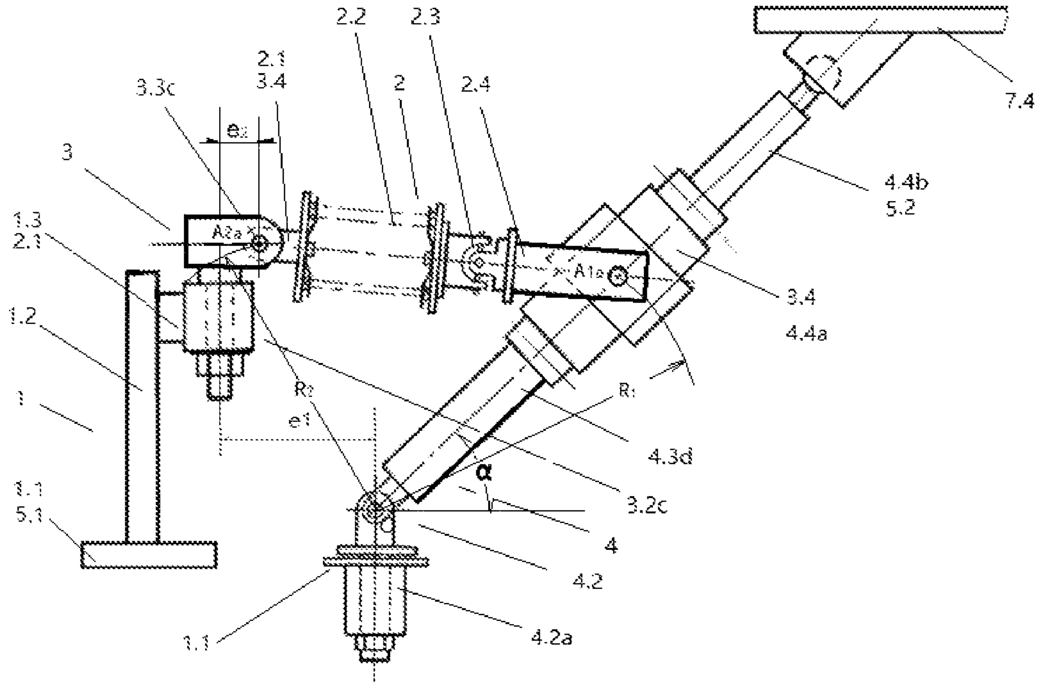
FIG. 1
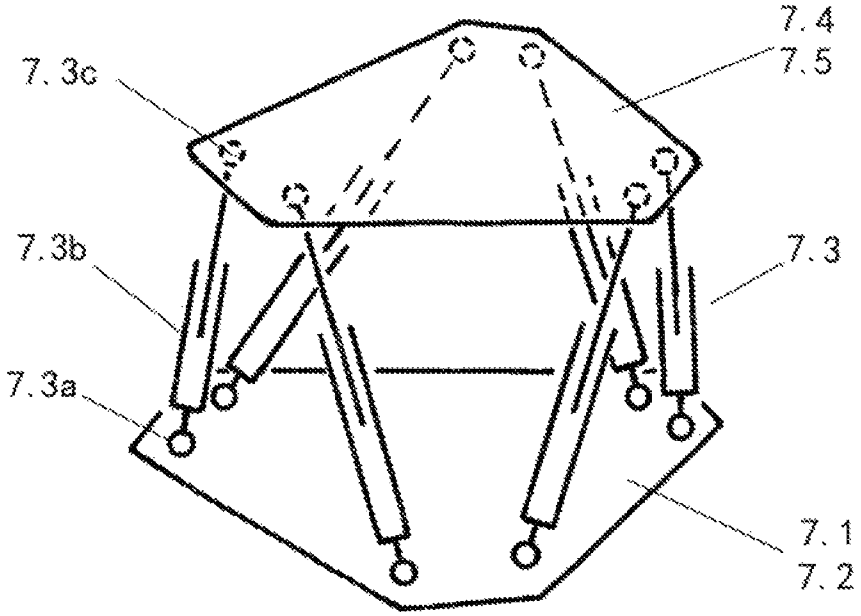
FIG. 1.1

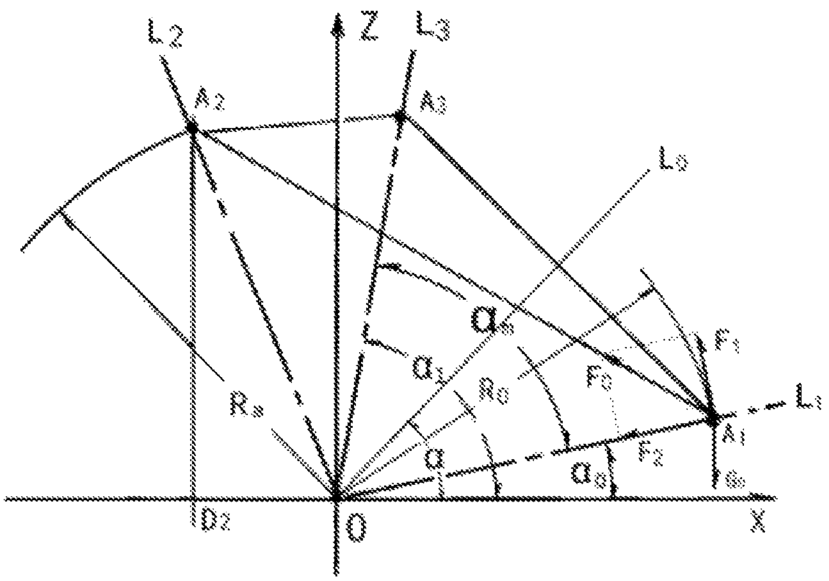
FIG. 1.2
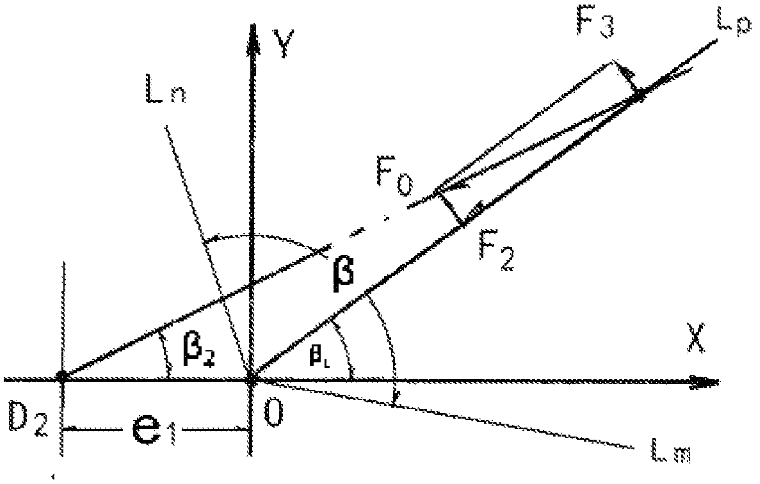
FIG. 1.3

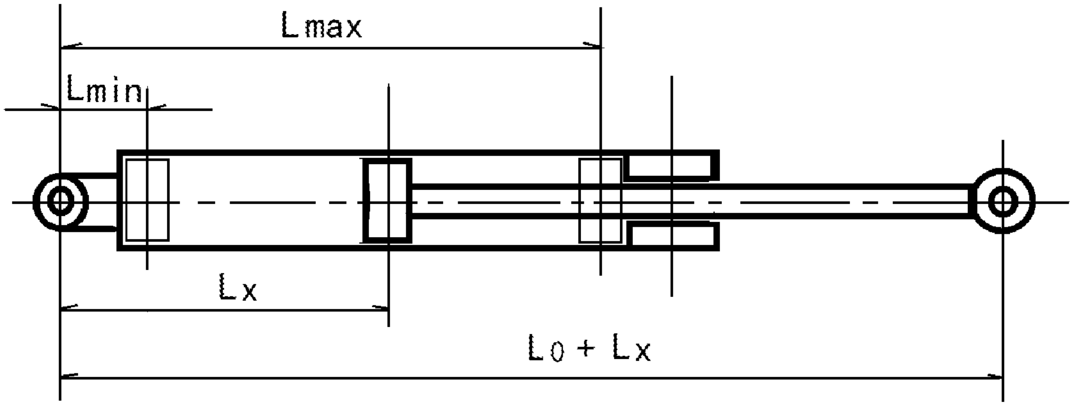
FIG. 1.4
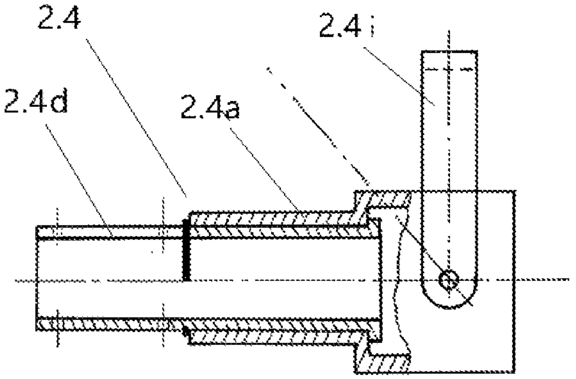
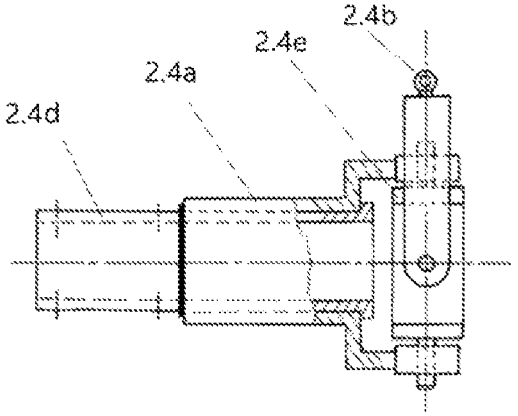
FIG. 1.5 FIG. 1.6

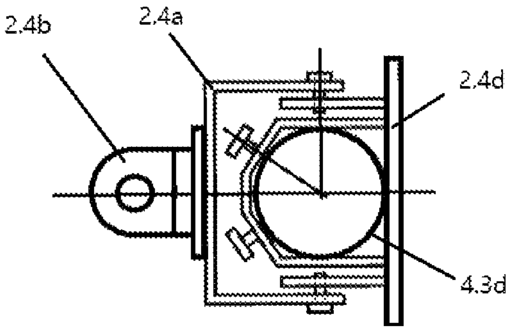
FIG. 1.7
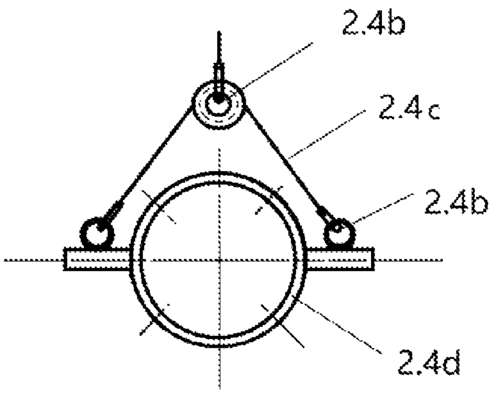
FIG. 1.8
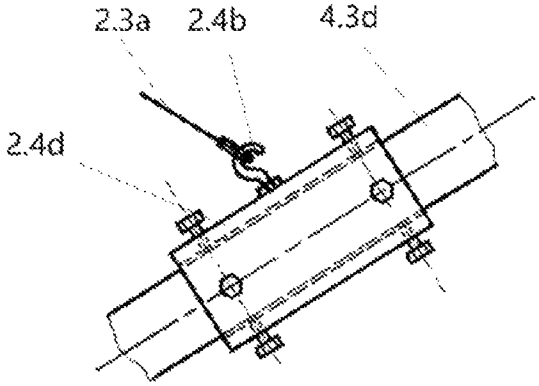
FIG. 1.9
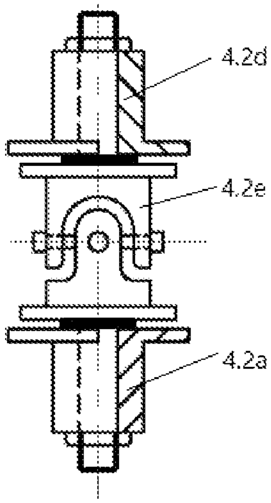
FIG. 1.10

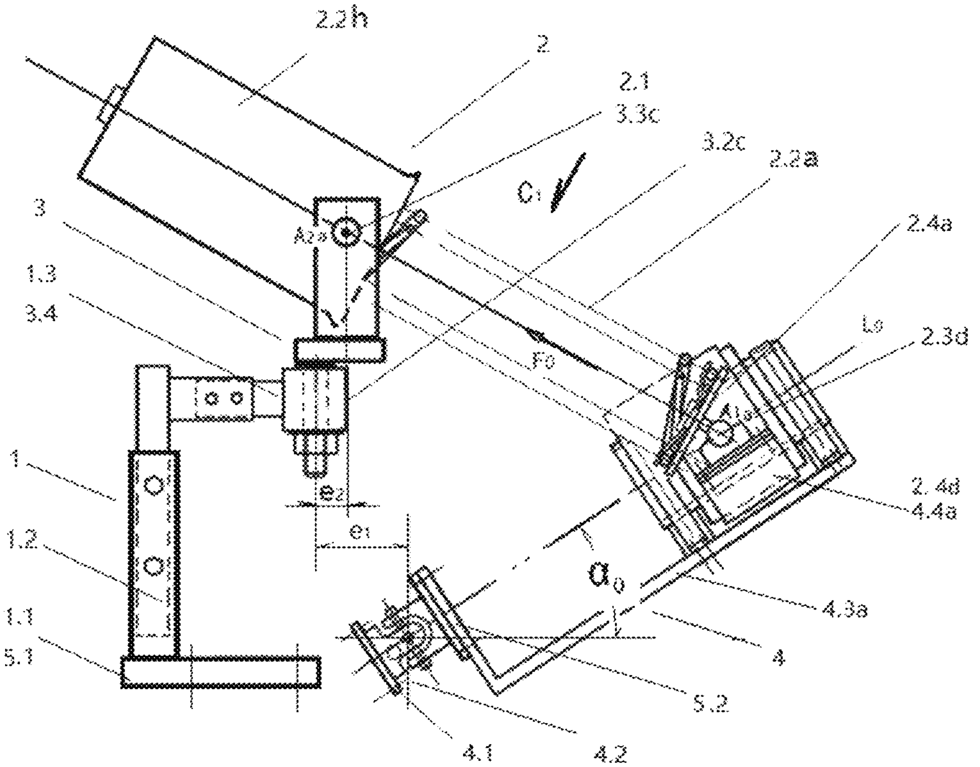
FIG. 2
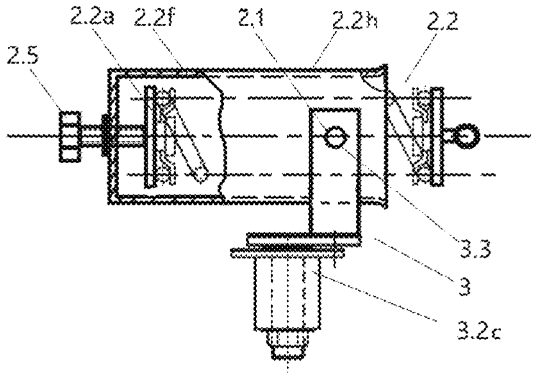
FIG. 2.1

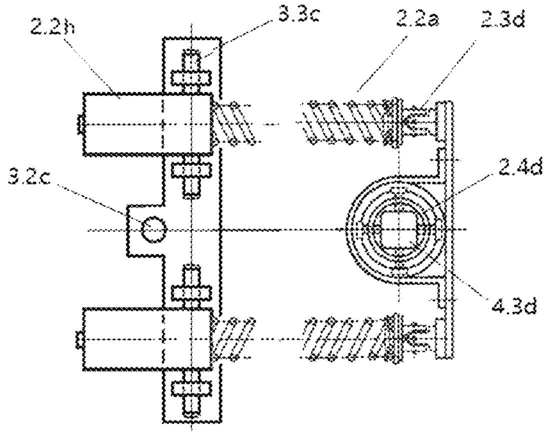
FIG. 2.2
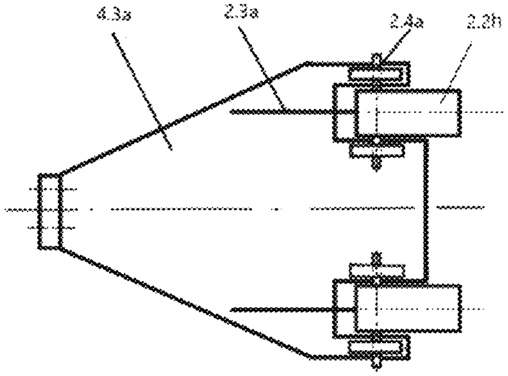
FIG. 2.3
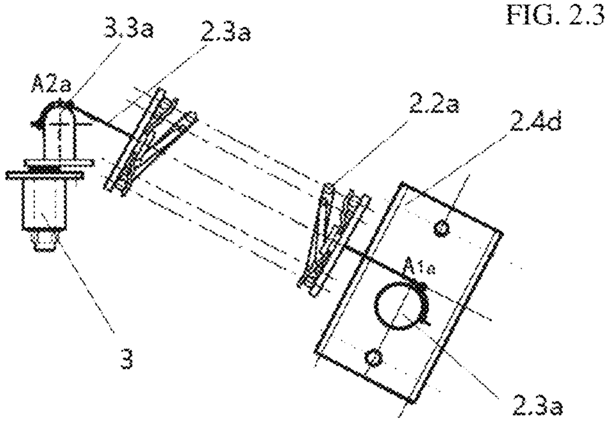
FIG. 2.4

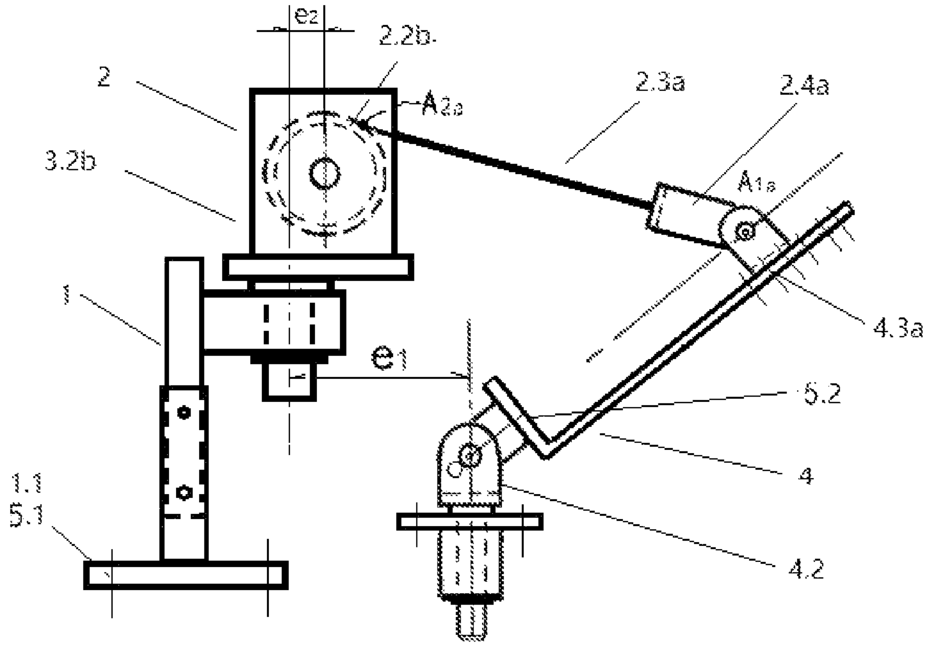
FIG. 3
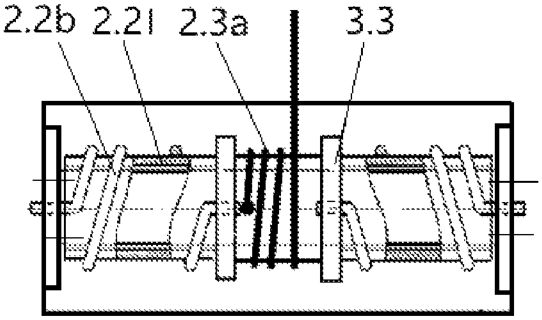
FIG. 3.1
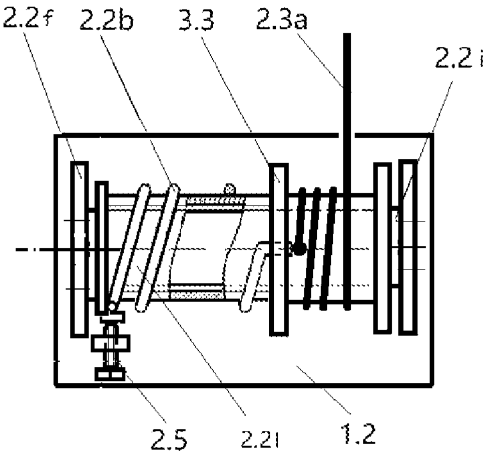
FIG. 3.2

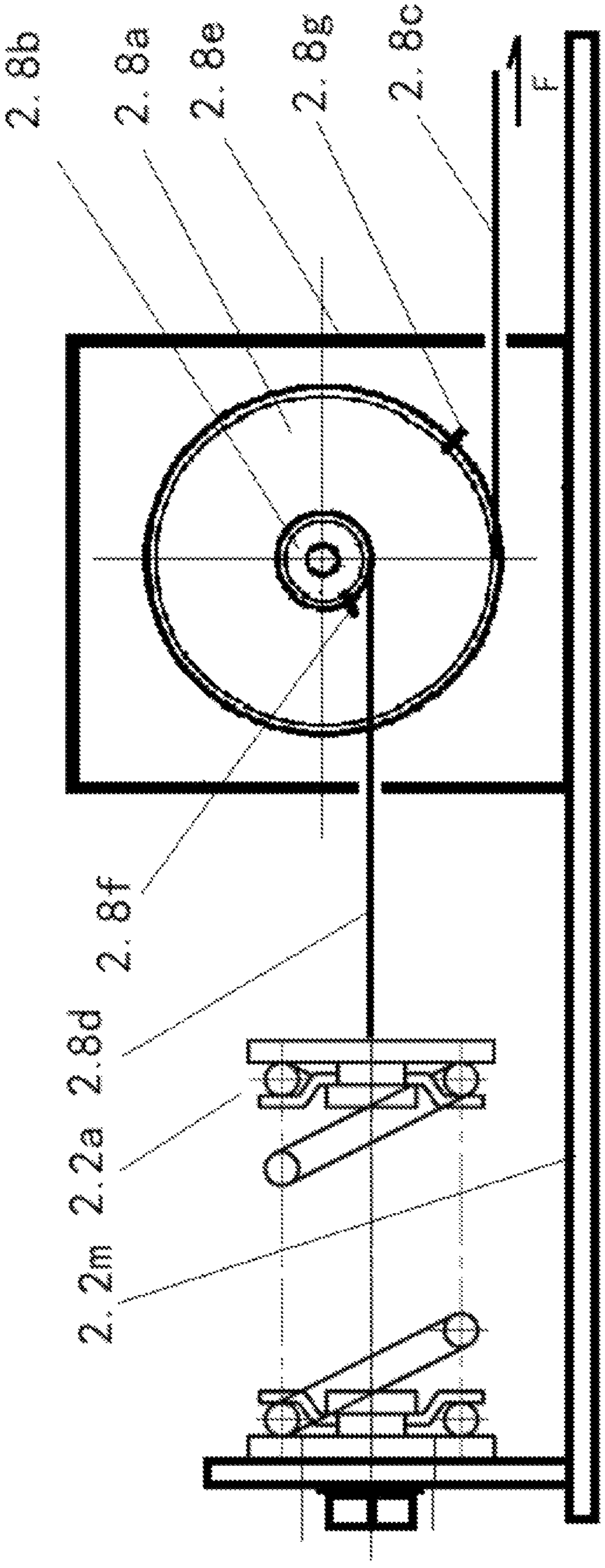
FIG. 6.1

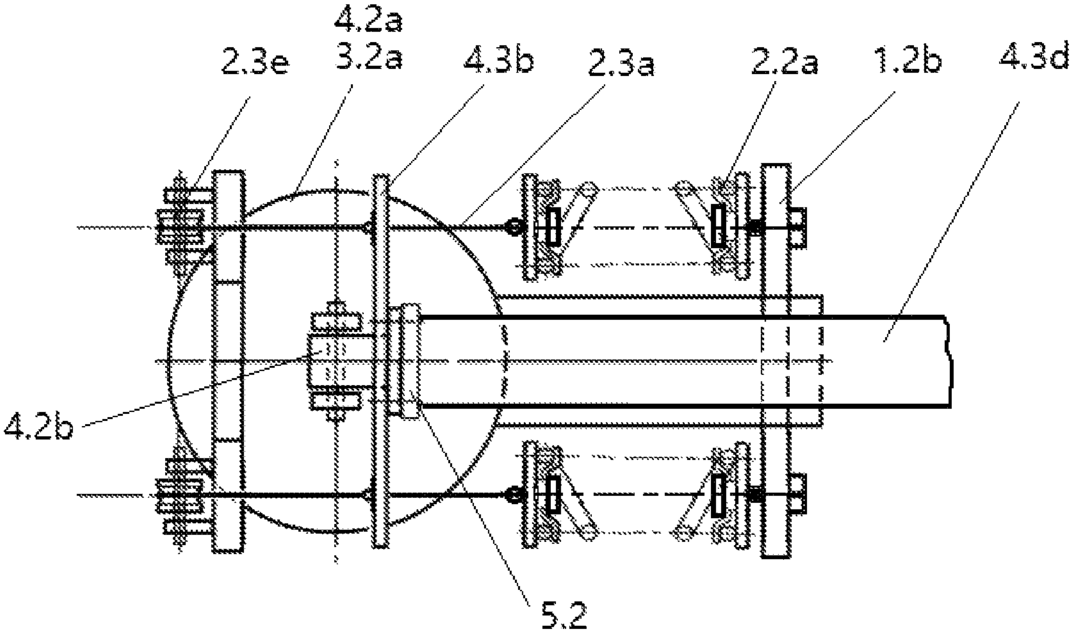
FIG. 9.1
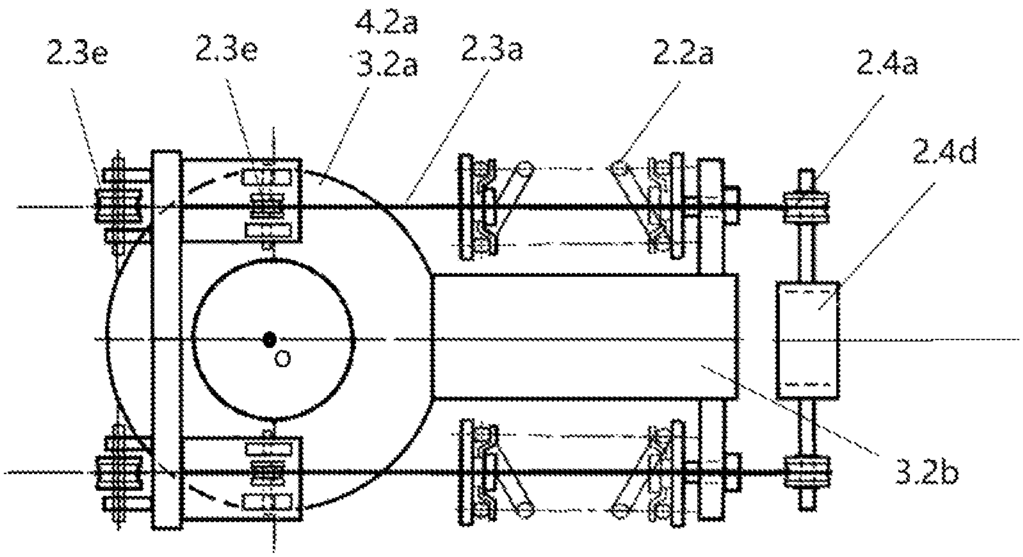
FIG. 9.2

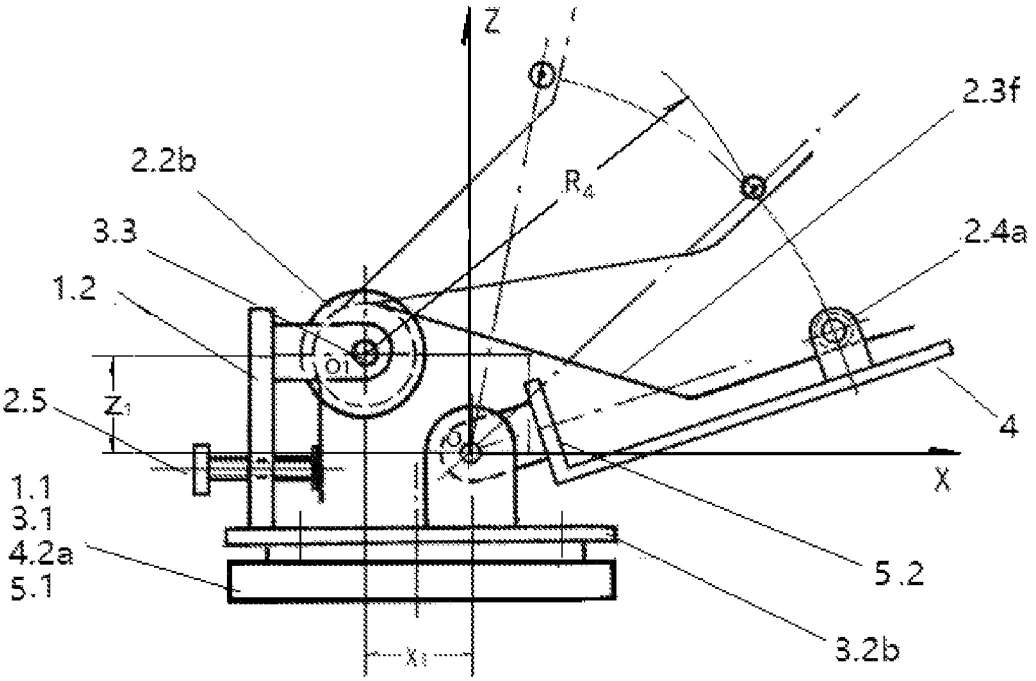
FIG. 10
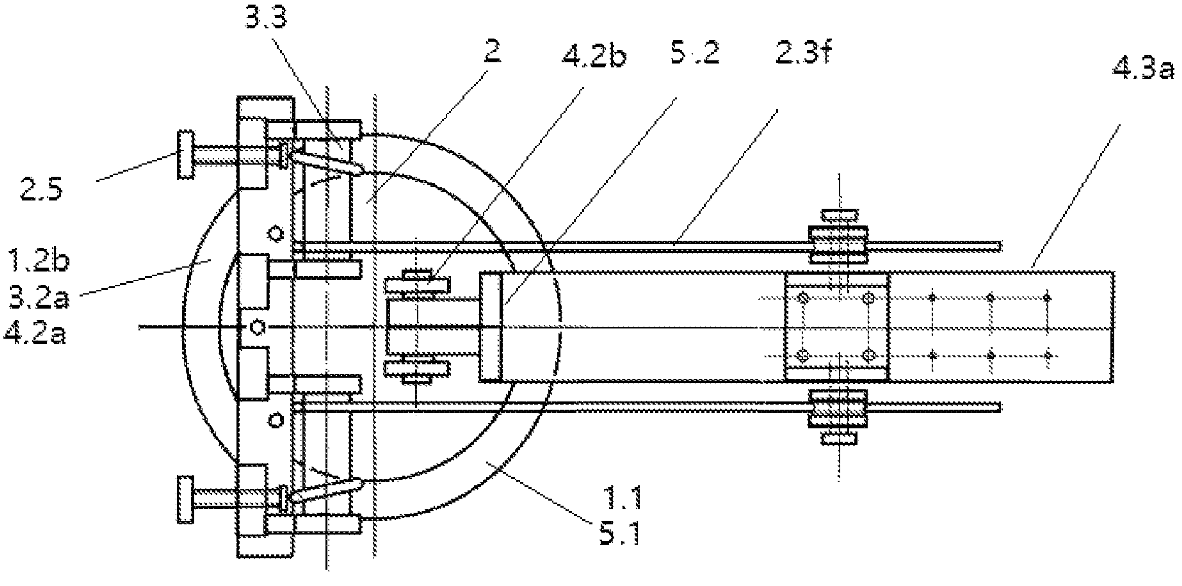
FIG. 10.1

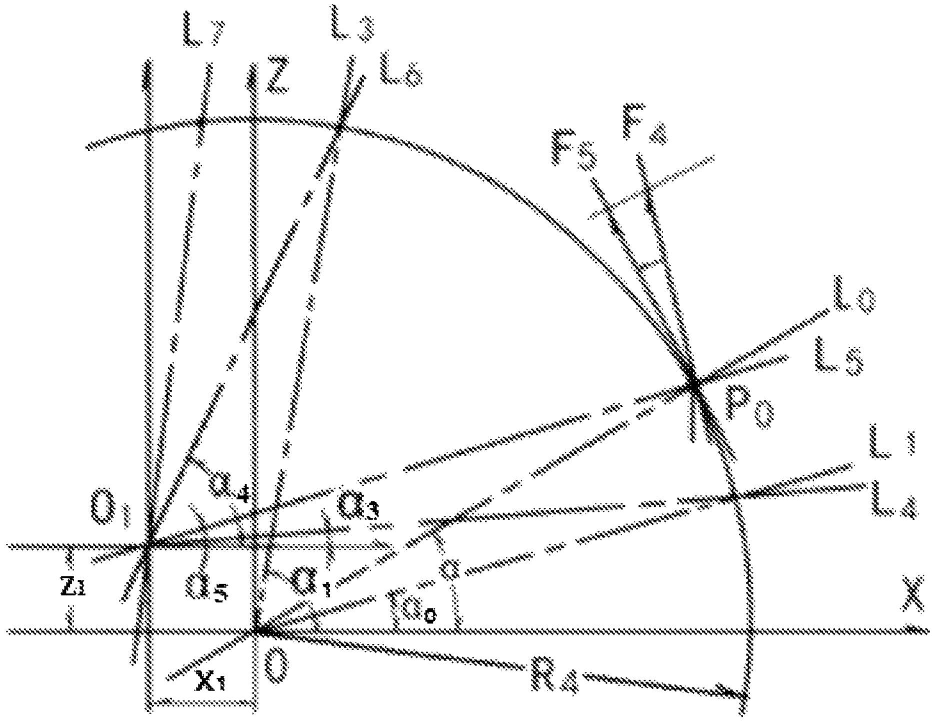
FIG. 10.2
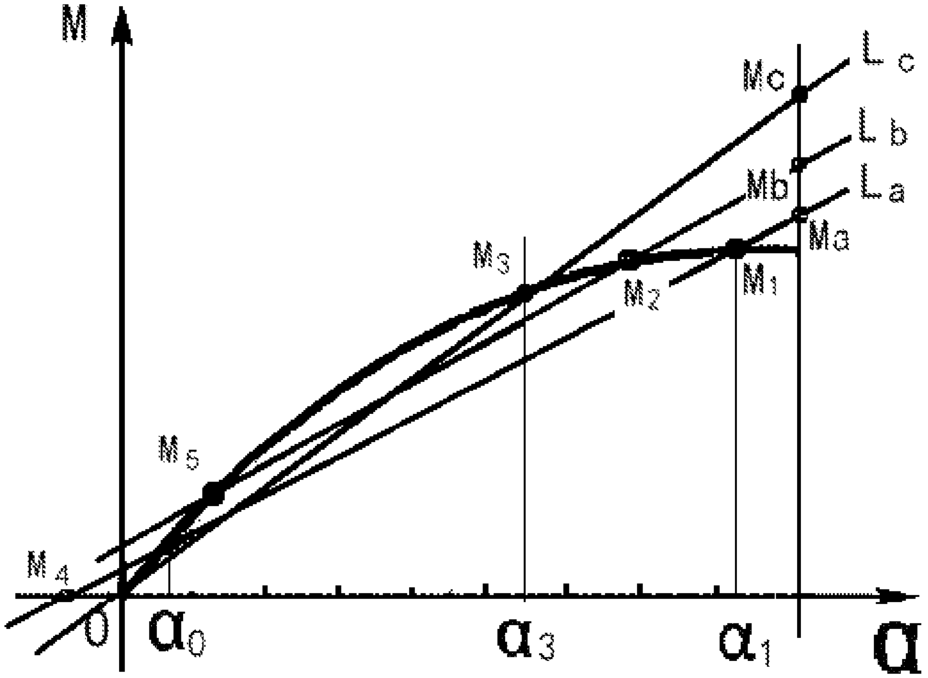
FIG. 10.3

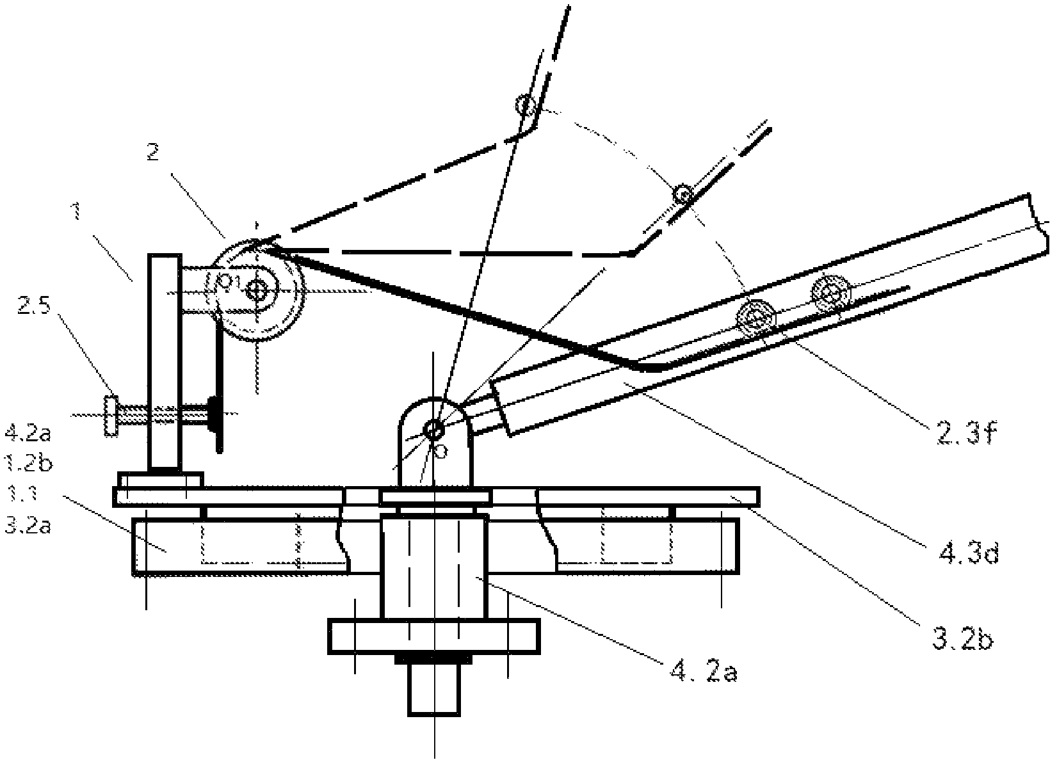
FIG. 10.4

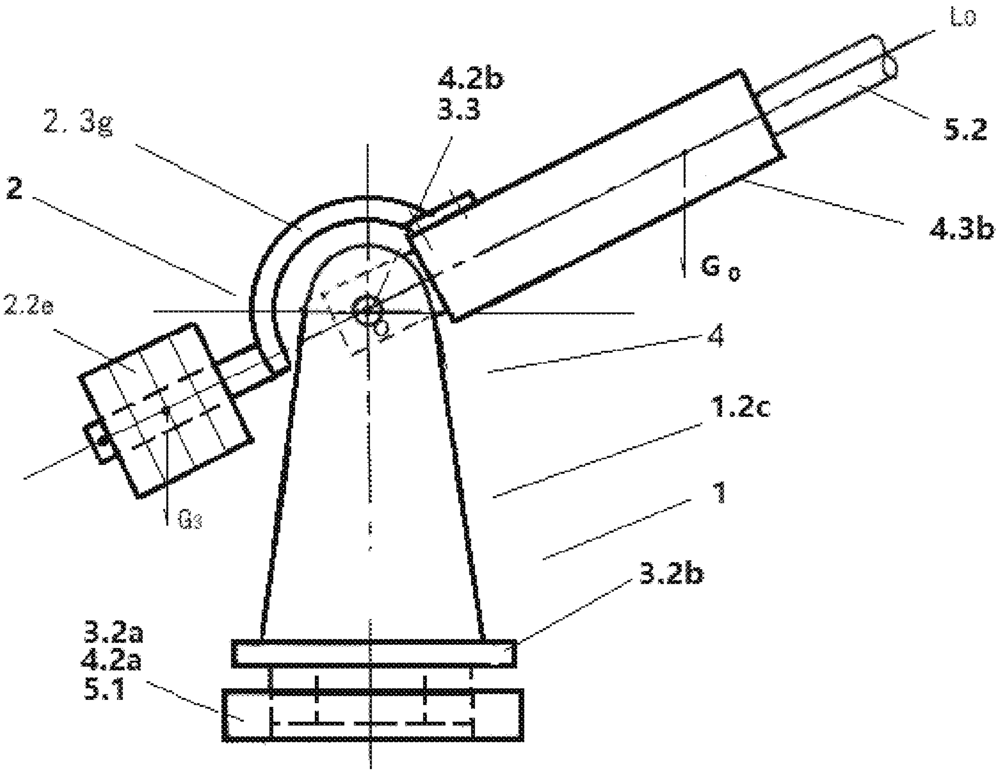
FIG. 11
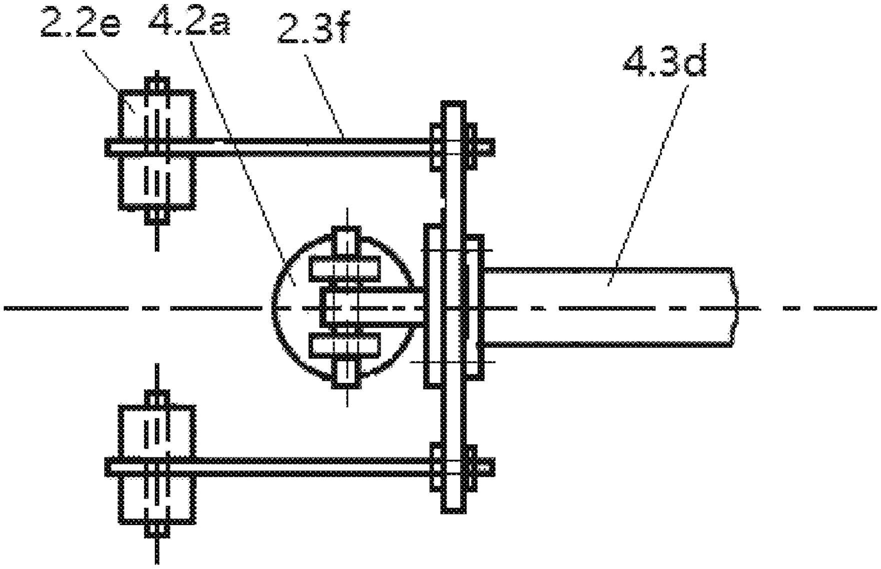
FIG. 11.1

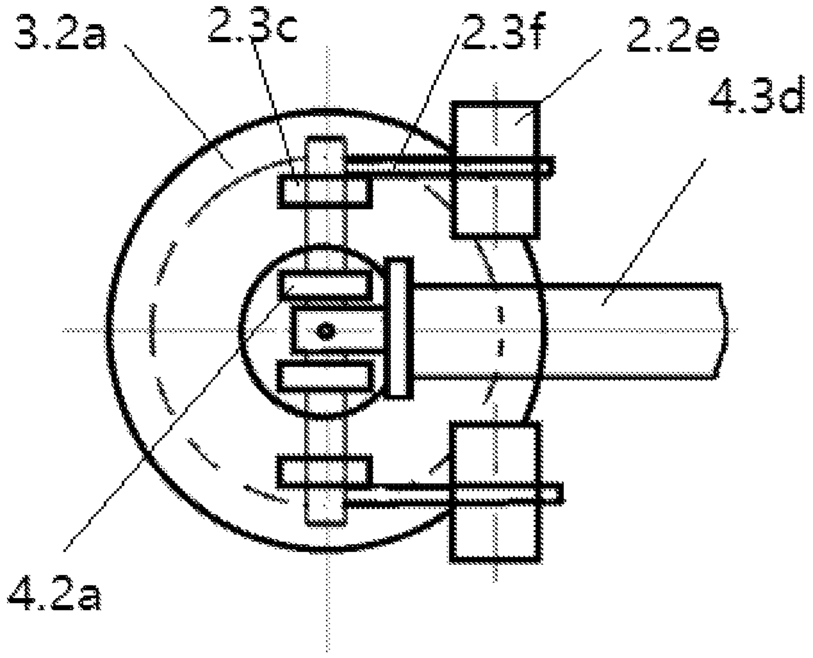
FIG. 12.1

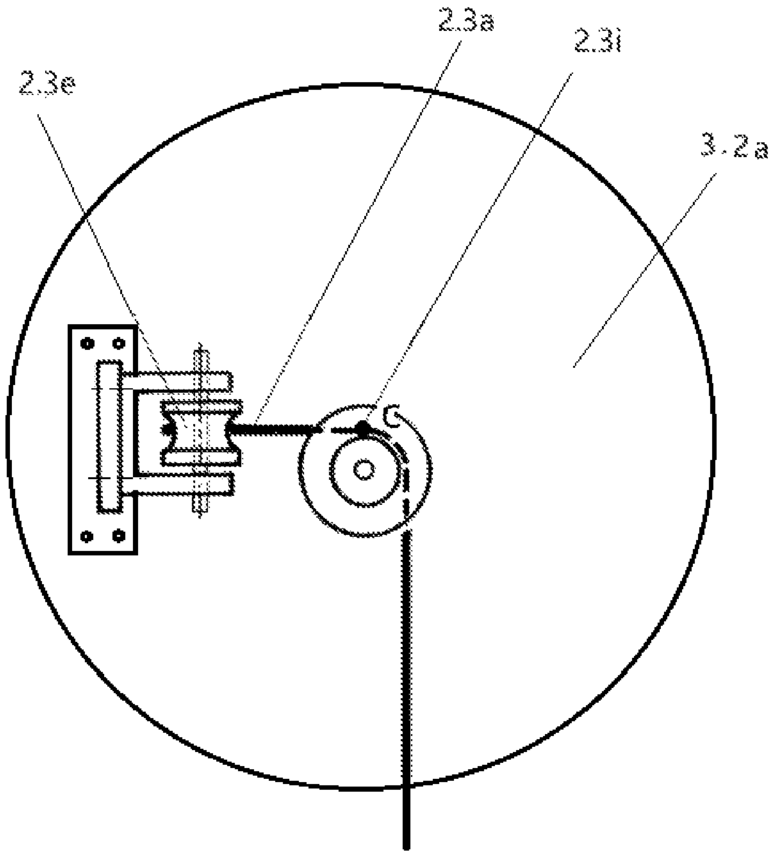
FIG. 13.1

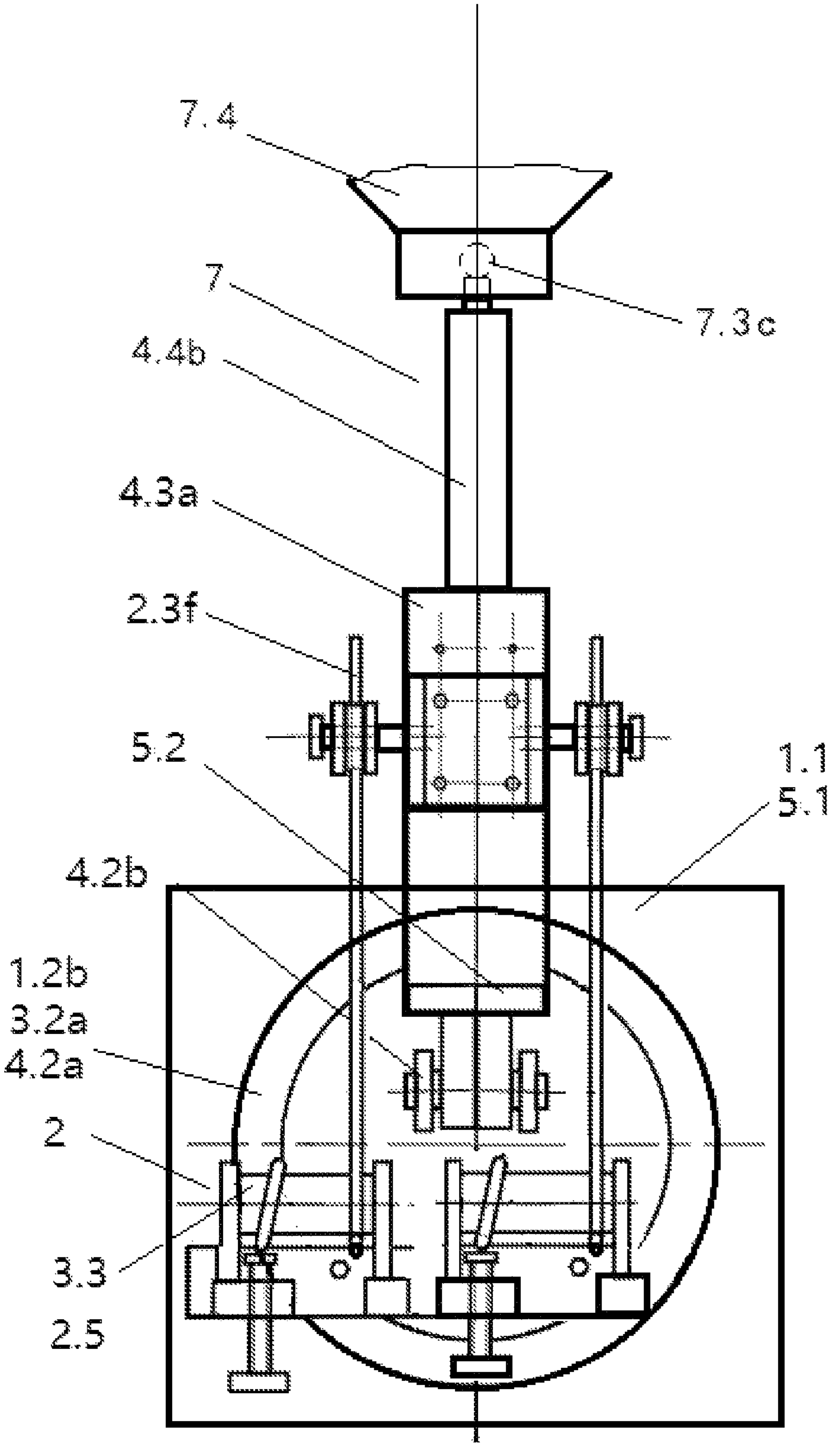
FIG. 20.1

METHOD AND APPARATUS FOR REDUCING POSITIVE PRESSURE OF ACTUATING CYLINDER OF UNIVERSAL HINGED SUPPORT

TECHNICAL FIELD

The present invention relates to the technical field of hinged support mechanisms, in particular to a method and device for reducing a positive pressure of an actuating cylinder of a universal hinged support.

BACKGROUND

Many mechanisms nowadays widely use a UPS (including UCS) type branch linkage. In this branch linkage, an active pair (a P pair or a C pair) is a hydraulic cylinder or an electric cylinder (hereinafter referred to as an actuating cylinder). For example, in a parallel mechanism (see FIG. 1.1), the UPS branch linkage swings in a space. The P pair of the UPS branch linkage swings in a two-dimensional space, that is, a working space of the branch linkage is an inclined cone.

For such a parallel mechanism system, there are two main problems to be solved. One is the problem of reducing a friction force of the actuating cylinder, and the other is a load problem caused by the weight of the actuating cylinder itself.

The problem of friction force requires that a friction force of a sliding pair should be small. At present, a US military aircraft adopts a simulator specification (MIL-S-87241), and a technical specification for a commercial flight simulator is also based on this standard. This specification stipulates that a friction force of an actuating cylinder of a motion system of a flight simulator should be less than a maximum payload of 0.3%.

The friction of the actuating cylinder mainly occurs in two parts, one is the friction between a cylinder barrel of the actuating cylinder and a piston, and the other is the friction between a cylinder head and a piston rod. According to a classical tribology theory, the friction is equal to a product of a friction coefficient and a positive pressure (hereinafter referred to as a lateral force). The lateral force refers to a sum of the two positive pressures (also known as the positive pressure), namely, the positive pressure between the cylinder barrel of the actuating cylinder and a diameter of the piston as well as the positive pressure between the cylinder head and a diameter of the piston rod. Reducing one of the two factors such as the friction coefficient and the positive pressure can reduce the friction force. In order to reduce the friction force, most of the methods currently used are to reduce the friction coefficient. There is relatively little research on an effect of the lateral force on the friction force.

In practical applications, there are two main solutions for pursuing the low friction coefficient, one is a static pressure support mode, and the other is a combined sealing mode. An extremely low friction coefficient can be obtained by using a hydrostatic bearing. However, a static pressure servo oil cylinder has a complex process, a high manufacturing cost, a limited ability to resist the lateral force (excessive lateral force may cause mechanical wear), a small output length, and a large power load. A friction pair is formed by adopting the combined sealing mode and using a low-friction material. However, such mode cannot withstand the lateral force, causes severe wear, and makes it difficult for the friction force to reach less than 1% of the total load. Therefore, it is far from meeting the smoothness requirements of the flight simulator. Although there are friction compensation, a super-lubricity technology, and so on, the problem still cannot be solved.

Data retrieval shows that there is no effective solution for reducing the friction force by reducing the lateral force. In an application environment of a parallel mechanism of the flight simulator, the lateral force is a very important factor affecting the friction force. There are many factors that affect the lateral force, including gravity, an axial force, machining and assembly errors, sealing or guidance, etc. These lateral forces will interact with each other, further increasing the lateral force.

Therefore, reducing the lateral force and the mutual influence between the lateral forces can effectively reduce the friction force caused by the lateral force.

Analysis shows that among the many factors that affect the lateral force, gravity is the main factor. There is the large lateral force generated by the gravity at the piston of a linear actuating cylinder and a guide sleeve of the cylinder head, and the lateral force is variable. The more the piston rod extends out, the greater the lateral force. When an axis of the actuating cylinder is horizontal and an extension of the piston rod reaches 70%, the lateral force will be greater than the weight of a linear actuator, and will sharply increase with the increase of the extension.

For example, a parallel mechanism motion system that drives several tons of weight requires the weight of a single electric cylinder to be hundreds of kilograms or more, which can generate the significant lateral force in the application environment. Especially when the relative output is large and when a tilt angle is small, the lateral force is much greater than its own weight.

The axial force may also form the lateral force. Due to eccentricity and deflection of the axis of the piston rod and the axis of the cylinder barrel, axial thrust will form a bending moment. The bending moment will increase the eccentricity, and increase of the bending moment will ultimately form a greater lateral force. The gravity also increases the lateral force.

Sealing and guiding also form the lateral force. Sealing requires an isotropic pressure distribution. However, the gravity and the axial force may disrupt this isotropy and disrupt a sealing condition. In order to meet the sealing condition, the initial design needs to have a greater sealing force, which indirectly increases the lateral force and the friction force.

Such a relatively large lateral force is also difficult to withstand for static pressure support, which not only requires significant power support, but sometimes even forms mechanical friction, thereby forming wear, increasing friction, and shortening a service life. Significant friction and severe wear will be formed for combined sealing. For a hydraulic drive actuating cylinder, the increase in lateral force may further seriously reduce the sealing effect. Therefore, the lateral force is a disadvantageous factor for both the static pressure support and the combined sealing support.

The load of the motion platform is divided into two major parts: one is a structural part of the motion platform and a load part on the platform, which is the main load of the motion platform, and the other is a part below the motion platform, namely, a self weight of the hydraulic cylinder or an electric cylinder.

When the motion platform moves, the actuating cylinder also moves in a following mode, and its center of gravity also rises and falls. When the motion platform rises, the system needs to drive the center of gravity of the electric cylinder to rise, so the actuating cylinder is also the load of the motion system. For example, an electric motion platform with a load of 4 tons requires six actuating cylinders weighing approximately 300 kilograms, with a total weight of 1800 kilograms approximately. The weight of the actuating cylinder itself accounts for a large proportion of the total weight of the platform. The current method used for solving the load problem of the self weight of the platform is pneumatic compensation. Pneumatic compensation requires a gas driving system, with multiple cylinders supporting a larger platform and a complex structure. The current pneumatic compensation mode solves the weight compensation of the entire platform. Pneumatic compensation usually accounts for about half of the total weight of the platform.

In summary, an existing actuating cylinder applied by spatial tilting and swinging has the problems that:

1. due to the influence of the gravity, there is a relatively large lateral force (positive pressure) between the piston and the cylinder barrel, as well as between the cylinder head and the piston rod, which affects the performance of the actuating cylinder, including the friction force and/or the expansion and contraction quantity.

2. The weight of the actuating cylinder is a load of the motion platform, which increases the power burden of the system.

SUMMARY OF THE INVENTION

An objective of the present invention is to provide a method and device for reducing a positive pressure of an actuating cylinder of a universal hinged support, so as to alleviate the technical problem that the actuating cylinder has a relatively large lateral force and thus affects performance and increases the power burden of a system.

The above objective of the present invention can be achieved by adopting the following technical solutions:

the present invention provides a method for reducing a positive pressure of an actuating cylinder of a universal hinged support, the method is applied to the actuating cylinder of the universal hinged support, and a device used in the method includes: a base frame, a force application apparatus, a direction adaptation apparatus, a universal swing rod apparatus, and an integral external connection apparatus.

The method includes:

step 1, determining main design parameters and a type of the force application apparatus, including:

A, determining the main design parameters, wherein the main design parameters include an amount of reducing a maximum positive pressure of the actuating cylinder, a maximum gravitational moment and a ratio of gravitational moment to be eliminated therefrom, a maximum anti-gravitational moment, and an amount of weight compensation;

B, determining the type and structural form of the force application apparatus:

determining the type of the force application apparatus including: determining a force application mode used for providing an anti-gravitational moment, wherein the force application mode includes: a tension spring, a torsion spring, a gravity counterweight, a gravity pendulum, an air spring, or an electromagnetic force, and one of the force application modes or a combination of two or more modes can be selected;

determining the structural form, wherein the structural form includes an open loop structure, a closed loop structure, a semi-open loop structure, a semi-closed loop structure, or a hybrid structure, and one of the structural forms can be selected;

the above steps A and B can be performed with no particular orders or be performed simultaneously;

step 2, performing structural design for the device: designing a structure of the device after determining the main design parameters and the type of the force application apparatus, including: structure designing, manufacturing, assembling, and debugging; wherein the structure designing includes designing of the base frame, designing of the force application apparatus, designing of the direction adaptation apparatus, and designing of the integral external connection apparatus; and step 3, calculating, testing and evaluating an actual gravitational moment or positive pressure and an effect of weight compensation, determining whether design requirements are met, calculating or testing the evaluated gravitational moment and a reduction ratio thereof, calculating or testing the evaluated weight compensation effect, and stopping, in a case of meeting the design requirements, and taking the obtained solution as a design result; and in a case of not meeting the requirements, adjusting the parameters, repeating the above processes, and redesigning until it meets the design requirements.

The present invention provides a device for reducing a positive pressure of an actuating cylinder of a universal hinged support, configured to perform the above method for reducing the positive pressure of the actuating cylinder of the universal hinged support, and the device includes: a base frame, a force application apparatus, a direction adaptation apparatus, and an integral external connection apparatus;

the base frame includes an external connection unit IA, a main frame, and an external connection unit IB, the force application apparatus includes a force generation apparatus, a force transmission apparatus, an external connection unit IIA, and an external connection unit IIB, wherein a force generated by the force generation apparatus includes gravity, a metal spring force, an air spring force, or an electromagnetic force;

the direction adaptation apparatus includes two revolute joints that are not coaxial and not parallel, an external connection unit IIIA, and an external connection unit IIIB, the two revolute joints are fixedly coupled together to achieve rotation with two degrees of freedom; and the integral external connection apparatus includes an external connection unit VA and an external connection unit VB.

The present invention has the characteristics and advantages that:

advantage 1: the lateral force (positive pressure) formed by gravity is partially or completely eliminated, and friction force is reduced.

When applied to a hydraulic cylinder with static pressure support, not only lateral load and a friction force are reduced, but also static pressure oil supply energy consumption is reduced, a probability of mechanical friction and wear is reduced, and a service life is prolonged.

When applied to combined sealing support, the positive pressure between a cylinder barrel and a piston rod can be significantly reduced (the positive pressure caused by gravity is reduced or almost eliminated, and at the same time, its associated positive pressure is eliminated), thereby greatly reducing the friction force, reducing the wear, and prolonging the service life. Therefore, a lateral force reduction apparatus provides a possibility of providing a high-performance flight simulator for application of an ordinary combined sealing mode.

Advantage 2: all (sometimes greater than all) or most of the weight of the actuating cylinder is balanced. Gravity load caused by the weight of an electric cylinder itself is reduced or eliminated, which is equivalent to balancing a part of weight of the platform. A load capacity is provided, and the burden of pneumatic compensation is reduced, or in some cases, pneumatic compensation can be canceled.

Advantage 3: by reducing or eliminating the lateral force formed by the gravity, the following effects are also achieved: 1, an eccentricity ratio of an axis of the actuating cylinder is decreased, and the lateral force formed by axial thrust is reduced; 2, by improving symmetry of the force around the piston, a sealing pressure can be appropriately reduced, which can further reduce the friction force; and 3, if there are auxiliary measures such as friction compensation, the difficulty of friction compensation can be reduced or an effect of friction compensation can be improved.

BRIEF DESCRIPTION OF THE DRAWINGS

The following accompanying drawings are only intended to give schematic illustrations and explanations of the present invention, but are not intended to limit a scope of the present invention, in which:

FIG. 1-FIG. 1.10 are schematic structural diagrams of Embodiment 1.

FIG. 2-FIG. 2.4 are schematic structural diagrams of Embodiment 2.

FIG. 3-FIG. 3.2 are schematic structural diagrams of Embodiment 3.

FIG. 10-FIG. 10.4 are schematic structural diagrams of Embodiment 10.

FIG. 11-FIG. 11.1 are schematic structural diagrams of Embodiment 11.

DETAILED DESCRIPTION

In order to have a clearer understanding of the technical features, objectives, and effects of the present invention, the specific implementations of the present invention are now illustrated with reference to the accompanying drawings. In the description of the present invention, unless otherwise noted, the meaning of "a plurality of" is two or more.

A method, apparatus, and system for effectively reducing or eliminating lateral force generated by gravity on a UPS branch linkage of an inclined universal hinged support are provided, and meanwhile, a method, apparatus, and system for reducing partial weight load of a motion system are provided. Alternatively, a method and device for reducing the partial weight load of the motion system is provided separately.

The UPS branch linkage described in the specification includes, but is not limited to the following branches: UPU, SPR, UPR, UCU, UCR, UCU, UCS, SPS, SCS, (RUR)CS, (UR)CS, SCS, (RR)CS, (RRR)CS, URCS, URPU, U(RHR)U, etc. The sliding pair is one of P, C, and H. A parallel mechanism is a parallel mechanism with 2-6 degrees of freedom.

FIG. 1 is a schematic structural diagram of Embodiment 1, FIG. 1.1 is a structural diagram of a 6-UPS parallel mechanism with six degrees of freedom, FIG. 1.2 is a force analysis diagram (in a vertical plane passing through an axis of an actuating cylinder) of an anti-gravitational moment of Embodiment 1, FIG. 1.3 is a force analysis diagram of an anti-gravitational moment of Embodiment 1 (a projection on a horizontal plane), FIG. 1.4 is a structural diagram of an actuating cylinder, FIG. 1.5 to FIG. 1.9 are diagrams of several connection modes between a force application apparatus and the actuating cylinder (or a connection rod), and FIG. 1.10 is a diagram of a symmetrical spherical hinge with four orthogonal axes.

FIG. 2 is a schematic structural diagram of Embodiment 2, FIG. 2.1 is a structural diagram of a cylinder spring, FIG. 2.2 is a partial view of a force application apparatus in FIG. 2 (direction C1), FIG. 2.3 is a structure of a connection rod in FIG. 2, and FIG. 2.4 is a schematic diagram of a flexible connection mode of a force application apparatus (a combination of the force application apparatus and a direction adaptation apparatus).

FIG. 3 is a schematic structural diagram of Embodiment 3 (a closed loop, having no pallet, a cable and a torsion spring generating a pulling force, and the cable being not subjected to reversing), and FIG. 3.1 and FIG. 3.2 are two force generation apparatuses of a force application apparatus in Embodiment 3, which is also used in Embodiment 5.

Figure 4:
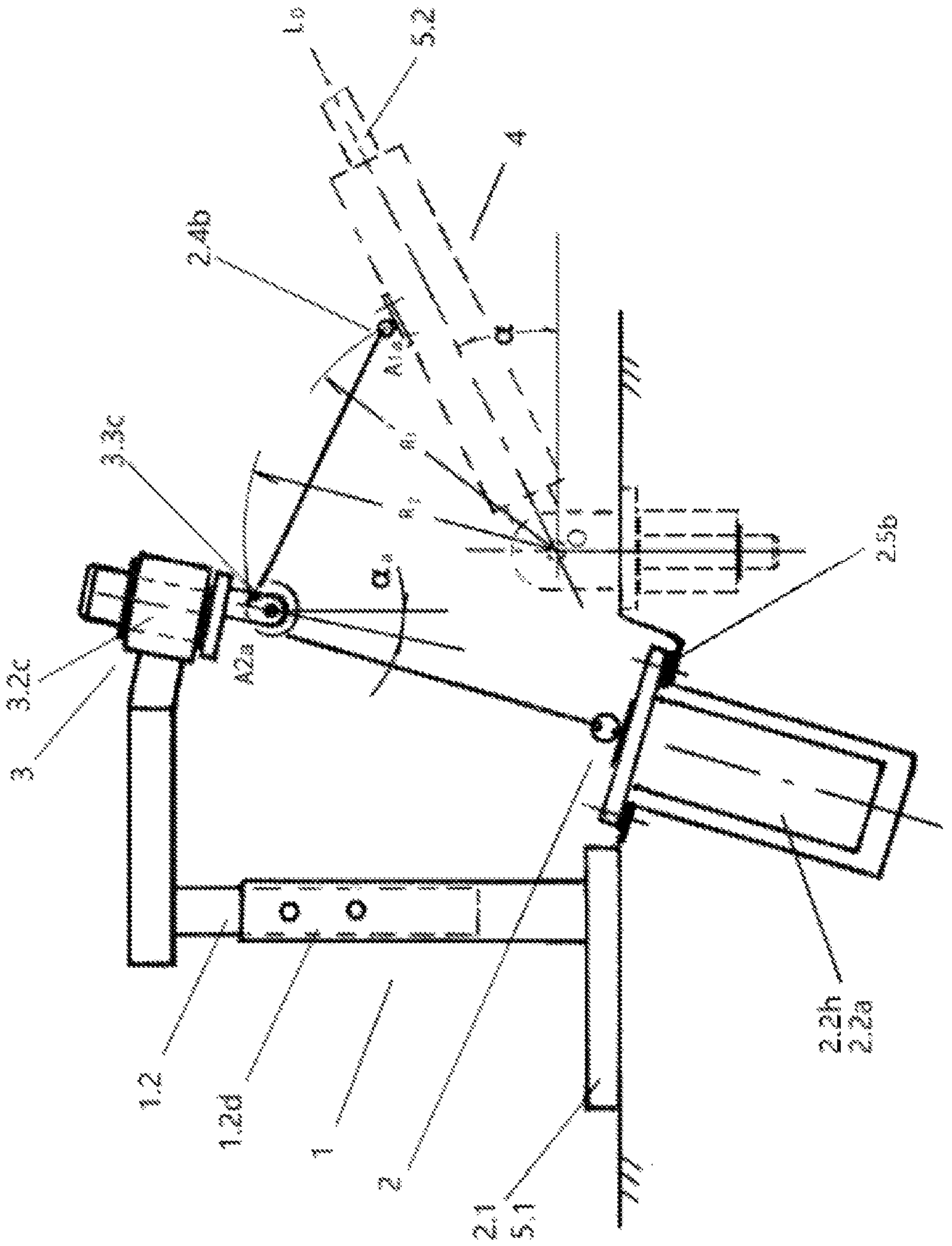
FIG. 4 is a schematic structural diagram of Embodiment 4.
Figure 5:
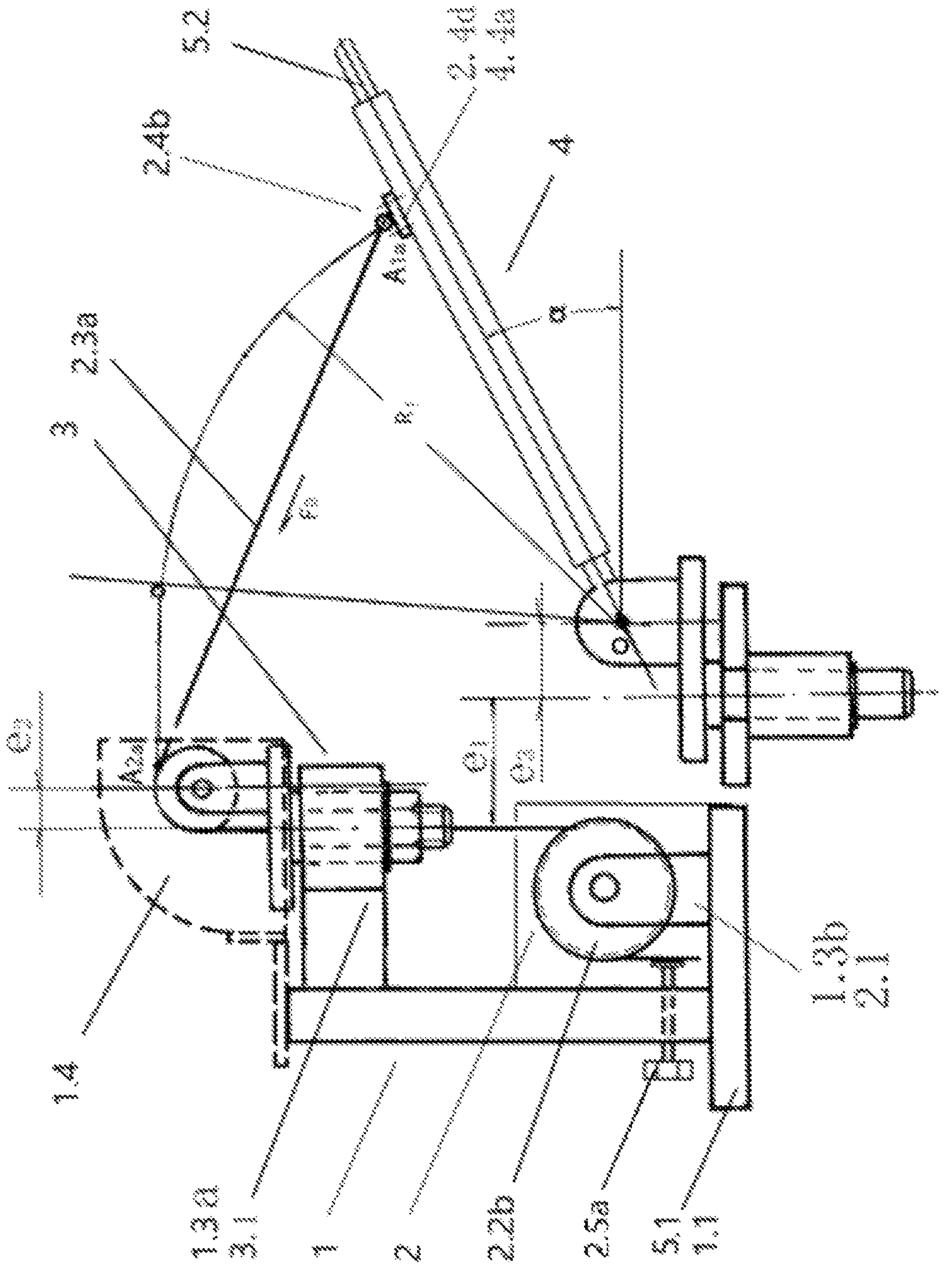
FIG. 5 is a schematic structural diagram of Embodiment 5.

FIG. 4 is a schematic structural diagram of Embodiment 4 (a closed loop, having no pallet, a tension spring, and a cable being subjected to reversing for a first time). FIG. 5 is a schematic structural diagram of Embodiment 5 (a closed loop, having no pallet, a torsion spring providing a pulling force, and a cable being subjected to reversing for a first time).

Figure 6:
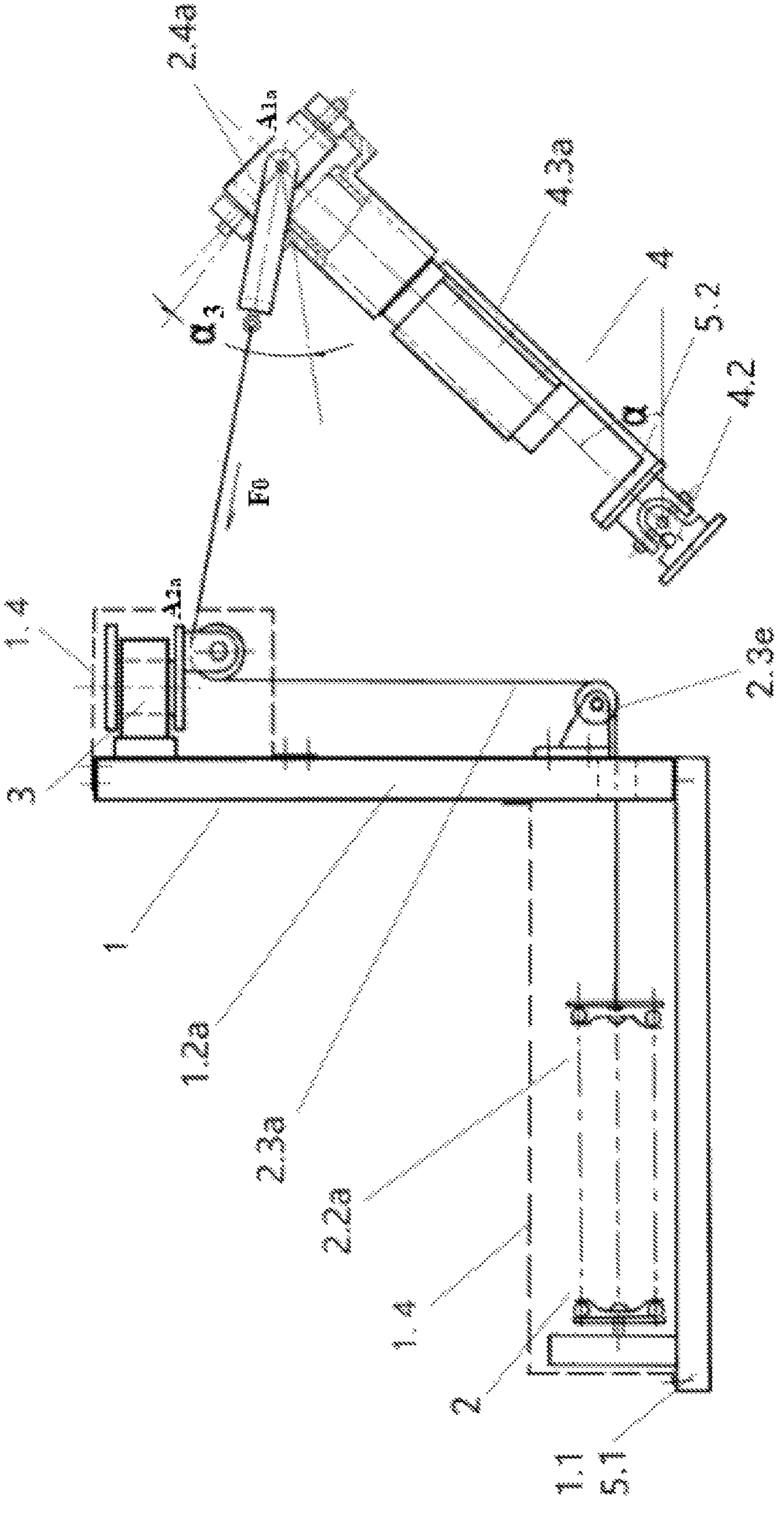
FIG. 6-FIG. 6.1 are schematic structural diagrams of Embodiment 6.

FIG. 6 is a schematic structural diagram of Embodiment 6 (a closed loop, having no pallet, a tension spring, and a cable being subjected to reversing for a second time). FIG. 6.1 is an improved diagram of Embodiment 6.

Figure 7:
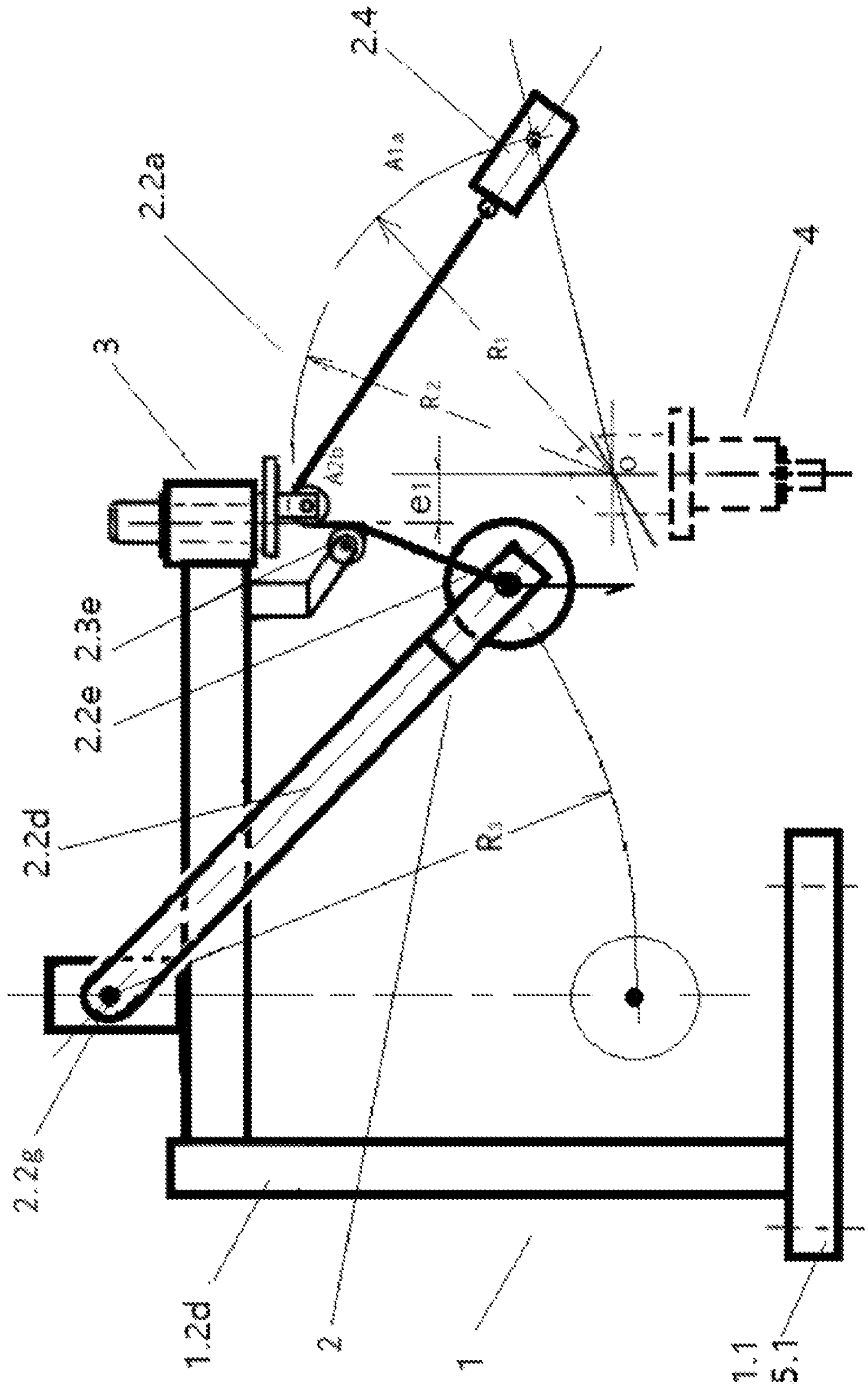
FIG. 7 is a schematic structural diagram of Embodiment 7.
Figure 8:
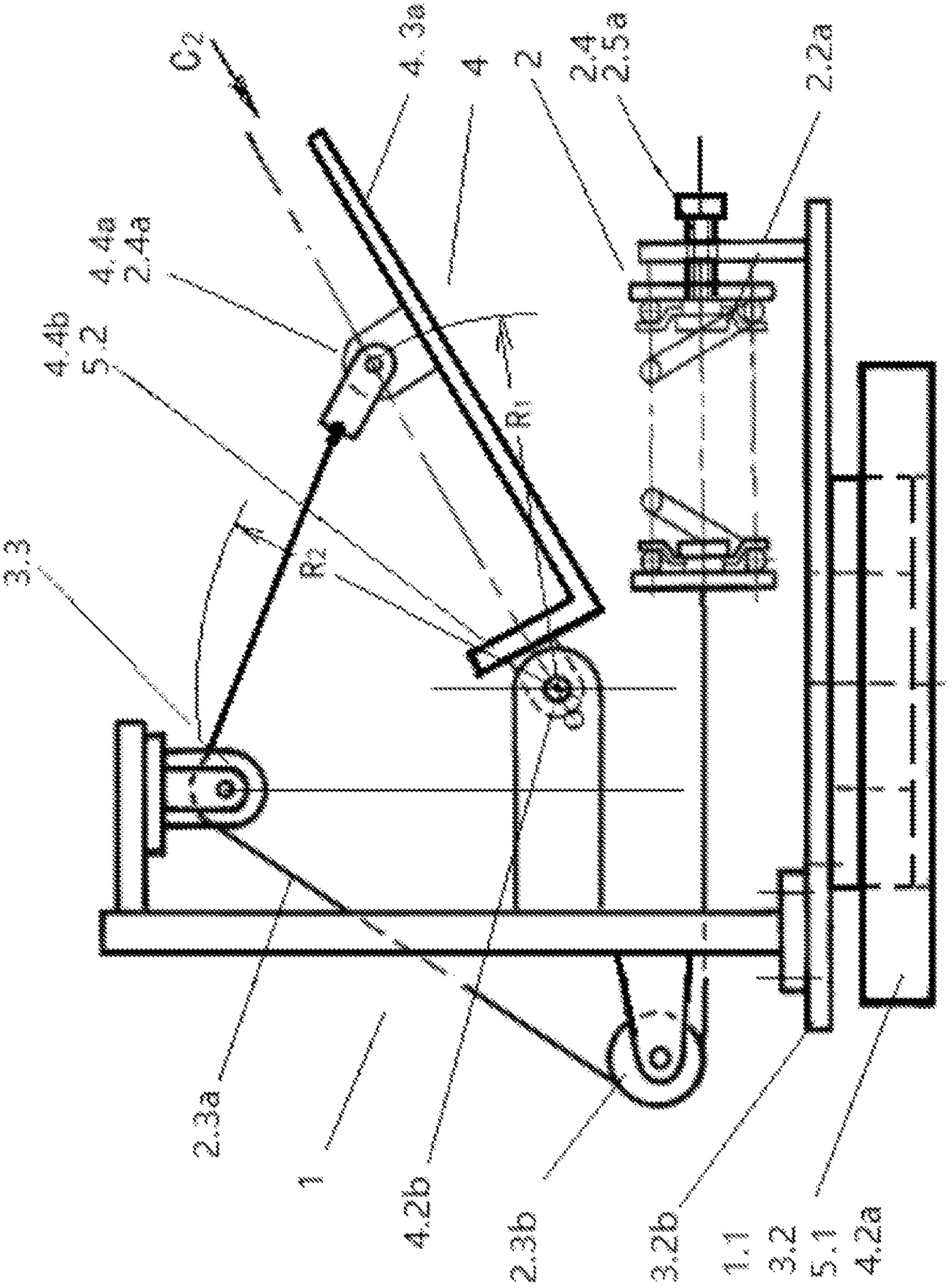
FIG. 8 is a schematic structural diagram of Embodiment 8.

FIG. 7 is a schematic structural diagram of Embodiment 7 (a closed loop, having no pallet, a gravity pendulum and a cable generating a pulling force, and the cable being subjected to reversing for a second time). FIG. 8 is a schematic structural diagram of Embodiment 8 (a closed loop, having a pallet, a tension spring, and a cable being subjected to reversing for a second time).

Figure 9:
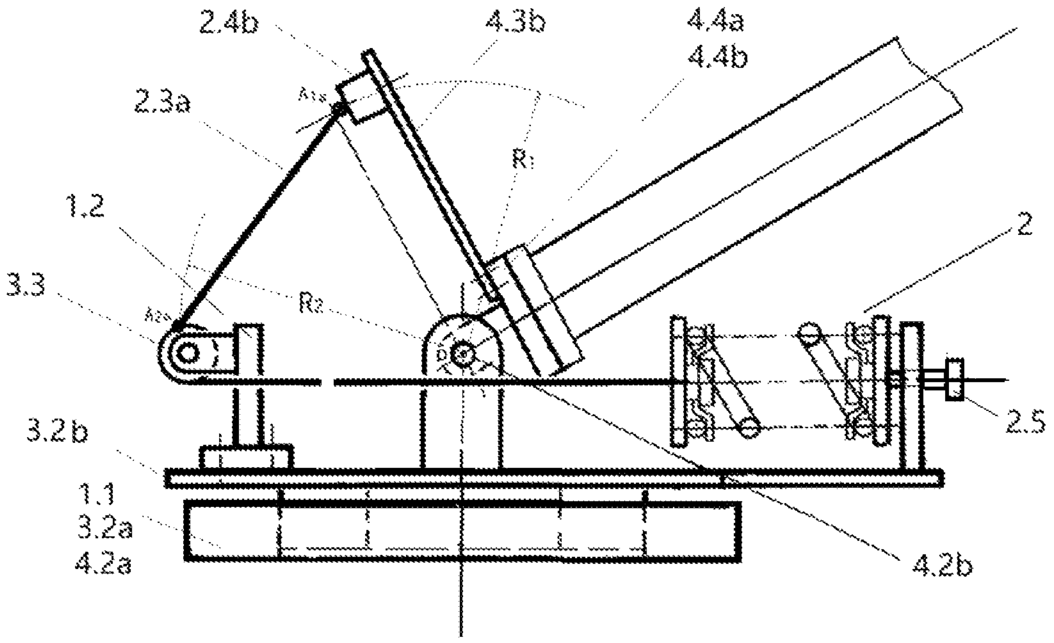
FIG. 9-FIG. 9.2 are schematic structural diagrams of Embodiment 9.

FIG. 9 is a schematic structural diagram of Embodiment 9 (a closed loop, having a pallet, a tension spring, a vertical rod being connected with a cable, and the cable being subjected to reversing for a first time), FIG. 9.1 is a top view thereof, with springs arranged on two sides of an actuating cylinder, and FIG. 9.2 is an improvement of Embodiment 9 (a small closed loop being changed into a large closed loop).

FIG. 10 is a schematic structural diagram of Embodiment 10 (a small closed loop, having a pallet, and a torsion spring generating torque), FIG. 10.1 is a top view of FIG. 10, FIG. 10.2 is a diagram of an installation position and force analysis of a torsion spring, FIG. 10.3 is a schematic diagram of stiffness selection of a torsion spring, and FIG. 10.4 is an improvement of Embodiment 10, which is an embodiment of a large closed loop.

FIG. 11 is a schematic structural diagram of Embodiment 11 (having a pallet, and a direct counterweight solution), and FIG. 11 is a side view thereof. FIG. 11.1 is a top view of Embodiment 11.

Figure 12:
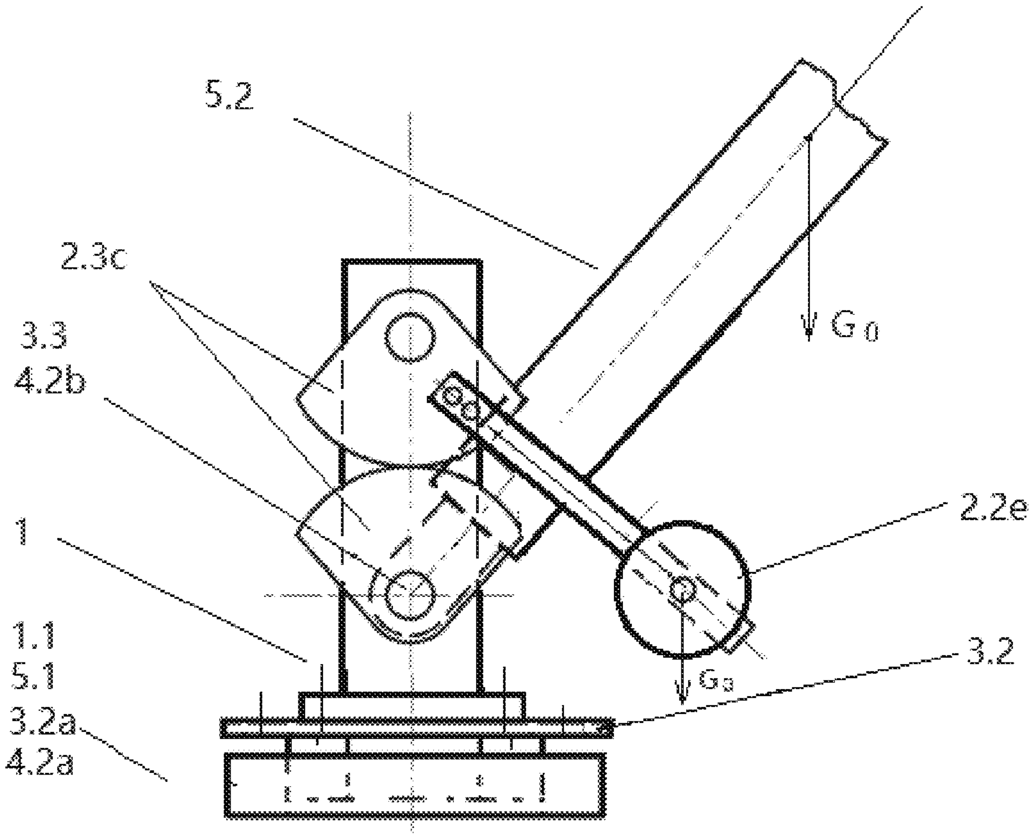
FIG. 12-FIG. 12.1 are schematic structural diagrams of Embodiment 12.

FIG. 12 is a schematic structural diagram of Embodiment 12 (having a pallet, indirect counterweight on two sides (gear reversing)), and FIG. 12.1 is a top view thereof.

Figure 13:
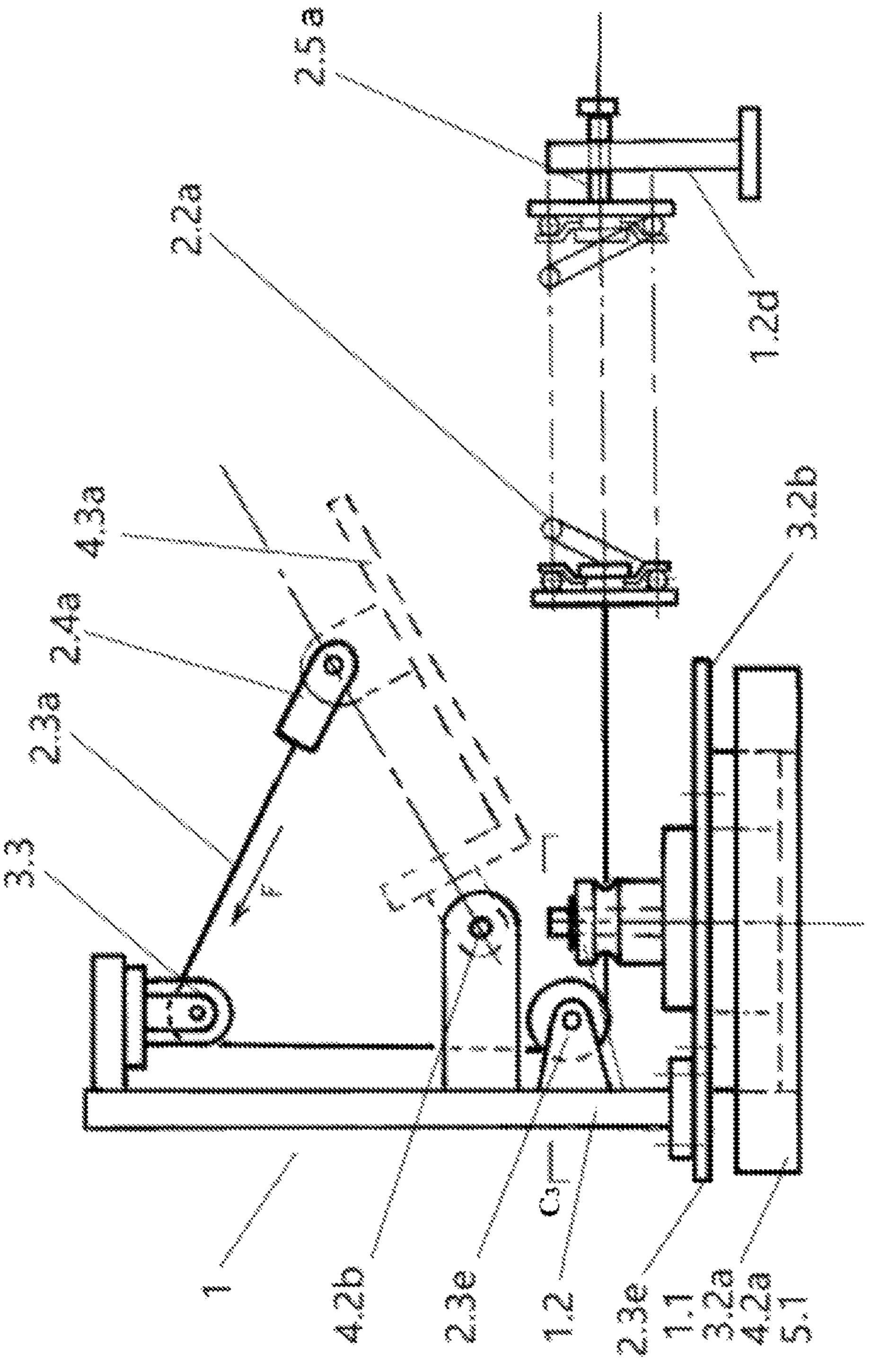
FIG. 13-FIG. 13.1 are schematic structural diagrams of Embodiment 13.

FIG. 13 is a schematic structural diagram of Embodiment 13 (a small closed loop, a pallet, a cable spring being subjected to reversing for a third time, the spring being installed on the ground, and a mixed solution), and FIG. 13.1 is a partial view of a structure of third reversing.

Figure 14:
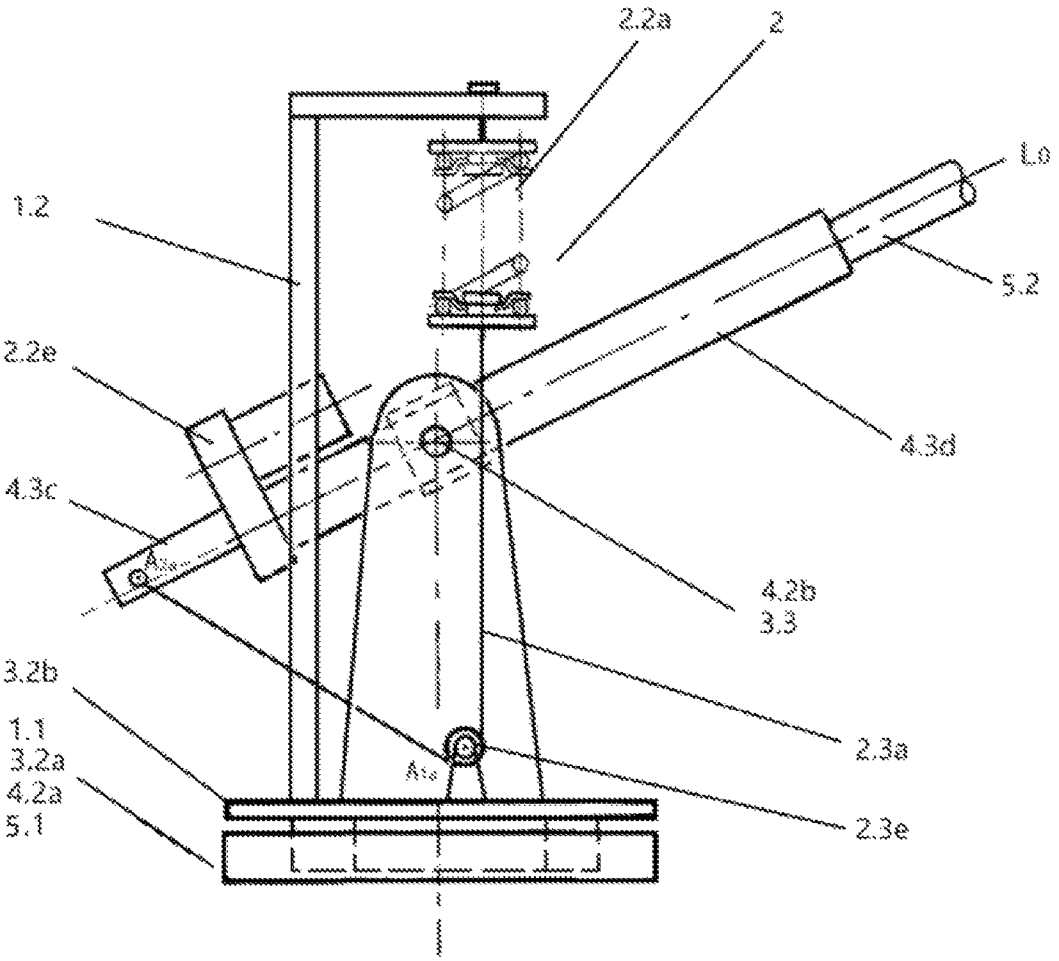
FIG. 14-FIG. 14.1 are schematic structural diagrams of Embodiment 14.
Figure 15:
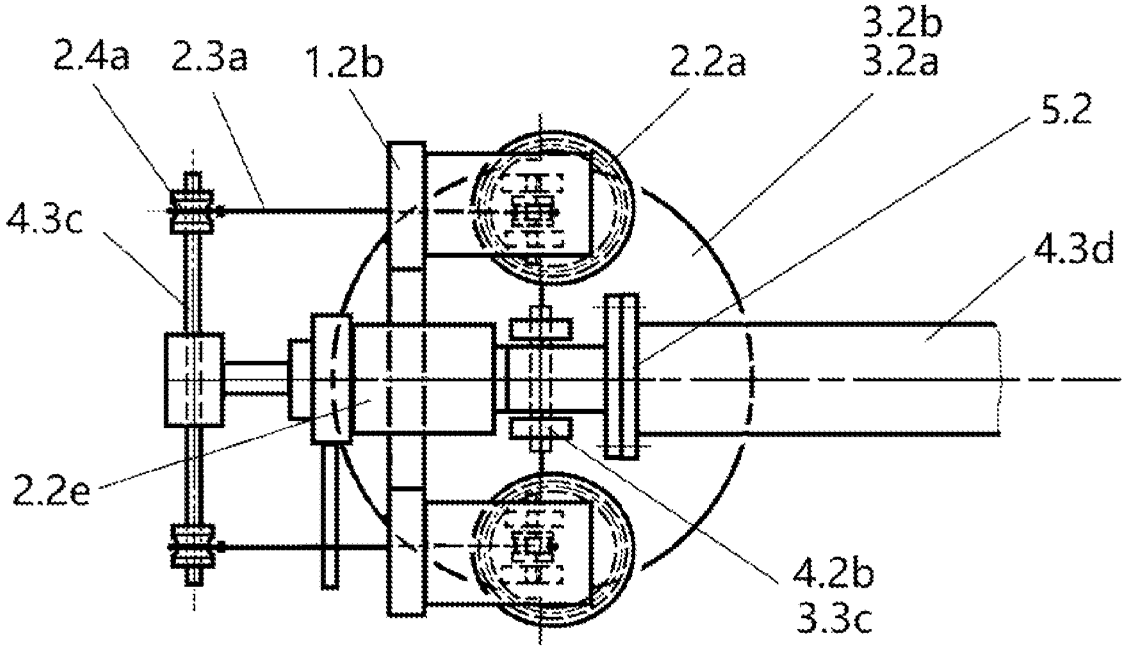
FIG. 15 is a schematic structural diagram of Embodiment 15.
Figure 15:
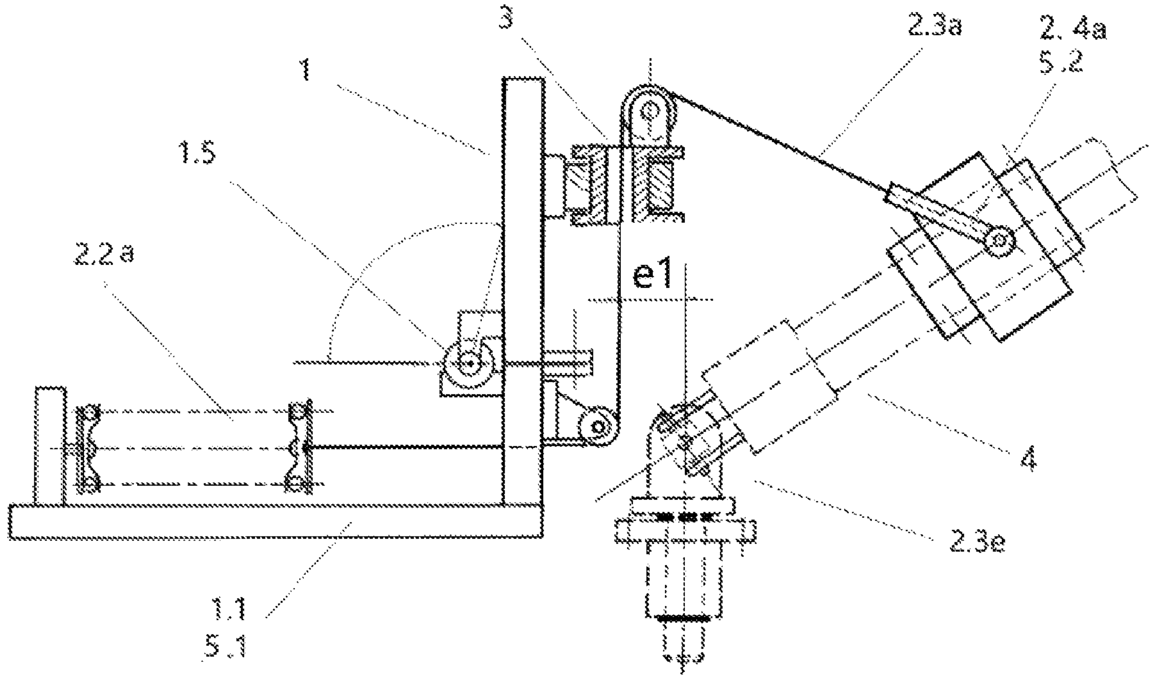

FIG. 14 is a schematic structural diagram of Embodiment 14 (having a pallet, a gravity counterweight+tension spring), and FIG. 14.1 is a top view thereof. FIG. 15 is a schematic structural diagram of Embodiment 15 (an open loop, a tension spring, a foldable base frame, and a hollow direction adaptation apparatus).

Figure 16:
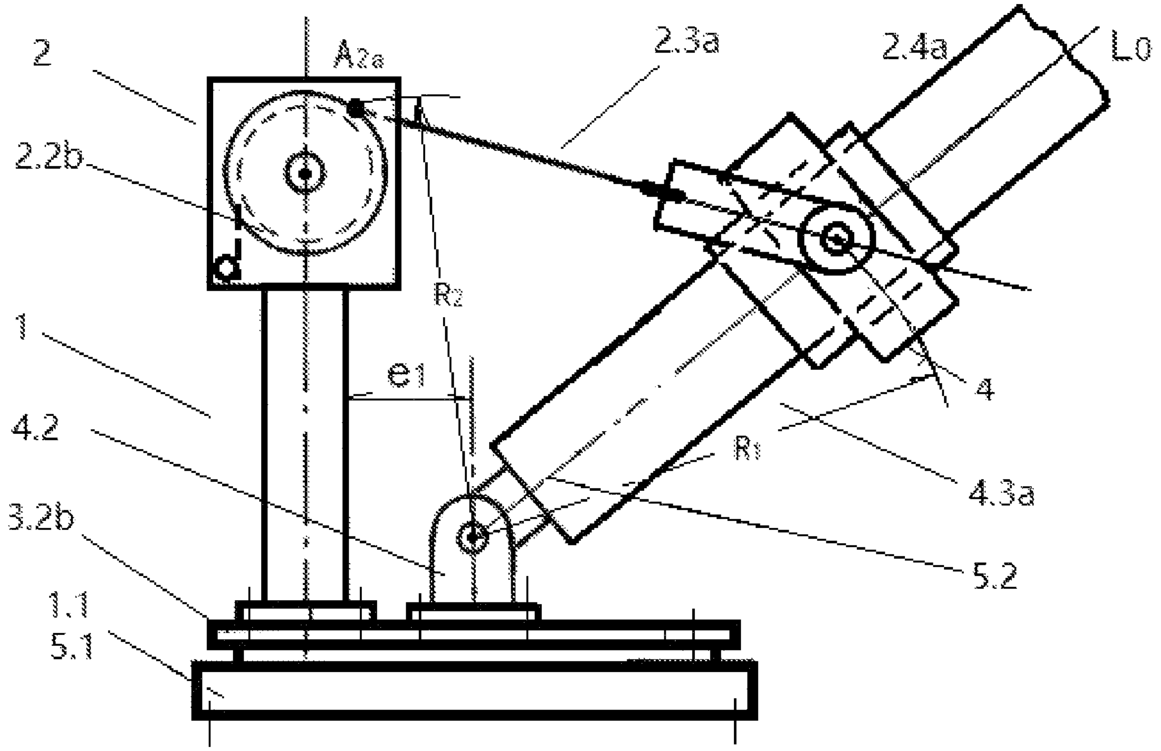
FIG. 16-FIG. 16.1 are schematic structural diagrams of Embodiment 16.

FIG. 16 is a schematic structural diagram of Embodiment 16 (a semi-open loop, having a pallet, a torsion spring generating a pulling force, and having a coupling). FIG. 16.1 is an improvement of Embodiment 16, where the semi-open loop is changed into a large open loop, and a U-shaped shifting fork is provided.

Figure 17:
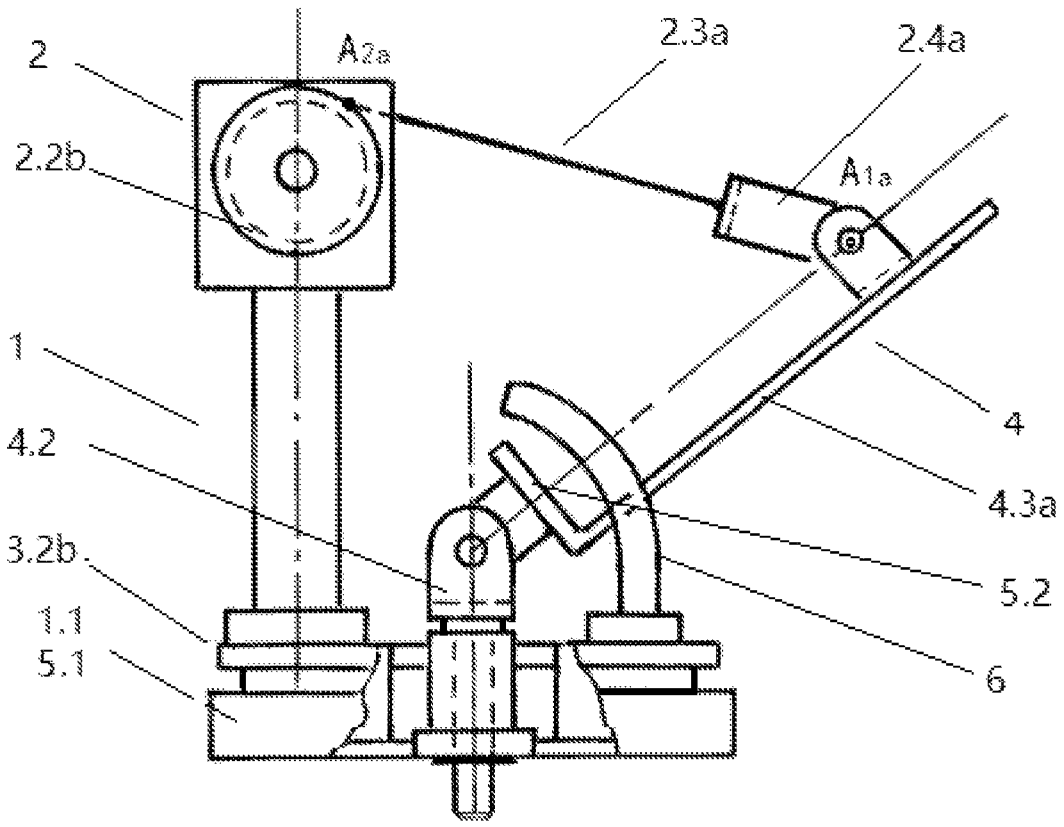
FIG. 17-FIG. 17.1 are schematic structural diagrams of Embodiment 17.
Figure 17:
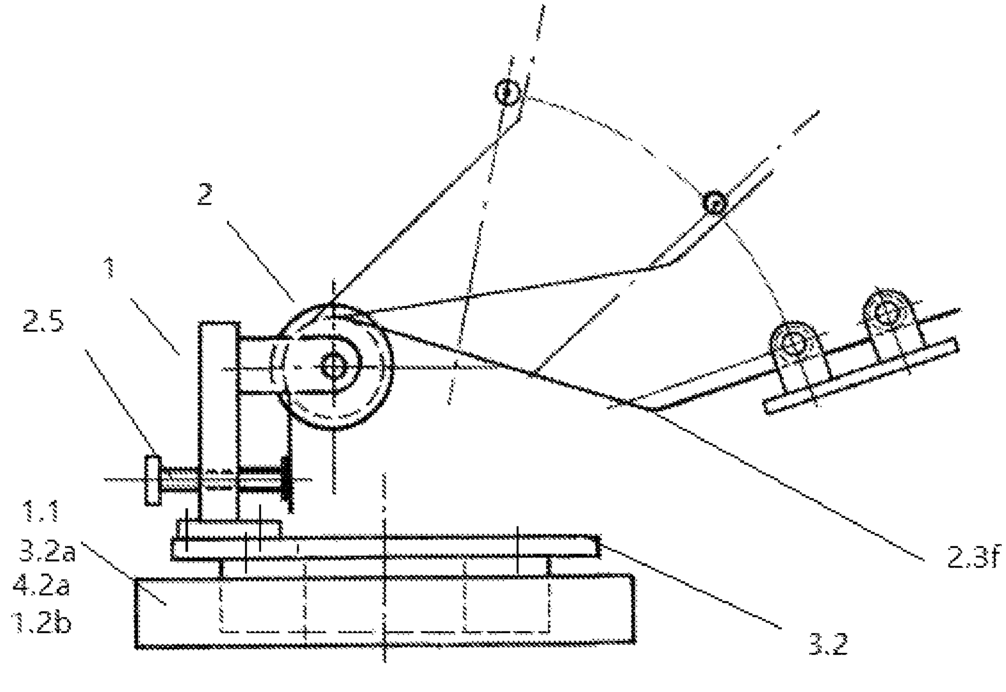

FIG. 17 is a schematic structural diagram of Embodiment 17 (a semi-open loop, having a pallet, and a torsion spring generating torque). FIG. 17.1 is an improvement of Embodiment 17, where the semi-open loop is changed into a large open loop. (For clarity, a universal swing connection rod apparatus (with an actuating cylinder) is depicted in FIG. 17.1, and the open loop solution does not include this apparatus).

Figure 18:
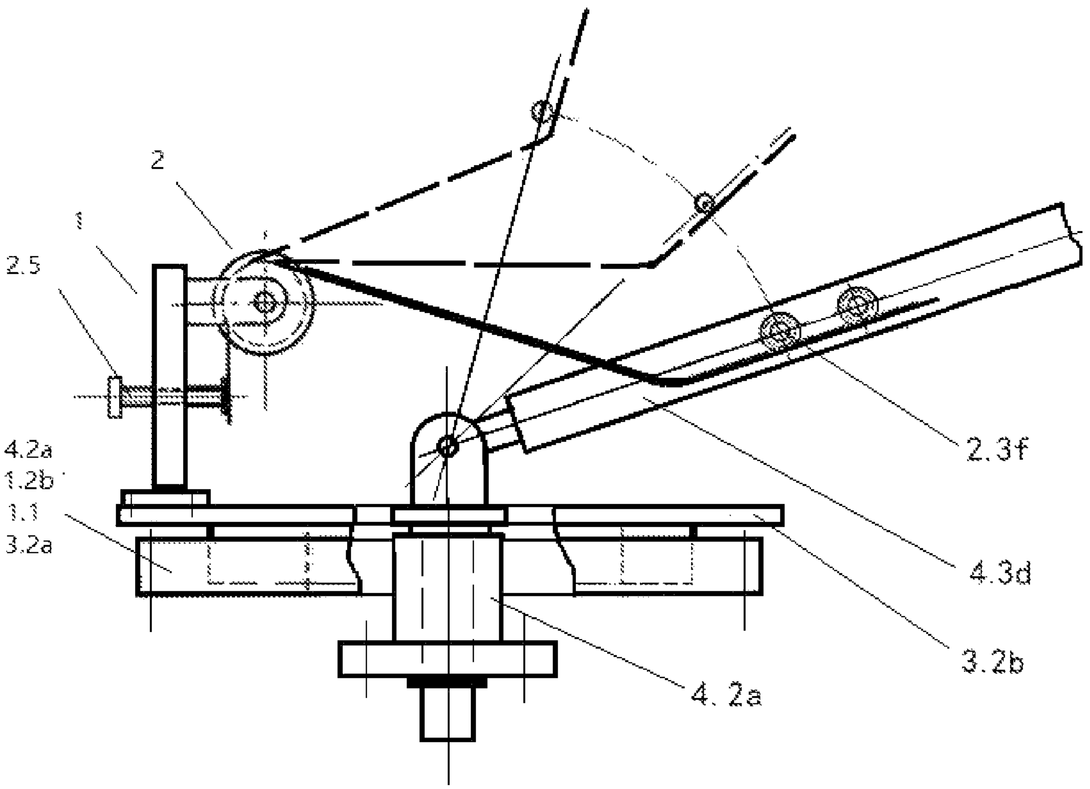
FIG. 18 is a schematic structural diagram of Embodiment 18.
Figure 18:
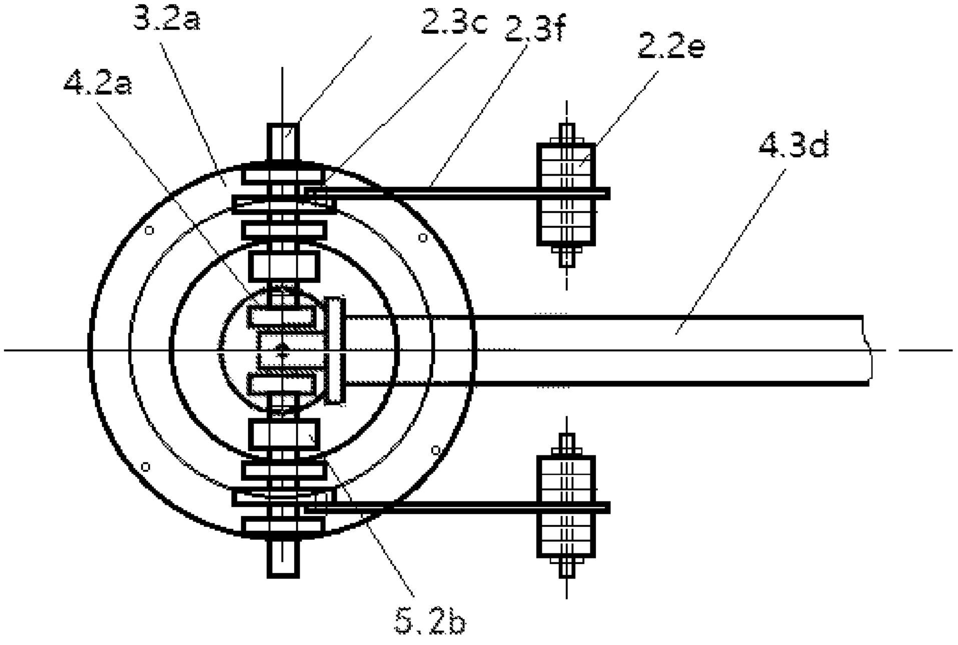
Figure 19:
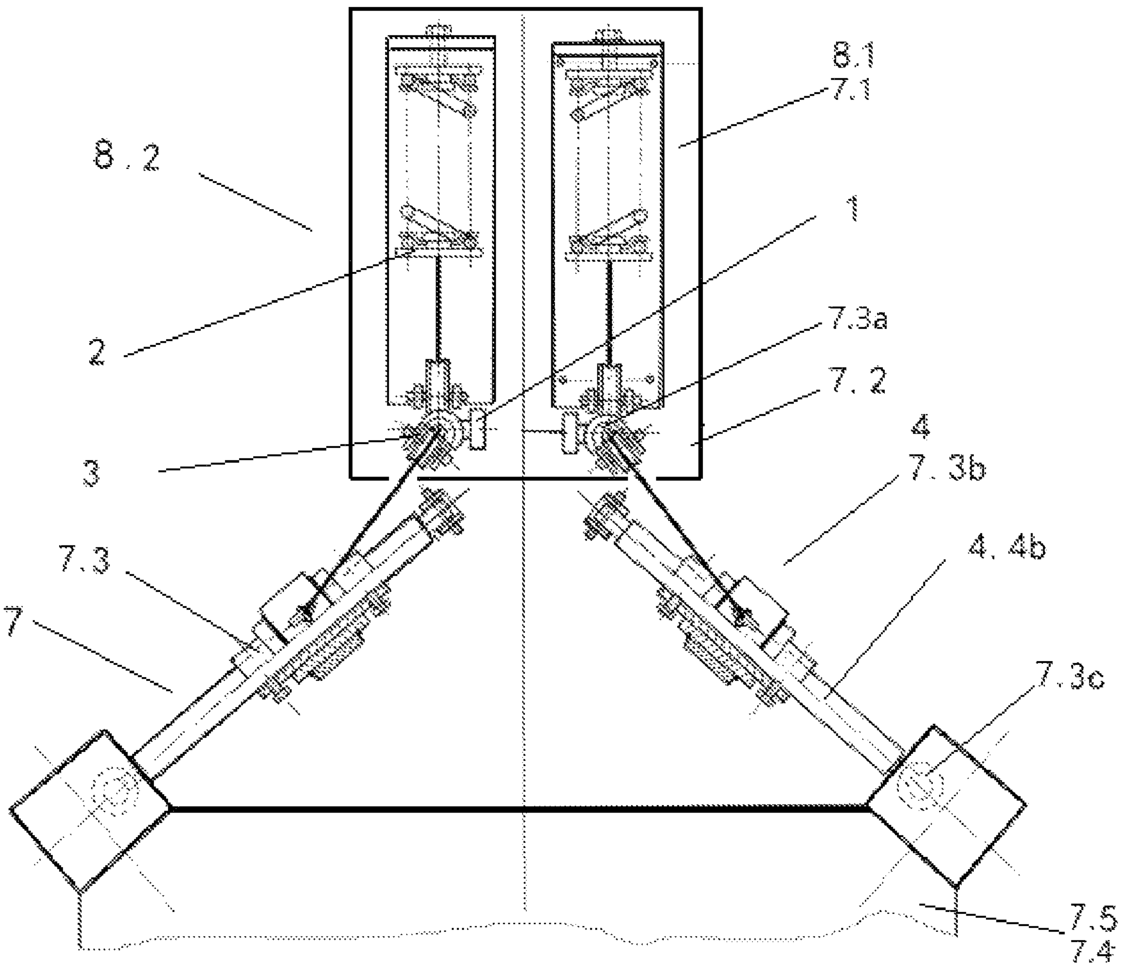
FIG. 19 is a schematic structural diagram of Embodiment 19.

FIG. 18 is a schematic structural diagram of Embodiment 18 (a large open ring, having a pallet bearing, not shared, counterweights on both sides generating anti-gravitational moment, and synchronous coupling). FIG. 19 is a schematic structural diagram of Embodiment 19 (system solution 1: having no pallet, a cable being subjected to reversing for a second time, and small inertia).

Figure 20:
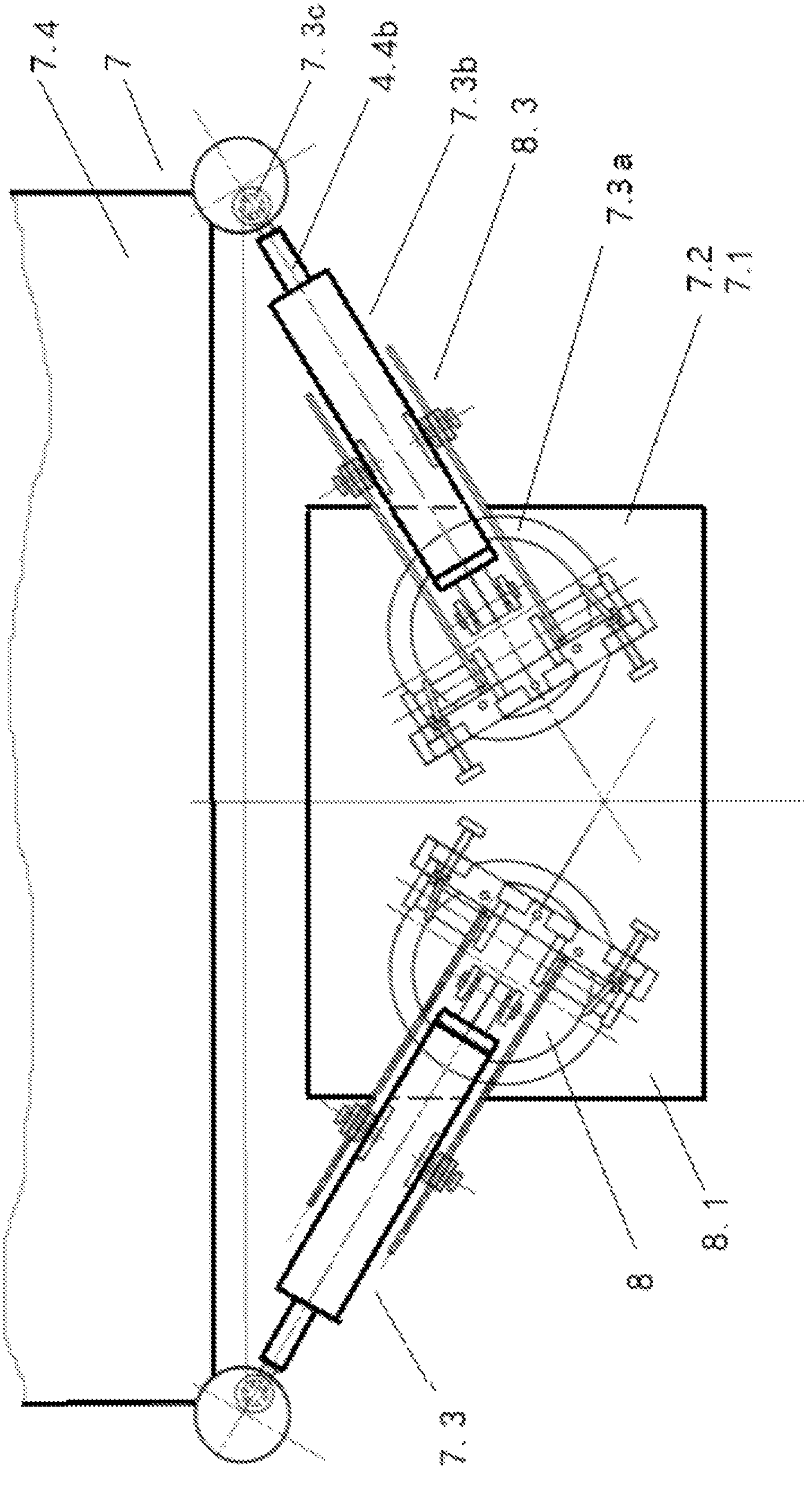
FIG. 20-FIG. 20.1 are schematic structural diagrams of Embodiment 20.

FIG. 20 is a schematic structural diagram of Embodiment 20 (a system solution 2: having a pallet, and a torsion spring generating torque), and FIG. 20.1 is an improved schematic structural diagram of Embodiment 20 (having a pallet, a torsion spring located on one side, a cable spring, and two axes being in one).

Figure 21:
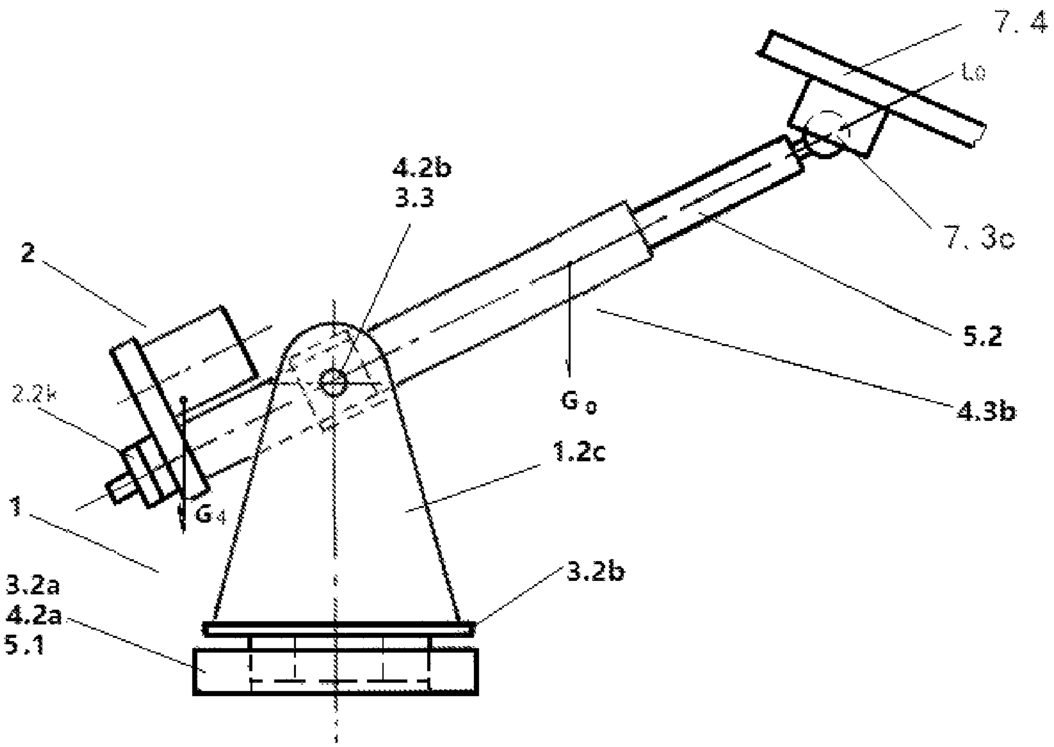
FIG. 21 is a schematic structural diagram of Embodiment 21.

FIG. 21 is a schematic structural diagram of Embodiment 21 (a system solution 3: having a pallet, and motor weight counterweight).

DESCRIPTION OF REFERENCE NUMERALS

1: Base frame (function: providing an installation bracket for a direction adaptation apparatus and a force application apparatus.)

1.1: External connection unit IA, namely a foundation installation seat;

1.2: Main frame; 1.2*a*: an overall frame of a rigid structure has one or two components with adjustable length; 1.2*b*: Base frame with one rotational degree of freedom (branch bracket A); 1.2*c*: Base frame with two rotational degrees of freedom (branch bracket B); 1.2*d*: Main frame with adjustable length or height;

1.3: External connection unit IB; 1.3*a*: Direction adaptation apparatus connection seat; 1.3*b* Force application apparatus connection seat

1.4: Safety cover or shell; 1.5 Foldable or retractable apparatus (convenient for transportation).

2. Force application apparatus;

2.1: External connection unit IIA;

2.2: Force generation apparatus; 2.2*a*: Tension spring; 2.2*b*: Torsion spring; 2.2*c*: Combined spring; 2.2*d*: Pendulum rod; 2.2*e*: Counterweight; 2.2*f*: Torsion spring seat; 2.2*g*: Gravity pendulum revolute joint; 2.2*h*: Spring installation cylinder; 2.2*i*: Support axis; 2.2*j*: Motor counterweight; 2.2*k*: Auxiliary counterweight; 2.21: Fixing shaft; 2.2*m*: Force application apparatus installation seat; 2.2*k*: Connection end; 2.2*i*: Cable rotating cylinder; 2.2: Bell mouth; 2.2*f*: Torsion spring installation seat;

2.3: Force transmission apparatus; 2.3*a*: Cable transmission; 2.3*b*: Pulley transmission pair; 2.3*c*: Gear transmission structure; 2.3*d*: Universal joint type transmission apparatus; 2.3*e*: Reversing pulley; 2.3*f*: Torsion spring connection transmission rod; 2.3*g*: Connection rod; 2.3*h*: Connection rod (deleting relevant connection rods); 2.3*i*: Rotating circular ring (for a torsion spring);

2.4: External connection unit IIB; 2.4*a*: Universal joint type; 2.4*b*: Shackle universal joint type; 2.4*c*: Flexible universal joint type; 2.4*d*: Connecting pipe (plate); 2.4*e*: Hollow cross shaft; 2.4*i*: U-shaped fork; 2.4*f*: Cable;

2.5: Force adjustment apparatus; 2.5*a*: Adjusting bolt; 2.5*b*: Gasket;

2.8: Gearbox; 2.8*a*: Large groove wheel; 2.8*b*: Small groove wheel; 2.8*c*: Cable A; 2.8*d*: Cable B; 2.8*e*: Gearbox shell; 2.8*f*: Cable connector A; 2.8*g*: Cable connector B;

3: Direction adaptation apparatus;

3.1: External connection unit IIIA;

3.2: Revolute joint A; 3.2*a*: Turntable bearing type; 3.2*b*: Pallet; 3.2*c*: Ordinary revolute joint type; 3.2*d*: Single-pulley universal joint; 3.2*e*: Double-joint universal joint; 3.2*f*: Double-pulley universal joint;

3.3: Revolute joint B; 3.3*a*: Flexible revolute joint; 3.3*b*: Circular ring; 3.3*c*: Rigid body revolute joint type;

3.4: External connection unit IIIB;

4: Universal swing rod apparatus;

4.1: External connection unit IVA;

4.2: Universal hinge; 4.2*a*: Turntable bearing; 4.2*b*: Horizontal revolute joint; 4.2*c*: swing revolute joint; 4.2*d*: Revolute joint surrounding an axis of an actuating cylinder; 4.2*e*: Universal hinge; 4.2*f*: Three-axis orthogonal spherical hinge; 4.2*g*: Four-axis orthogonal symmetric spherical hinge; 4.2*h*: U-shaped seat; 4.2*i*: Universal hinge double pulley;

4.3: Swing connection rod with an adjustable length; 4.3*d*: Cylinder barrel; 4.3*a*: Parallel connection rod; 4.3*b*: Vertical connection rod; 4.3*c*: Reverse connection rod; 4.3*f*: Connection rod with an adjustable length;
4.4: External connection unit IVB; 4.4*a*: Connected with the force application apparatus; 4.4*b*: Connected with a mission load;
5: Integral external connection apparatus; 5.1: Basic connection seat VA; 5.2: Mission load connection seat VB.
6: U-shaped shifting fork;

System Solution:
7: UPS parallel mechanism;
7.1: System external connection apparatus VIIA; 7.2: Foundation platform;
7.3: UPS branch linkage; 7.3*a*: Lower platform universal hinge (4.2); 7.3*b*: Sliding pair or cylindrical pair; 7.3*c*: Upper platform universal hinge;
7.4: Motion platform; 7.5: System external connection apparatus VIIB;
8: Lateral force reduction apparatus;
8.1: Integral external connection apparatus VIIIA; 8.2: Without-pallet type; and 8.3: With-pallet type.

DESCRIPTION OF SYMBOLS

Description of FIG. 1.2 and FIG. 1.3:
L0: a position of an axis of an actuating cylinder when a pitch angle is a;
L1: a position of an axis of an actuating cylinder at a minimum pitch angle;
L3: a position of an axis of an actuating cylinder at a maximum pitch angle;
L2: an OA2 connecting line;
Lm: a projection of an inner boundary of a yaw angle on a horizontal plane;
Ln: a projection of an outer boundary of a yaw angle on a horizontal plane; and
Lp: a symmetry axis of two boundary lines of a yaw angle.

Description of FIG. 10.2:
L4 corresponds to an axis of an output rod of a torsion spring at a minimum pitch angle of an actuating cylinder;
L5 corresponds to an axis of an actuating cylinder at a certain moment, and an axis of an output rod of a torsion spring;
L6 corresponds to an axis of an output rod of a torsion spring at a maximum pitch angle of an actuating cylinder;
La: a set stiffness straight line A of a torsion spring itself (passing through O, and $\alpha 1$);
Lc: a set stiffness straight line C of a torsion spring itself (passing through $\alpha 0$, and $\alpha 3$);
La: a set stiffness straight line B of a torsion spring itself (passing through two points on a sine curve);
$\alpha$: a pitch angle corresponding to an axis of an actuating cylinder at any moment;
$\alpha 1$: a minimum pitch angle of an axis of an actuating cylinder;
$\alpha 2$: a maximum pitch angle of an axis of an actuating cylinder;
$\alpha 3$: an angle of an output rod of a torsion spring at a minimum pitch angle of an axis of an actuating cylinder;
$\alpha 4$: an angle of an output rod of a torsion spring at a maximum pitch angle of an axis of an actuating cylinder; and
$\alpha 5$: an angle of an output rod of a torsion spring when an axis of an actuating cylinder is located in any position.
$\beta$: a maximum yaw angle, a maximum angle of a horizontal plane projection of an axis of an actuating cylinder;
$\beta 2$: a tension deflection angle, an included angle between an axis of an actuating cylinder and a tension axis;
$R_0$: a radius corresponding to a center of gravity of an actuating cylinder, and $R_0$=OA1;
$R_a$: a radius at a fixed end of a force application apparatus or a radius of a cable of a tension spring during turning for the first time;
R1: a connection point between a force application apparatus and an actuating cylinder, and R1=OA1*a;*
R2: a connection point between a tension spring and a force application apparatus on a base frame, and R2=OA2*a;*
R3: a radius of a gravity pendulum rod; and
R4: a radius of a connection point between a torsion spring and an actuating cylinder, which is a constant or a variable.
A1: a center of gravity position of an actuating cylinder, sometimes not on an axis;
A2: another fixed point of a tension spring on a base frame;
A1*a*: actual connection between a force application apparatus and an actuating cylinder;
A2*a*: an actual connection point between a force application apparatus and a base frame, which determines a direction of force.
F0: an acting force of a force application apparatus on an actuating cylinder, such as an axis direction of a cable; or a direction perpendicular to an output rod of a torsion spring, on a vertical plane;
F1: a component force of F0 on an axis of an actuating cylinder;
F2: a component force of F0 in a direction perpendicular to an axis of an actuating cylinder in a vertical plane passing through the axis of the actuating cylinder;
F3: a component force of F0 in a direction perpendicular to F1 and F2;
F4: an output force of a torsion spring, perpendicular to an axis of an output rod of a torsion spring; and
F5: a projection of F4 in a vertical plane passing through an axis of an actuating cylinder and in a direction perpendicular to the axis of the actuating cylinder.

Part One

This part introduces an open-loop method, and the method in this part does not include a method of a universal swing rod apparatus.

A method for reducing a positive pressure of an actuating cylinder of a universal hinged support is applied to the actuating cylinder of the universal hinged support, and an apparatus involved in the method includes: a base frame, a force application apparatus, a direction adaptation apparatus, and an integral external connection apparatus. The above method for reducing the positive pressure of the actuating cylinder of the universal hinged support is as follows:

step 1, main design parameters and a type of the force application apparatus are determined.

A, the main design parameters are determined. For a given application object (the actuating cylinder of the universal hinged support, namely, a UPS branch linkage) and design requirements, the main parameters include an amount of reducing a maximum positive pressure, a maximum gravitational moment (moment formed by the weight of the actuating cylinder to a hinged support point when the actuating cylinder is horizontal) and a ratio of gravitational moment (or the positive pressure) to be eliminated therefrom, and a maximum anti-gravitational moment, including main structural dimensions and characteristics of the application object (a parallel mechanism), and further includes an amount of weight compensation.

The main structural dimensions of the application object include a working space of the actuating cylinder of the universal hinged support, namely, a pitch angle of the actuating cylinder, a yaw angle, and a weight of the actuating cylinder. The maximum gravitational moment includes moment formed by the weight of the actuating cylinder when its axis is horizontal and some additional weight on the hinged support point. The additional weight is, for example, the gravity and gravitational moment formed by the force application apparatus on the actuating cylinder. The maximum anti-gravitational moment is a product of a ratio of the gravitational moment to the gravitational moment to be eliminated. Usually, corresponding engineering errors should also be given.

The maximum positive pressure refers to a sum of positive pressure absolute values at a piston (between the piston and a cylinder barrel) and a cylinder head (between a piston rod and cylinder head) when the actuating cylinder is in a horizontal state. This positive pressure is one of main factors forming a friction force of the actuating cylinder.

The gravitational moment not only includes a gravitational moment formed by the weight of the actuating cylinder of the universal hinged support, but also includes the additional gravitational moment formed by the weights of the force application apparatus, a connection rod and the like acting on the actuating cylinder. Before designing the first solution, the gravitational moment (denoted as ML) formed by the weight of one force application apparatus on the actuating cylinder needs to be pre-estimated. If there is previous similar design solution data, setting may be performed by referring to the previous data.

The gravitational moment formed by the weight of the force application apparatus on the actuating cylinder is divided into various cases. For example, Embodiments 4, 5, and 6 mainly focus on gravitational moment formed by the weight of a connecting part, Embodiment 1 further includes some spring weights, and Embodiments 2 and 3 further include a weight of the connection rod. In most cases, the formed gravitational moment is positive, and there are also some formed gravitational moment that is beneficial. For example, in some cases of counterweight embodiments, the gravitational moment formed by the connecting apparatus is the anti-gravitational moment, which is beneficial and reduces the gravitational moment.

There are two cases of determining the gravitational moment: one is to determine the gravitational moment according to an actual application object, the other is to classify a motion platform, and according to parameters including the weights of the branch linkages, the gravitational moment of the branch linkages and the main requirements of different levels of motion platforms, the gravitational moment is divided into different levels for design, which can meet the needs of various different application scenarios. For example, according to the weight of the actuating cylinder, it is divided into multiple levels such as 50 kilograms, 100 kilograms, 200 kilograms, 300 kilograms, and 400 kilograms.

The ratio of the gravitational moment to be eliminated is the percentage of the gravitational moment removed and the amount of weight compensation, which are determined by a designer. If both positive pressure reduction and weight compensation are considered, the ratio is usually between 50% and 150%. The optimal range is between 100% and 120%. If it is only considered that the positive pressure is reduced to the minimum (pursuing the minimum friction force), then the ratio is usually between 95% and 105%, and the optimal value is 100%. Taking 100% as the ratio to be eliminated can theoretically minimize the positive pressure at the design point and compensate for the weight of the actuating cylinder.

The amount of reducing the positive pressure or the anti-gravitational moment is related to the amount of weight compensation. If it is necessary to reduce the positive pressure by 80%, the anti-gravitational moment may be 80% or 120% (corresponding to two solutions). The solution of anti-gravitational moment of 120% will obtain a weight compensation of 40% greater than the solution of anti-gravitational moment of 80%, 100% positive pressure corresponds to one solution of anti-gravitational moment and one solution of weight compensation. If there is a low requirement for positive pressure reduction and a high requirement for weight compensation, the anti-gravitational moment slightly greater than 100% may be selected.

Therefore, comprehensively considering weight compensation and positive pressure reduction, the anti-gravitational moment of 100%-120% may be selected. If the focus is on weight compensation, selecting the anti-gravitational moment that is much greater than 100% is also a feasible solution.

If friction force reduction is not considered and only weight compensation is considered, the ratio may be above 150%, for example, the anti-gravitational moment of 200% or the anti-gravitational moment of 300% is taken, so as to obtain the large weight compensation. When the anti-gravitational moment greater than 200% is taken, the friction force will be greater than that when no anti-gravitational moment is added.

B, the type and integral structural form of the force application apparatus are determined.

Determining the type of the force application apparatus is to determine which force application mode to be used for providing the anti-gravitational moment. The force application mode includes, but is not limited to the following modes:

a tension spring, a compression spring, a torsion spring, an air spring, a gravity counterweight, a gravity pendulum, and an electromagnetic force, and one of the force application modes or a combination of two or more modes may be selected.

The structural form is determined. The structural form includes an open loop structure, a closed loop structure, a semi-open loop structure, a semi-closed loop structure, a hybrid structure, and the like, and one of the structural forms is selected.

The above steps A and B can be performed with no particular orders or be performed simultaneously.

For example, Embodiments 1 and 2 use the tension spring as the force application mode and are the closed loop structure, Embodiments 3, 4, 5, and 6 use the tension spring in cooperation with a cable as the force application mode and are the closed loop structure, Embodiment 17 uses a torsion spring parameter torque as the force application mode and is the semi-open loop structure, Embodiments 11 and 12 use the gravity counterweight as the force application mode, and Embodiment 14 uses a hybrid mode as the force application mode.

Step 2, specific structural design is performed.

Specific structural design includes structure designing, manufacturing, assembling, debugging, etc. (referred to as structural design, and the structural design includes simulation design, assembling, and debugging).

The structure designing includes designing of the base frame, designing of the force application apparatus, designing of the direction adaptation apparatus and designing the integral external connection apparatus.

The base frame provides a bracket for other components (directly or indirectly); and the force application apparatus provides an appropriate force that acts between the actuating cylinder of the hinged support and the bracket, so as to form the appropriate anti-gravitational moment and appropriate weight compensation. At each pitch angle, the anti-gravitational moment and weight compensation provided meet the design requirements.

The direction adaptation apparatus provides a working space suitable for the working space of the actuating cylinder for the force application apparatus, ensuring that the anti-gravitational moment remains unchanged or changes less when the yaw angle changes.

The integral external connection apparatus is used for connecting the actuating cylinder and installing the entire apparatus, and is used for connecting the mission load.

The above motion components cooperate with each other to provide the anti-gravitational moment that meets the design requirements and weight compensation that meets the design requirements when the pitch angle of the UPS branch linkage changes. When the yaw angle changes, the anti-gravitational moment remains unchanged or there is a small change within the engineering allowable error range, and the weight compensation remains unchanged or there is a small change within the engineering allowable error range, for example, below 5%. The changes in the anti-gravitational moment and weight compensation are within the engineering allowable error range.

Step 3, an actual gravitational moment or positive pressure and an effect of weight compensation are calculated, tested and evaluated, and whether to design requirements are met is determined.

The evaluated gravitational moment (formed by the weight of the connecting part between the actuating cylinder and the force application apparatus) and a reduction ratio thereof are calculated or tested, and the evaluated weight compensation effect is calculated or tested. It stops in a case of meeting or basically meeting the design requirements, and the obtained solution is taken as a design result.

In a case of not meeting the requirements, the parameters are adjusted, the above processes are repeated, and redesigning is performed until it meets the design requirements.

The adjusted parameters further include but are not limited to the anti-gravitational moment, a reduction ratio, a force application mode, a structural form, a structural dimension, and a structural inertia, for example, whether to apply a turntable bearing and which force application mode to use.

Parameter adjustment refers to changing the weight ML (the weight of a connecting apparatus in the design solution) of the connecting apparatus, adjusting the force application apparatus, adjusting the structure, or simultaneously adjusting two or more items, sometimes also considering the inertia of an additional apparatus and a disturbance space of various components of the system.

Redesigning is performed, and the above processes are repeated until it meets the design requirements, which is an iterative process.

The device formed by the above method is an open loop apparatus, called an open-loop lateral force reduction apparatus, which can be directly used in the parallel mechanism (connected to the actuating cylinder of the UPS branch linkage of the parallel mechanism).

Part Two

This part introduces a closed loop method, and the method in this part constructs a method including a solution of an actuating cylinder of a universal hinged support.

If the above method also includes a universal swing rod apparatus or a branch linkage of an actuating cylinder of a universal hinged support (i.e. a UPS type branch linkage) branch linkage (these three names sometimes may be replaced with each other), then in the above method, the universal swing rod apparatus should also be designed. At the same time, the integral external connection apparatus also changes. The connection between the base frame and a foundation remains unchanged. One end of the original force application apparatus is connected with a swing rod apparatus of the universal swing rod apparatus, and the swing rod apparatus becomes a part of the integral external connection apparatus. In this way, a closed loop structure is formed, which is called a closed-loop universal hinged support actuating cylinder lateral force reduction apparatus (referred to as a closed-loop lateral force reduction apparatus or a closed-loop positive pressure reduction apparatus). An application object of the closed-loop lateral force reduction apparatus is a parallel mechanism or a UPS branch linkage (including a RPS branch linkage or PS, CS branch linkages that share one revolute joint). The universal swing rod apparatus provides an installation seat for the actuating cylinder and provides a swing working space. Sometimes, a connection rod of the universal swing rod apparatus is replaced with the actuating cylinder. The connection rod apparatus and an axis of the actuating cylinder may be parallel, perpendicular, reverse or in other directions, and the connection rod is in a vertical plane passing through the axis of the actuating cylinder.

Therefore, based on a method of an open-loop lateral force reduction assembly, appropriate adjustment can be made to obtain a method of reducing a lateral force of an actuating cylinder of a universal hinged support of the closed-loop lateral force reduction apparatus, which refers to the open loop method and is not repeated.

The step 2 of the above open loop method further includes adopting a process of arranging an axis of a first revolute joint of the direction adaptation apparatus to be perpendicular to a horizontal plane and installing the first revolute joint on a foundation, the structure is simplified, and precision is improved. The revolute joint is called a turntable bearing, a fixed plate of the turntable bearing is fixed on a foundation, and a pallet is fixedly installed on a rotatable plate of the turntable bearing. The turntable bearing also serves as a part of the base frame, the rest part of the base frame is installed on the pallet, and another revolute joint of the direction adaptation apparatus is installed on the pallet, which refers to the open loop embodiment with the turntable bearing.

In the step 2 of the closed loop method above, a method that the universal swing rod (i.e. the UPS branch linkage) and the direction adaptation apparatus share one revolute joint is adopted, the structure is simplified, and precision is improved. The shared revolute joint is a revolute joint for connecting a universal hinge on a universal swing rod apparatus to a foundation, the shared revolute joint is formed by a turntable bearing, an axis of the turntable bearing is perpendicular to a horizontal plane, a fixed plate of the turntable bearing is fixed on the foundation, and a pallet is fixed on a rotatable plate of the turntable bearing. At the same time, the turntable bearing serves as a part of the base frame. The other revolute joint of the direction adaptation apparatus is installed on the pallet, and the rest part of the UPS branch linkage is installed on the pallet. Usually, axes of the other two bearing revolute joints are parallel to the horizontal plane, which refers to the closed loop embodiments 8 and 9 with the turntable bearing.

In applications, the rest part of the UPS branch linkage is also installed on the pallet. The end of the force application apparatus connected with the base frame may be connected to the pallet or to the foundation.

In this specification, the UPS branch linkage and the universal swing connection rod refer to the same apparatus.

Part Three

This part introduces a solution of a structural open-loop assembly, which refers to an open-loop Embodiment 15.

A device for reducing a positive pressure of an actuating cylinder of a universal hinged support includes: a base frame 1, a force application apparatus 2, a direction adaptation apparatus 3, and an integral external connection apparatus 5. The first three parts are a main body of a functional structure. All the open loop solutions include these major parts. The closed loop solution further includes a universal swing connection rod apparatus 4.

1. The base frame includes an external connection unit IA, a main frame, and an external connection unit IB. The base frame is a structure or mechanism with 0-2 rotational degrees of freedom. Its function is to provide an installation bracket for other components such as a direction adaptation apparatus and a force application apparatus.

2. The force application apparatus includes a force generation apparatus, a force transmission apparatus, an external connection unit IIA, and an external connection unit IIB. The force generation apparatus is completed by gravity, a metal spring force, an air spring force, an electromagnetic force and the like, and is not limited to these forces. The force transmission apparatus is used for transmitting the force, and changing a magnitude and direction of the force.

The force application apparatus is used for applying the force provided by the force application apparatus to a position between the base frame and a connection rod (or an actuating cylinder) of the universal swing connection rod apparatus, so as to provide an anti-gravitational moment for the actuating cylinder.

3. The direction adaptation apparatus includes two revolute joints that are not coaxial and not parallel, an external connection unit IIIA, and an external connection unit IIIB. The two revolute joints are fixedly coupled together to achieve rotation with two degrees of freedom.

The direction adaptation apparatus ensures that when the actuating cylinder rotates up and down around a horizontal axis, it cooperates with the force application apparatus to meet the changes in direction and provide an appropriate anti-gravitational moment. When the actuating cylinder rotates around a vertical axis, the force application apparatus moves accordingly.

The integral external connection apparatus 5 includes an external connection unit VA and an external connection unit VB. Its function is to complete integral fixing and external output functions.

Integral Structure:

the base frame 1 is installed near (outside or around) a universal hinge 4.2 (a U pair of a UPS branch linkage), the direction adaptation apparatus 3 is installed on the base frame, one end of the force application apparatus 2 is connected to the base frame through the direction adaptation apparatus, and the other end of the force application apparatus is connected to a universal swing connection rod or cylinder barrel through the connection apparatus, that is, one end acts on the actuating cylinder, and the other end acts on the base frame. When the base frame, the force application apparatus, the direction adaptation apparatus and the universal swing connection rod apparatus form a closed loop, synchronous rotation is completed.

The integral external connection apparatus 5 is used for being connected with the foundation and an external device to achieve their respective basic functions.

Installation application: a service object of the lateral force reduction apparatus is a parallel mechanism. The universal hinge and the parallel mechanism are taken as reference positions. An IA end of a connecting apparatus of the lateral force reduction apparatus is installed on an outer side, or an outer side or around the universal hinge. An IB end of the connecting apparatus is connected to the actuating cylinder.

The above parts cooperate with each other to form a suitable anti-gravitational moment between the actuating cylinder and the base frame throughout the entire working space of the actuating cylinder, so as to reduce or partially eliminate moment (hereinafter referred to as the gravitational moment) formed by the gravity of the actuating cylinder (which may include the weight of the piston rod) acting on the center of the U pair of the UPS branch linkage of an inclined hinged support, reduce the positive pressure and reduce the friction force. Meanwhile, the gravity effect of the actuating cylinder is reduced or partially eliminated, and the power burden of the system is reduced.

Part Four

This part introduces a solution of a semi-open loop, which refers to a semi-open loop Embodiment 17.

In the solution of the open loop, according to the device for reducing the positive pressure of the actuating cylinder of the universal hinged support, a first revolute joint of the direction adaptation apparatus is installed on the ground. An axis of the revolute joint is perpendicular to the ground. The revolute joint is formed by a turntable bearing, a fixed plate of the turntable bearing is fixed on a foundation, a pallet is usually fixedly connected on a movable plate thereof, and another revolute joint of the direction adaptation apparatus is installed on the pallet. The turntable bearing forms a part of the base frame. The base frame constitutes a base frame with one degree of freedom. The rest part of the base frame is installed on the pallet. The fixed plate of the turntable bearing is installed on the foundation.

In closed-loop Embodiments 8, 9, and 10, only a horizontal-axis revolute joint and connection rod of the universal hinge are removed to form the structural plan of the semi-open loop.

During use, the pallet is further used for installing the rest part of the UPS branch linkage, such as a RPS part.

The U pair of the UPS branch linkage has two revolute joints or has three revolute joints when the universal hinge is replaced by a spherical hinge. The revolute joint connected with the foundation is called the first revolute joint, followed by the second revolute joint and the third revolute joint. The positive pressure mentioned in this text is sometimes referred to as a lateral force, and the two are actually the same concept.

There are two open loop solutions, one is a large open loop and the other is a semi-open loop. The open loop is a solution that does not include a universal swing connection rod apparatus. If the direction adaptation apparatus and the universal hinge of the universal hinge connection rod shares the first revolute joint, it is called a semi-open loop structure, otherwise, it is the large open loop. The first revolute joint shared is called the turntable bearing. The turntable bearing may bear a certain overturning force. The semi-open loop structure is a simplification of the large open loop structure. The large open loop is also referred to as the open loop.

Part Five

This part introduces a structural closed-loop solution, which is to add a universal swing connection rod apparatus on the basis of the open loop solution to form a closed loop solution. Please refer to Embodiments 1-6.

A device for reducing a positive pressure of an actuating cylinder of a universal hinged support includes: a base frame, a force application apparatus, a direction adaptation apparatus, a universal swing rod apparatus, and integral external connection apparatuses VA and VB. Its base frame, force application apparatus, and direction adaptation apparatus are the same as the open loop solution and will not be repeated. One end of the universal hinge of the universal swing connection rod is installed on a foundation (or a bottom of the base frame), one end of the swing connection rod is connected with the actuating cylinder and the force application apparatus, and the force application apparatus applies anti-gravitational moment to the actuating cylinder or a connection rod. The base frame, the force application apparatus, a direction adaptation apparatus and the universal swing connection rod form a closed loop, and complete synchronous motion of all components.

The whole formed by four components of the base frame, the force application apparatus, the direction adaptation apparatus, and the universal swing connection rod is called a functional structure body. The external connection apparatus includes a foundation connection seat and an actuating cylinder connection seat or a platform connection seat.

In an implementation, the universal swing connection rod apparatus includes a universal hinge, a swing connection rod, an external connection unit IVA, and an external connection unit IVB. The universal hinge (or spherical hinge) is connected with a swing rod. The universal hinge includes, but is not limited to the following mechanisms: U, RR, RU, UR, RUR, S, etc. The connection rod may be located on a straight line passing through an axis of the actuating cylinder or parallel to the axis of the actuating cylinder, or on a plane perpendicular to the axis of the actuating cylinder, or on an extended line of the axis of the actuating cylinder. The connection rod, a straight rod, and a curved rod are all acceptable. Function: a working space with two degrees of freedom is provided for the actuating cylinder (branch linkage), a connection interface with the RPS or PS branch linkage is provided, and a connection interface with the force application apparatus is provided, so as to form a whole with the parallel mechanism.

Installation application: Refer to Embodiment 20.

There are also two closed loop solutions, one is a large closed loop and the other is a semi-closed loop. In the closed loop solution, a horizontal-axis revolute joint of the direction adaptation apparatus and a first revolute joint of the universal hinge share a turntable bearing. This solution is called a semi-closed loop solution (see Embodiments 8, and 9). The large open loop is also referred to as the open loop.

In Embodiments 8, 9, and 10, the turntable bearing and the direction adaptation apparatus share a vertical-axis revolute joint.

This revolute joint usually uses the turntable bearing. A fixed plate of the turntable bearing is fixed on a foundation, a pallet is usually fixedly connected to a movable plate, and another revolute joint of the direction adaptation apparatus is installed on the pallet. The turntable bearing forms a part of the base frame. The base frame constitutes a base frame with one single rotational degree of freedom. The rest part of the base frame is installed on the pallet. The fixed plate of the turntable bearing is installed on the foundation.

During use, the pallet is further used for installing the rest part of the UPS branch linkage, such as a RPS part.

The U pair of the UPS branch linkage has two revolute joints or has three revolute joints when the universal hinge is replaced by a spherical hinge. The revolute joint connected with the foundation is called the first revolute joint, followed by the second revolute joint and the third revolute joint.

The positive pressure mentioned in this text is sometimes referred to as a lateral force, and the two are actually the same concept. The details of each component (without separating the open loop and the closed loop) are described in a unified mode.

In an implementation, the base frame includes a foundation installation seat IA 1.1, a main frame, and an upper installation seat IB 1.2. The foundation installation seat is connected to the periphery of the UPS branch linkage on the ground foundation. The upper installation seat is used for being connected with the direction adaptation apparatus or the force application apparatus.

The function of the base frame is to provide an installation bracket and a suitable installation point for the force application apparatus or the direction adaptation apparatus. There are three types of base frames:

The first type of basic frame: the main frame is a rigid structural frame (refer to Embodiment 1), or has two (height and width) horizontal-moving degrees of freedom that can be adjusted, and is fixed as a rigid frame after adjustment, referring to Embodiment 2.

The second type of base frame is a base frame with a degree of freedom to rotate around a vertical axis (Embodiments 8 and 9). This vertical axis revolute joint is shared with the first revolute joint of the direction adaptation apparatus. Usually, this revolute joint uses the turntable bearing. The base frame includes the turntable bearing, a pallet and a bracket. This may also set two adjustable horizontal-moving degrees of freedom, referring to Embodiments 11-15.

The third type is a base frame with two rotational degrees of freedom, one is a vertical-axis revolute joint and the other is a horizontal-axis revolute joint. The two revolute joints are shared with the two revolute joints of the direction adaptation apparatus, referring to Embodiment 11. Rotating the axis of the turntable bearing around the vertical axis allows for an error of about 10 degrees, which has a small impact on precision and can increase a pitching working space of the actuating cylinder.

In an implementation, the force application apparatus includes a force generation apparatus 2.2, a force transmission apparatus 2.3, an external connection unit IIA 2.1, and an external connection unit IIB 2.4. Structure: the force generation apparatus and the force transmission apparatus are connected in series. After being connected in series, there are connecting apparatuses IIA and IIB at both ends. When there is a cable, there is also a connection with a pulley.

One end of the force transmission apparatus is connected with an actuator, and the other end is connected with the base frame through the directional adaptation apparatus.

The force application apparatus generates a suitable force that acts between an electric cylinder and a base, forming anti-gravitational moment on the electric cylinder (definition: the anti-gravitational moment is moment in a direction opposite to the gravitational moment, and is used for eliminating or reducing the gravitational moment).

The force generation apparatus is used for providing a suitable force when the actuating cylinder rotates. According to the generation mode of force, the force generation apparatus includes, but is not limited to a tension spring, a compression spring, a torsion spring, an air spring, a permanent magnetic spring, an electric spring, gravity, an electromagnetic spring, a moment motor, etc, and further includes one or several combinations, connected in parallel or in series.

The force transmission apparatus is a simple connecting seat or a simple cable (rope) transmission, or a combination of the cable, a transmission box, and a pulley block. The force transmission apparatus is used for transmitting the force, and changing a direction and magnitude of the force.

The force transmission apparatus of the force application apparatus includes pulleys and a cable, and the pulleys are used for fixing and changing a direction of the cable. A first pulley is used for determining a force application direction of the force application apparatus, and providing a reasonable force component. A second pulley, in cooperation with the first pulley, determines a direction of a second section of the cable, and the second section of the cable is perpendicular to the ground and used for isolating the swing caused by yawing of the actuating cylinder. A third pulley further changes the direction of the cable to provide a suitable installation position for the force application apparatus.

The combination of the cable and the pulley is one of the following situations:

A, one pulley is installed on the base frame, the adaptation apparatuses in the same direction share one horizontal-axis revolute joint to fix the direction of a first section of the cable, the pulley is in cooperation with the force application apparatus to make the direction of the second section of the cable be perpendicular to the horizontal plane, and an axis of the cable is close to a universal hinge.

B, two pulleys are provided, one pulley is installed on the base frame, the adaptation apparatuses in the same direction share one horizontal-axis revolute joint for fixing the direction of the first section of the cable, the second pulley is installed on the base frame, the two pulleys cooperate to make the direction of the second section of the cable be perpendicular to the horizontal plane, and the axis of the cable is close to the universal hinge. A third section of the cable has a relatively free direction.

C, Three or more pulleys are provided, the first pulley is installed on the base frame, the adaptation apparatuses in the same direction share one horizontal-axis revolute joint for fixing the direction of the first section of the cable, the second pulley is installed on the base frame, the first pulley and the second pulley cooperate to make the direction of the second section of the cable be perpendicular to the horizontal plane, and the axis of the cable is close to the universal hinge. The third or more pulleys are used for changing the direction of an additional section of the cable in an arbitrary manner.

These cases may all be connected with a gearbox in series.

Especially for a general air spring (as well as a magnetic spring), the displacement is relatively small. In order to obtain a relatively large displacement, a transmission apparatus is applied to amplify an output displacement of the air spring.

In order to conveniently change an initial force, in the force application apparatus, an adjustment apparatus is connected in series in a certain link of the force application apparatus, for example, between the force generation apparatus and the force transmission apparatus, between the force generation apparatus and the base frame, and between the force transmission apparatus and the base frame, to change the initial force and is locked after adjustment.

In an implementation, the direction adaptation apparatus includes two revolute joints, an external connection unit IIIA, and an external connection unit IIIB.

Axes of the two revolute joints of the direction adaptation apparatus should preferably be orthogonal (coplanar or out-of-plane). The two revolute joints are coupled together through a rigid bracket. The revolute joint may be either a traditional revolute joint or a flexible revolute joint. The direction adaptation apparatus is not limited to a universal joint, for example, combinations of SR, RU, and RUR may all be applied.

A structure of the direction adaptation apparatus is divided into two major categories: a centralized configuration structure and an upper-lower arrangement structure (the embodiment with a turntable bearing) of the revolute joint.

In an implementation, in a universal hinged support swinging rod apparatus, the universal hinge is fixedly connected with the connection rod. There are several forms of universal hinge connection rod apparatuses:

a connection rod parallel to the axis of the actuating cylinder (see Embodiments 2 and 3), a connection rod perpendicular to the axis of the actuating cylinder (see Embodiment 9), and a connection rod below the axis of the actuating cylinder (see Embodiment 11). The solution that the actuating cylinder serves as the connection rod refers to Embodiments 1, 4, and 5.

The difference between an actuating cylinder connection rod apparatus and the UPS branch linkage is that, the former includes the universal hinge and the cylinder barrel of UPS or a rod piece connected with the cylinder barrel (embodiment), and generally excludes the actuating cylinder and a motion platform universal hinge. Sometimes, they may also replace each other without confusion.

There is a revolute joint installation seat on the connection rod, and a position of the installation seat on the connection rod may be adjusted to change a size of R1.

It is suitable for various universal hinges of the parallel mechanism (the types of the universal hinge include, but are not limited to, RR, RU, RUR, S, and UR) (Coplanar and out-of-plane, the first revolute joint is perpendicular to the ground and the first revolute joint is parallel to the ground. Other axes are arranged at will. Different parallel mechanisms may vary. Sometimes, the universal hinges are the same, but the installation modes of the universal hinges are different. For the same branch linkage, different installation modes will form different parallel mechanisms).

In an implementation, the integral external connection apparatus includes a foundation connection apparatus VA and an actuating cylinder connection apparatus VB.

The foundation connection apparatus realizes the connection with the ground, such as a fixed plate of the turntable bearing or a connection seat apparatus of the base, and has the function of fixing the entire apparatus. The actuating cylinder connecting apparatus realizes the connection with the actuating cylinder or the platform, and form a whole with the parallel mechanism.

The above force application apparatus and direction adaptation apparatus are designed with a protective apparatus, such as an organ cover and a shell. The force generation apparatus is designed with a length adjustment apparatus. To obtain accurate anti-gravitational moment, the force application apparatus is designed with a force sensor or designed as a sensor.

Part Six

This part introduces a system assembly solution, including a parallel mechanism system with minimal positive pressure.

The structure includes three major parts of a parallel mechanism, a lateral force reduction apparatus, a system external connection apparatus VIIA and a system external connection apparatus VIIB (the above open-loop and closed-loop assembly solutions are referred to as the lateral force reduction apparatus). The parallel mechanism has at least one UPS branch linkage, and at least one UPS branch linkage is configured with one lateral force reduction apparatus (open loop or closed loop) to eliminate most of the lateral force of the UPS branch linkage and part of the gravity of the branch linkage (sometimes, to balance larger platform weight, it may be slightly larger than the weight of the actuating cylinder), so as to form a large parallel mechanism system with a low lateral force, low friction force, and partial gravity compensation characteristics, referring to relevant embodiments 19, 20, and 21 for different closed-loop structures and open-loop structures.

The parallel mechanism, which has at least one branch linkage that is the UPS branch linkage, cooperates with an open-loop or closed-loop lateral force reduction apparatus to form a large system, namely, a low-friction parallel mechanism system. The above parallel mechanism has five degrees of freedom, including 2, 3, 4, 5, and 6 degrees of freedom, and includes a parallel mechanism with various combinations of degrees of freedom.

Any one or more (depending on how many UPS branch linkages are required) lateral force reduction apparatuses are selected from the above open-loop and closed-loop lateral force reduction apparatuses. One UPS branch linkage is equipped with one lateral force reduction apparatus.

The external connection unit is the foundation installation seat and the platform connection seat. The foundation installation seat is a foundation platform of the parallel mechanism and a foundation installation seat of the lateral force reduction apparatus. The platform connection seat, also known as a motion platform, is used for installing a mission load such as a cockpit.

If the closed-loop lateral force reduction apparatus is used, as the closed-loop lateral force reduction apparatus already has a universal hinge for the branch linkage, the universal hinge of the parallel mechanism is not needed, and the two share one universal hinge.

The base frame of the lateral force reduction apparatus is installed near a lower end of six branch linkages of six degrees of freedom, one end of the force application apparatus is connected to the base frame through the direction adaptation apparatus, and the other end of the force application apparatus is connected to a cylinder barrel connection seat of the actuating cylinder, that is, one end acts on the actuating cylinder, and the other end acts on the base frame. Each UPS branch linkage has a corresponding lateral force reduction apparatus.

It should be noted that a disturbance space of each branch linkage and platform of the parallel mechanism is a space that cannot be occupied, and the installation of the lateral force reduction apparatus cannot occupy the disturbance space above, and appropriate spacing should be maintained with the above space.

The above parts cooperate with each other to form suitable (opposite to the gravitational moment) moment (hereinafter referred to as the anti-gravitational moment) between an actuator and the base frame throughout the entire working space of the actuating cylinder, so as to provide a basically sinusoidally-changed anti-gravitational moment for each branch linkage. The moment (hereinafter referred to as the gravitational moment) formed by the gravity of the actuating cylinder (which may include the weight of the piston rod) acting on the center of the U pair of the UPS branch linkage of an inclined hinged support is reduced or eliminated. A parallel mechanism motion platform system with multiple degrees of freedom and with a low lateral force or a low friction force is provided, meanwhile, a motion platform with smaller overall load is provided, and a motion system with appropriate compensation for gravity load is provided.

The lateral force reduction apparatus is essentially a special type of parallel mechanism (closed loop) or series mechanism (open loop) with two degrees of freedom or three degrees of freedom. The particularity lies in providing a sinusoidally-changed anti-gravitational moment for the actuating cylinder of the universal hinged support in a conical working space.

The parallel mechanism with multiple degrees of freedom and containing the UPS branch linkage has various lateral force reduction apparatuses. Each lateral force reduction apparatus may be applied to any of the above parallel mechanisms. Therefore, there are many application solutions.

The technical solution of the present invention is specifically introduced below.

Embodiment 1

Please refer to FIG. 1, structural type: a closed loop, having no pallet, and a single-spring direct tension type solution.

It includes: a base frame 1, a force application apparatus 2, a direction adaptation apparatus 3, a universal swing rod apparatus 4 and an integral external connection apparatus 5. The first four items are referred to as a functional structure main body, and the fifth part is referred to as the connection apparatus. All closed-loop embodiment solutions include these parts, and the following explanations will not be repeated if unnecessary.

1. The base frame 1 is a rigid structural frame. A lower part of the base frame is a base installation seat IA 1.1, connected with a foundation. An upper part of the base frame is an external connection unit IB 1.3, used for being connected with the direction adaptation apparatus 3. The middle part of the base frame is a main frame 1.2, used for bearing force.

A function of base frame 1 is to provide installation support points for the direction adaptation apparatus, the force application apparatus, and the like.

2. The force application apparatus 2 includes a force generation apparatus 2.2, a force transmission apparatus 2.3, an external connection unit IIA 2.1, and an external connection unit IIB 2.4.

In this embodiment, the force generation apparatus 2.2 is a tension spring 2.2*a*, and the force transmission apparatus 2.3 is a universal joint type transmission apparatus 2.3*d*. The external connection unit IIA 2.1 and the external connection unit IIB 2.4 of the force application apparatus have one end connected to a cylinder barrel of an actuator through a universal joint, and the other end connected to the direction adaptation apparatus 3.

A function of the force application apparatus is to provide a suitable force or moment for a swinging actuating cylinder.

The tension spring may use a combined spring or a parallel spring to reduce spring volume and length, and increase energy density.

3. The direction adaptation apparatus 3 includes a universal hinge (or a universal pulley) and two external connection units IIIA 3.1 and IIIB 3.4. The universal joint includes two revolute joints: a revolute joint A 3.2 and a revolute joint B 3.3. In this embodiment, the two revolute joints A and B are orthogonal in opposite planes (in coplanar orthogonality when a spacing is e2 and e2 is 0), to form one universal joint. One end 3.1 of the external connection unit of the direction adaptation apparatus 3 is connected to an upper end of the base frame, and the other end 3.4 is connected to the force application apparatus. The function of the direction adaptation apparatus 3 is to provide a working space with two degrees of freedom for the swing of the force application apparatus and the actuating cylinder. The two revolute joints of the universal joint cooperate with each other to adapt to changes in a pitch angle and yaw angle of the actuating cylinder.

4. Universal Swing Rod Apparatus

The universal swing rod apparatus 4 includes a universal hinge (or a spherical pair) 4.2, a connection rod 4.3, an external connection unit IVA 4.1, and an external connection unit IVB 4.4. The universal joint is connected with the connection rod, and the connection rod apparatus may be replaced by a cylinder body of the actuating cylinder (it may be achieved in various embodiments). There is a revolute joint installation seat on the connection rod (or a cylinder barrel), and a position (Ala) of the installation seat on the connection rod may be adjusted to change a size of R1 (for R1, refer to FIG. 1). There are various connection rods, please refer to Embodiments 1, 2, 9 and 14. The 4.4*b* piston rod in the figure is an external connection unit.

The function of the universal swing rod apparatus 4 is to connect the foundation platform, connect the force application apparatus, provide a swing working space with two degrees of freedom (or three degrees of freedom) for the actuating cylinder, and form a whole with the parallel mechanism.

The type of the universal hinge includes, but is not limited to: RR, U, RU, UR, RUR, S, etc.

5: Integral external connection apparatus includes a connection apparatus VA 5.1 of the base frame, and a connection apparatus VB 5.2 of the force application apparatus connected with the cylinder barrel or the piston rod.

Function: fixing the entire apparatus and being connected with the mission load, that is, connected with the actuating cylinder or the piston rod, and form a whole with the actuating cylinder or the parallel mechanism.

The base frame 1, the force application apparatus 2, the direction adaptation apparatus 3, and the universal hinge swing rod apparatus 4 form a closed loop (the foundation is a large component), and all components cooperate with each other to complete the synchronous motion of each component, and complete the task of applying appropriate anti-gravitational moment and weight compensation. When applied to a 6-UPS parallel mechanism, each branch linkage requires one such closed-loop mechanism.

This closed loop is a special parallel mechanism with two degrees of freedom, and its motion platform is a swing connection rod. The particularity of the mechanism is to eliminate or partially eliminate the moment formed by the gravity acting on the connection rod, and/or balance a portion or more weight of the actuating cylinder or moving platform.

A1*a* in the figure is a design connection point between the force application apparatus and the actuating cylinder, while A2*a* is a design connection point between the force application apparatus and the direction adaptation apparatus.

Unspecified annotations refer to the annotation instructions.

The following are several problems involved in the embodiments.

The parallel mechanism described in the specification is a parallel mechanism with 2-6 degrees of freedom and with at least one branch linkage being a UPS branch linkage.

FIG. 1.1 is a schematic diagram of a 6-UPS type parallel mechanism with six degrees of freedom. Six UPS branch linkages 7.3 are connected to the foundation platform 7.2, connection points form a hexagon, an interior of the hexagon is called the inner, and upper ends of the six UPS branch linkages 7.3 are connected with the motion platform 7.4.

The universal hinge connected with the foundation platform is called a foundation platform universal hinge 7.3*a*. Due to the fact that the most commonly used universal hinge in the specification is the foundation platform universal hinge, it is usually referred to as the universal hinge. (To avoid confusion, the connection apparatus in the direction adaptation apparatus or the force application apparatus is called a universal joint.)

The universal hinge connecting the branch linkage 7.3 to the motion platform is called a motion platform universal hinge, and connection points usually form a hexagonal (triangle, quadrangle, and pentagon are also acceptable).

The space enclosed by two hexagons and six branch linkages is called the inner, and the corresponding exterior is called the outer.

An outer side of a certain universal hinge means a vicinity of the universal hinge, rather than the outer side of another universal hinge.

The installation of a basic apparatus usually refers to the interior and exterior of the foundation platform plane.

For the working space of the actuating cylinder, the actuating cylinder on the branch linkage (a sliding pair, or a cylindrical pair, or a spiral pair) has a pitch working space, usually in a certain range of 0 to 90 degrees (refer to FIG. 1.2), and has a yaw working space. The yaw working space is also around 110 degrees (refer to FIG. 1.3). The working space depends on geometric parameters of the motion platform, and the working space parameters vary depending on the structure.

The Establishment of a Coordinate System

The establishment of the coordinate system uses a horizontal plane as an xy plane. The upward direction is taken as a positive direction of a Z axis, and an origin is taken at the center of the first revolute joint of the UPS branch linkage.

FIG. 1.2 is a schematic diagram of a force principle for eliminating the gravitational moment of an actuating cylinder of an inclined hinged support, and is a side view. L1 is an initial position of an axis of the actuating cylinder at a minimum pitch angle, while L3 is a maximum pitch angle of the axis of the actuating cylinder. The difference between two angles is a pitch working range am of the actuating cylinder. A gravity G0 is acted on or near the axis of the actuating cylinder, and the gravity forms gravitational moment on a coordinate origin O. The gravitational moment will form an additional positive pressure, or lateral force, at a piston and a cylinder head.

A1 is a theoretical connection point between the force application apparatus and the cylinder barrel, and A2 is another theoretical connection point of the force application apparatus (a connection point with the direction adaptation apparatus). The tension spring applies a force to the actuating cylinder, and a component force of the force forms moment on the point O (horizontal axis), called the anti-gravitational moment. When the gravitational moment and the anti-gravitational moment reach a certain balance or basic balance, the positive pressure acting on the cylinder barrel and piston is minimum or relatively small.

A distance between a vertical line passing through a point A2 and a vertical axis of the coordinate system is called eccentricity e1. When the eccentricity e1 is zero, that is, when A2 is on the Z axis, a balance error of the anti-gravitational moment is minimum, and when the eccentricity e1 is large, some branch linkage balance errors will be formed.

The change law of the gravitational moment is that the greater the included angle between the axis of the actuating cylinder and the vertical axis, the greater the gravitational moment. When it reaches 90 degrees, the gravitational moment reaches the maximum, and the middle part is sinusoidally changed or approximately sinusoidally changed, referring to FIG. 10.3. A curve in FIG. 10.3 is a sine curve.

FIG. 1.3 is a top view that represents a yaw range of the actuating cylinder. Due to the eccentricity e1 not being 0, the anti-gravitational moment forms an applied moment around the z axis on the point O (it can be seen that when the eccentricity is zero, the moment is zero). The greater the eccentricity, the greater the moment. The moment is not expected. The smaller the moment, the better. When performing dynamic analysis, it is necessary to consider the impact of the moment on the motion of the motion platform. At the same time, the eccentricity also has an impact on the anti-gravitational moment, and may cause errors (but very small).

In FIG. 1.2 and FIG. 1.3, F0 is a spring force, F1 is a projection of F0 on the axis of the actuating cylinder, and F2 is a projection of F0 in a vertical direction (in a plane between F0 and F1) of the axis of the actuating cylinder. F3 is a projection of F0 in a direction perpendicular to F0 and F1.

In a case of having a pallet, the case shown in FIG. 1.3 does not occur. At this time, in the top view, a point D2 is located on an extension line of the axis of the actuating cylinder, which means there is no applied moment around the z axis (F3=0). This is the advantage of the solution having the pallet, but the disadvantage of the solution of having the pallet is that it has a relatively large moment of inertia.

FIG. 1.4 is a cross-sectional view of the actuating cylinder, which express the relevant dimensions of the actuating cylinder and the range of motion of the piston rod.

Lmin is a position of the piston at 0 displacement. Under a natural circumstance, the positive pressure is minimum at this time.

Lmax is a position of the piston at maximum displacement. Under a natural circumstance, the positive pressure is maximum.

Lx is a distance between the piston position and a center of the universal hinge. When Lx=Lmin+0.5 (Lmax-Lmin), it is called a neutral position of the piston or a neutral position of the actuating cylinder. The gravitational moment at the neutral position of the piston may be used as a design point for the anti-gravitational moment.

L0 is a minimum spacing between a center of the universal hinge of the foundation platform of a branch linkage and the center of the universal hinge of the motion platform.

Structure of force application apparatus and the connecting apparatus of the actuating cylinder (see FIG. 1.5 to FIG. 1.9)

FIG. 1.5 is an external connection unit 2.4 with two rotational degrees of freedom, and FIG. 1.6 is an external connection unit 2.4 with three rotational degrees of freedom. This is a hollow universal joint of a universal joint type 2.4*a*. A connecting pipe 2.4*d* is used for being connected with the cylinder barrel. 2.4*i* is a U-shaped fork. 2.4*e* is a hollow cross shaft. 2.4*b* is a shackle-type external connection unit.

A connecting pipe 2.4*d* in FIG. 1.5 is connected with the hollow universal joint, and the other end of the connecting pipe 2.4*d* in FIG. 1.6 is connected with a hollow three-axis orthogonal spherical hinge.

FIG. 1.5 and FIG. 1.6 are the hollow universal joint. A hollow-axis revolute joint adapts to the rotation of the actuating cylinder, while the other revolute joint of the hollow universal joint adapts to the direction change of the force application apparatus. There are two force application apparatuses arranged on two sides of the actuating cylinder. Arranging the springs on both sides (including the combined spring) can reduce the length of the spring (when there is no pulling force). One end of the force application apparatus is connected to an actuating cylinder connection rod apparatus 2.3.

FIG. 1.7 is another type of connection apparatus. The external connection unit 2.4 is connected to the cylinder barrel 4.3*d* with bolts and is fixed together with the connection rod. The cylinder barrel 4.3*d* in the middle is fixedly connected with the connecting pipe (plate) 2.4*d*. The connecting pipe (plate) 2.4*d* is connected with the universal joint type 2.4*a* and a shackle-type universal joint 4*b*. Two rings are movably connected with each other to form one universal joint.

FIG. 1.8 is a flexible external connection unit 2.4. The two sides of the cylinder barrel 2.4*d* are fixedly connected with two coaxial shafts, two shackles 2.4*b* are connected to each shaft. A section of the cable 2.4*f* is equipped with a hook at the end, which is connected with the two rings. The cable 2.4*f* forms an inverted V shape, and the cable is in cooperation with a pulley 2.4*b*. The pulley is connected with the cable, and the cable moves in a groove. The pulleys moving on the cable form a flexible revolute joint that rotates around the axis of the actuating cylinder, thereby forming a spherical hinge function.

FIG. 1.9 is another shackle-type external connection unit 2.4. The connecting pipe (plate) 2.4*d* is fixedly connected to the cylinder barrel 4.3*d* with bolts. The upper part of the connecting pipe (plate) 2.4*d* is equipped with a shackle, forming a shackle-type 2.4b universal joint type 2.4*a* external connection unit (spherical hinge type).

FIG. 1.10 is a four-axis orthogonal spherical hinge. An axis of a first revolute joint 4.2*a* is perpendicular to the ground, and an axis of a fourth revolute joint 4.2*d* coincides with an axis of the cylinder barrel. The axes of the second revolute joint and the third revolute joint are coplanar or out-of-plane orthogonal, to form a universal joint 4.2*e*. This is a symmetrical four-axis orthogonal spherical pair. The first revolute joint or the fourth revolute joint is removed to create a three-axis orthogonal spherical pair.

Type of the universal hinge (used by the universal swing connection rod)

The type of the universal hinge includes, but is not limited to: RR, U, RU, UR, RUR, and S. RUR is a symmetrical orthogonal spherical hinge (see FIG. 1.10), an R axis of the first revolute joint is perpendicular to the foundation platform plane, and R axes of the subsequent revolute joints coincide with the axis of the actuating cylinder. For the RU universal spherical hinge, an R axis of the first revolute joint is perpendicular to the foundation platform plane, and an R axis of the revolute joint behind the UR spherical hinge coincides with the axis of the actuating cylinder.

The axes of the two revolute joints of the universal hinge are generally orthogonal, and the orthogonal (out-of-plane or coplanar) mode is the optimal mode. In theory, as long as it is not parallel, it may be acceptable. Therefore, the present invention also includes other non parallel cases.

Selection of Design Points for Gravitational Moment

For the gravitational moment: a maximum gravitational moment Mmax, a minimum gravitational moment Mmin, a cylinder barrel gravitational moment Ma, and the gravitational moment is a gravitational moment formed by the weight of the actuating cylinder and the additional weight about the point O (the center of the universal hinge or horizontal axis). Due to the movement of the piston rod, the gravitational moment is a variable.

In general, the center of gravity of the actuating cylinder is located on the axis of the actuating cylinder, and at this time, the gravitational moment changes in a sine curve with the pitch angle. However, in some cases, the center of gravity may deviate from the axis, for example, an electric cylinder where a motor is not directly connected with the cylinder barrel (H-type or L-type connected electric cylinder, and the motor located on one side of the cylinder barrel). At this time, the change of the gravitational moment with the pitch angle deviates from the sine curve (the 0 acting force point of the force application apparatus may be adjusted when the requirement is high, for example, at the maximum pitch angle, the anti-gravitational moment is taken as 0).

Not all the weight of the entire branch linkage will form the gravitational moment.

Maximum angular gravitational moment M: When the axis of the actuating cylinder is perpendicular to the ground or at a small angle, the gravitational moment is 0, which is the maximum angular gravitational moment. The force provided by the force application apparatus at or near this point is zero. If there is prestress, it may be approximated as 0.

Minimum angular gravitational moment M: When the axis of the actuating cylinder is horizontal, the gravitational moment is maximum, which is called the minimum angular gravitational moment. When the axis of the actuating cylinder is at the minimum pitch angle, it is called the minimum pitch angle gravitational moment.

The cylinder barrel gravitational moment Ma is the gravitational moment formed by the cylinder barrel weight of the actuating cylinder to the point O, which is called the cylinder barrel gravitational moment Ma. When the axis of the actuating cylinder is horizontal, the gravitational moment formed by the weight of the cylinder barrel is called the cylinder barrel maximum gravitational moment.

Maximum displacement gravitational moment of the piston of the actuating cylinder: when the actuating cylinder reaches its maximum length (Lx=Lmax), the gravitational moment formed by the weight of the actuating cylinder to the point O is called the maximum displacement gravitational moment of the piston of the actuating cylinder. When the axis of the actuating cylinder is horizontal, the gravitational moment is maximum, which is called the maximum displacement maximum gravitational moment Mm.

Non-displacement gravitational moment: When Lx=Lmin, the gravitational moment formed by the weight of the actuating cylinder to the point O is called the non-displacement gravitational moment; and the axis of the actuating cylinder is horizontal, and the non-displacement gravitational moment is maximum, which is called the non-displacement maximum gravitational moment Ms.

G1: the weight of the portion of the actuating cylinder that forms the gravitational moment on O, (excluding a weight of a material on a left side of the point O in FIG. 1.4 and a weight balanced by this portion), G2, the weight of the piston rod (excluding a weight of a material on a right side of the point O in FIG. 1.4 and a weight balanced by this portion).

$R_0$ is a distance from the center of gravity of the actuating cylinder to a hinged support point of the actuating cylinder when the piston rod displacement is 0 (Lx=Lmin).

The design point Ms of the anti-gravitational moment is between 80% Mmax and 120% Mmax, both of which have good positive pressure elimination precision and significant weight compensation performance. For example, Ms=90% Mmax (minimum positive pressure, slightly less weight compensation) is taken, or Ms=110% Mmax ((slightly greater positive pressure, slightly greater weight compensation) is taken, or, Ms=0.5 (Mmax+Mmin), or Ms=Ma is taken, and engineering issues allow for an error of plus or minus 3% or greater).

When the design point of the anti-gravitational moment is located in the neutral position of the piston and the piston displacement is zero, the anti-gravitational moment will be too large.

When the piston displacement is maximum, the anti-gravitational moment will be too small and there will be residual positive pressure. When the design point of the anti-gravitational moment is appropriately selected, and the piston is located at both ends, the residual positive pressure at both ends is equal or basically equal. This is a characteristic of the optimal design point. The design point of the anti-gravitational moment is located within a small neighborhood of the neutral position of the piston, and the optimal design point will be obtained.

Spring stiffness: It is related to spring deformation Ls and the design point of the gravitational moment (i.e. how much gravitational moment is eliminated).

The deformation of the spring is related to the pitch working space and the positions A1*a*, e1 of the connecting end. The distance between the center O of the universal hinge and a connection point A1*a* is an actual moment arm length R1 of the anti-gravitational moment, and a distance from the horizontal-axis connection point (or an intersection point of the cross shaft) of the force application apparatus and the direction adaptation apparatus to the center O of the universal hinge is R2. R1 and R2 are basically equal. A maximum value of the distance between two connecting endpoints is Ls. Ls is the deformation of the force application apparatus. The actual deformation length is taken to be slightly greater than Ls.

When the actuating cylinder is horizontal, the force application apparatus can meet the design requirements and balance sufficient (to meet the design requirements) gravitational moment. When the actuating cylinder is vertical, the anti-gravitational moment of the force application apparatus is 0, or basically 0.

Eccentricity e1 (FIG. 1, FIG. 2, etc.) is the distance between the vertical axis of the direction adaptation apparatus (or a perpendicular line passing through the horizontal-axis connection point) and a perpendicular line passing through the center of the universal hinge. e1 is greater than or equal to zero. When the pitch working space of the actuating cylinder is small, e1 may be equal to zero.

The effect of eccentricity: an eccentricity greater than zero can make the force application apparatus to obtain a relatively large effective working space, but the force application apparatus will generate the moment rotating around the vertical axis on the actuating cylinder. The greater the eccentricity, the greater the generated moment rotating around the vertical axis. When performing dynamic analysis, it is necessary to consider the moment. (Refer to F3 in FIG. 1.3.) There is no force F3 in the solution with the turntable bearing.

A working process of Embodiment 1: When the actuating cylinder is subjected to pitch change, if the pitch angle decreases, a length of the cable increases, the pulling force of the tension spring increases, and the anti-gravitational moment increases. Otherwise, if the pitch angle increases, the anti-gravitational moment decreases. The change means a sinusoidal change or a basically sinusoidal change. When the actuating cylinder is subjected to a yaw motion without changing the pitch angle, the length of the cable remains unchanged, and the anti-gravitational moment remains unchanged or changes within the error range. Under the action of the actuating cylinder, the tension spring is subjected to the yaw motion following the actuating cylinder and meanwhile drives the direction adaptation apparatus to rotate around the vertical axis. The working processes of other embodiments are largely identical but with minor differences and will not be repeated unless there are any special circumstances.

Embodiment 2

Please refer to FIG. 2, FIG. 2.1, FIG. 2.2, FIG. 2.3, and FIG. 2.4. The structural form of Embodiment 2 is a closed loop, has no pallet, and has tension springs on two sides, and an upper end of a cable spring is installed within a spring installation cylinder 2.2*h*.

Compared with Embodiment 1, Embodiment 2 has two changes. One is that the base frame 1 is a rigid structural frame with an adjustable dimension, and the other is that there are some changes in the force application apparatus. The integral structure is similar to that of Embodiment 1.

The base frame 1 is the rigid structural frame with the adjustable dimension, the lower part of the base frame is provided with a foundation installation seat 1.1, and the upper part of the base frame is provided with an external connection unit 1.3. The middle part of the base frame is a main frame 1.2, used for bearing force. The base frame 1 provides a suitable installing point for the direction adaptation apparatus and the force application apparatus. The upper-lower dimension and left-right dimension (height and width) of the main frame 1.2 may be adjusted. After adjustment, the main frame may be re-fixed as a rigid frame. After adjustment, the main frame may adapt to parallel mechanisms of different structural dimensions.

The force application apparatus 2.2 of the force application apparatus 2 is two sets of tension springs 2.2*a*, which are arranged on both sides of the actuating cylinder (as seen from the top view), and the force transmission apparatus 2.3 is a spring seat 2.3*d* connected by a spherical hinge. One end of the external connection unit 2.1 is connected to the direction adaptation apparatus, and the other end 2.4*d* is connected to the connection rod 4.3*a*.

FIG. 2.1 is a combination of the force application apparatus (a part thereof) and the direction adaptation apparatus. One end of the cable spring is fixedly connected inside a cylinder, and when being in a free state, the whole or most of the spring is inside the cylinder. A horizontal-axis connecting axis of the cylinder and the force application apparatus is located at one fixed end of the cylinder far from the spring. The spring (or most of the cylinder) is located outside the pitching working space of the actuating cylinder. A larger working space is made for the actuating cylinder. e1 is usually small (such as less than 10% of the length of the actuating cylinder) or is zero (e2, and e3 are also the same).

FIG. 2.2 is a combination of a force application apparatus composed of two cylindrical springs, as well as the direction adaptation apparatus and the cylinder barrel. The horizontal axis of the direction adaptation apparatus has two U-shaped forks respectively located on both sides of its vertical axis, and one cylindrical spring is connected to one U-shaped fork. The end connected with the actuating cylinder is connected with the rod on the connecting pipe through a universal joint. The connection rod is connected with the cylinder barrel through one revolute joint.

The spring of the force application apparatus is installed at the bottom of the spring installation cylinder, which is also conducive to synchronous motion. The spring installation cylinder 2.2*f* serves as the force transmission apparatus to be connected with the direction adaptation apparatus 3 or the actuating cylinder. The spring installation cylinder may rotate around the horizontal axis 3.3 of the direction adaptation apparatus 3. The undeformed spring contracts into the spring cylinder, while the spring cylinder is mostly located on the outer side of the pitch working space. The other end of the force application apparatus is connected to the actuating cylinder of the actuating cylinder connection rod.

The springs on both sides may be applied with the combined spring or four spring cylinders on both sides, which may further reduce the length of the springs, increase the pitch working space, and reduce the eccentricity e1.

3. The direction adaptation apparatus 3 includes an eccentric universal joint and two end connection apparatuses IIIA and IIIB. The axis of one revolute joint 3.2*c* is perpendicular to the ground, the axis of one revolute joint 3.3*c* is horizontal, and the two revolute joints are out-of-plane orthogonal. The distance between the axes of the two revolute joints is e2, which is called an eccentric distance e2. The output end of the horizontal revolute joint has two U-shaped frames, and one U-shaped frame is installed with a spring installation cylinder 2.2*h*. The axis of the revolute joint is horizontal and the revolute joint is a revolute joint 3.3 of the direction adaptation apparatus. Usually, the moment formed by the springs on both sides on the revolute joint perpendicular to the axis is the same. If the pulling forces on both sides are different, different moment arms may be taken. An opening of the spring installation cylinder is in a shape of trumpet.

4. Universal Swing Rod Apparatus

The universal swing rod apparatus includes a universal hinge (or a spherical pair) 4.2, a connection rod 4.3*a*, an external connection unit IVA 4.1, and an external connection unit IVB 4.4*a*. The universal joint is connected with the connection rod, and the connection rod apparatus (FIG. 2.3) has two spherical hinge installation seats, for being connected with the force application apparatus.

A position of the installation seat on the connection rod may be adjusted to change a size of R1 (for R1, refer to Embodiment 1 and FIG. 1). There are various connection rods, please refer to Embodiments 1, 2, 8 and 14.

The function is to connect the foundation platform, connect the force application apparatus, connect the actuating cylinder, provide a swing working space with two degrees of freedom (or three degrees of freedom) for the actuating cylinder, and form a whole with the parallel mechanism.

FIG. 2.3 is a structure of the connection rod and has a connecting seat. The connecting seat on the right side in the figure is connected with the universal hinge, and the connecting seat on the left side is connected with a cylindrical spring.

The actuating cylinder connection rod apparatus may be replaced by the actuating cylinder (it may be achieved in various closed-loop embodiments). There is a revolute joint installation seat on the connection rod, and a position of the installation seat on the connection rod may be adjusted to change a size of R1.

5: Integral external connection apparatus includes a connection apparatus VA of the base frame, and a connection apparatus VB 5.2 of the cylinder barrel or the piston rod. It is similar to that of Embodiment 1.

Installation: the base is installed on the outer side of the universal hinge. (Regarding the outer side and the inner side, see the previous definition.) The connection point between the force application apparatus and the frame is located above the universal hinge. When there is eccentricity between the springs on the left and right, there is a revolute joint that turns around the actuating cylinder as the connecting apparatus. When the eccentricity is relatively small, the deformation of the spring itself may also meet the requirements. The presence of the eccentricity may distort the planes of the two springs. However, the distortion is small and does not affect usage.

For the determination of spring stiffness and installation dimensions, please refer to Embodiment 1.

Improvement 1 of Embodiment 2

In order to provide greater pitch working space for the actuating cylinder, there is a spring cylinder at each end of each set of springs. The springs are applied with the combined springs. The eccentricity is small. When the pitch angle is maximum, the springs may all be located inside the spring cylinders at both ends.

Improvement 2 of Embodiment 2: Based on Embodiment 2, the force application apparatus is composed of a tension spring and a cable connected in series. The two are connected to form one force application apparatus. Each side of the two springs has one cable, and the cable is connected with a connecting shaft to form a flexible revolute joint, referring to FIG. 2.4.

FIG. 2.4 is a schematic diagram of a flexible revolute joint 3.3*a* of the direction adaptation apparatus 3. The horizontal revolute joint 3.3 of the direction adaptation apparatus 3 is replaced by the flexible revolute joint. The horizontal revolute joint is a partial groove wheel fixed on the vertical axis, in cooperation with the cable to form one flexible revolute joint that adapts to changes in pitch angle.

The changes in the direction adaptation apparatus are as follows: the horizontal-axis revolute joint of the direction adaptation apparatus becomes one flexible revolute joint 3.3*a*. The horizontal axis is jointly completed by a fixed wheel with a groove and a section of the cable 2.3*a*. The axis of the fixed wheel with the groove 3.3*a* is horizontal and is fixed at an output end of the vertical axis. The cable is fixed to the wheel through a groove. The cable may be wound in the groove, so as to form the flexible revolute joint. The connection between the force application apparatus and the actuating cylinder is also completed by providing a cable and pulley connection to form a flexible motion pair.

For others, please refer to Embodiment 2. For the determination of spring stiffness and installation dimensions, please refer to Embodiment 1.

Embodiment 3

Please refer to FIG. 3, FIG. 3.1, and FIG. 3.2. This is a solution of a closed loop, having no turntable bearing, having a cable not subjected to turning, and having a torsion spring generating a pulling force.

Compared with Embodiment 1, Embodiment 3 shows only changes in the force application apparatus 2. The force generation apparatus 2.2*b* of the force application apparatus is changed into the torsion spring, and the torsion spring generates the pulling force. The force transmission apparatus 2.3*a* uses a cable assembly. The torsion spring is installed above the universal hinge and connected to the connection rod through the cable. One end of the cable of the force transmission apparatus is connected to the torsion spring, and the other end is connected to an actuating cylinder connection rod 4.3*a* through a connecting apparatus 2.4*a*. The horizontal axis of the direction adaptation apparatus coincides with the axis of the torsion spring, and the two share one revolute joint.

The torsion spring is installed on the horizontal axis above the direction adaptation apparatus 3, and the torsion spring rotates to generate the pulling force. The torsion spring rotates along the vertical axis of the direction adaptation apparatus to adapt to the yaw motion of the actuating cylinder. There are various structural forms of the torsion spring, referring to FIG. 3.1 and FIG. 3.2. The force adjustment apparatus 2.5 may change a pulling force degree of the cable and the magnitude of the initial pulling force. Generally speaking, the initial pulling force is equal to or close to zero. The initial pulling force corresponds to the axis of the actuating cylinder being perpendicular or nearly perpendicular.

The connection position between the connecting seat and the pendulum rod may be adjusted. That is, a distance between A1*a* and the universal hinge is changed.

There are various structures of the torsion spring, for example, a single torsion spring, a multi-torsion spring, and a combined torsion spring (the two torsion springs with different diameters are nested within each other). FIG. 3.1 and FIG. 3.2 are torsion springs with two structures.

FIG. 3.1 is a schematic diagram of a torsion spring force generation apparatus. The two torsion springs 2.2*b* are placed in bilateral symmetry, the torsion springs are wound around a fixed shaft 2.21, and the fixed shaft is fixed on a torsion spring installation seat 2.2*f* or a foundation. One end of the torsion spring is fixed on the base, and the other end is connected to a rotating cylinder 2.3*i*. The fixed axis and an axis of the cylinder overlap, and the cylinder may rotate around the fixed axis to form one revolute joint. FIG. 3.2 uses one torsion spring. The rest are the same as FIG. 3.1.

One end of the rotating cylinder is in wound connection with one cable. The cable is wound around the rotating cylinder. The cable is pulled, the rotating cylinder rotates, and the torsion spring twists to generate the pulling force. The cable passes through a hollow shaft of the direction adaptation apparatus to bypass the groove wheel, and is connected to the actuating cylinder.

The force transmission apparatus includes the cylinder and the cable. The fixed shaft is sleeved with the cylinder. The two cylinders may rotate around the same axis. The outer cylinder may rotate around an axis of the fixed shaft. The cylinder coincides with the horizontal axis of the direction adaptation apparatus, and the cylinder is fixed on the horizontal axis of the direction adaptation apparatus. One end of the torsion spring is fixed on a fixed cylinder or base, and the other end of the torsion spring is fixed on the rotating cylinder. When the rotating cylinder rotates, the torsion spring rotates accordingly. One cable is connected to the rotating cylinder. The cable is wound around the rotating cylinder. The cable is pulled, and the torsion spring rotates to generate the pulling force. The force generation apparatus is located outside the pitch working space, which is beneficial for the working of the branch linkage.

A working process of Embodiment 3: when the actuating cylinder is subjected to pitch change and the pitch angle decreases, a length of the cable increases, the pulling force of the torsion spring increases, and the anti-gravitational moment generated by the torsion spring increases. Otherwise, if the pitch angle increases, the anti-gravitational moment decreases. When the actuating cylinder is subjected to a yaw motion without changing the pitch angle, the length of the cable remains unchanged, and the anti-gravitational moment remains unchanged or changes within the error range. Under the action of the cable, the torsion spring is subjected to the yaw motion with the actuating cylinder (the cable rotates around the vertical axis of the direction adaptation apparatus).

Embodiment 4

Please refer to FIG. 4, based on Embodiment 3, after changing the direction of the cable through a pulley, the force application apparatus is installed on a bottom surface of the base frame or a foundation.

1. The base frame 1 is the rigid structural frame, the lower part of the base frame is provided with an external connection unit IA 1.1, and the upper part of the base frame is provided with an external connection unit IB 1.3 for installing the direction adaptation apparatus. The main frame is a component 1.2*a* with an adjustable length. The base frame is basically the same as that of Embodiment 2.

2. The force generation apparatus 2.2 of the force application apparatus 2 is a tension spring 2.2*a*, and the force transmission apparatus 2.3 is a cable apparatus 2.3*a*. One end of the cable 2.3*a* of the force application apparatus is connected to the cylinder barrel of the actuator, and the other end is connected to the lower part of the base frame after changing direction through the pulley of the direction adaptation apparatus 3. The direction adaptation apparatus 3 is located above the universal hinge. The cable is connected to the actuating cylinder through the groove of the pulley of the direction adaptation apparatus 3. A section of A1*a* connected with the actuating cylinder in the pulley is called a first section, and the pulley determines a direction of the first section of the cable. A section after the pulley changes the direction by passing through the direction adaptation apparatus is called a second section. The axis of the second section of the cable is perpendicular to the ground (with an allowable error of about 10 degrees). In order to meet the requirements of the working space, the force generation apparatus may be installed below the ground surface. The spring in the figure is installed in a spring cylinder for easy installation. The spring cylinder is installed below the base frame. The second section of the cable may rotate around its own axis, so as to isolate the yaw motion of the actuating cylinder. In FIG. 4, R1 and R2 are equal (ignoring minor changes in R2). A2*a* is located on an arc of the horizontal-axis pulley.

For the convenience of pre tightening the force application apparatus or changing the initial force of the force application apparatus, an adjustment apparatus is set up. This embodiment uses a gasket 2.5 as the adjustment apparatus.

3. The direction adaptation apparatus is a universal pulley with eccentricity e3. The axis of the revolute joint A3.2 of the direction adaptation apparatus is basically perpendicular to the ground (with an allowable error of about 10 degrees), used for adapting to the yaw angle. The axis of the other revolute joint B3.3 is parallel to the ground (located below the other revolute joint) to adapt to the pitch angle. There is a pulley on the horizontal axis, with a groove on the pulley. That is, the horizontal revolute joint of the direction adaptation apparatus is a pulley. The cable changes the direction through the pulley. During work, the actuating cylinder swings in yaw, the pulley swings, and the second section of the cable rotates around its own axis. The axis of the second section of the cable basically coincides with the vertical axis of the direction adaptation apparatus.

The direction adaptation apparatus has connecting apparatuses, one is connected with the base frame and the other is connected with the force application apparatus.

4. For a universal hinged support swing rod apparatus 4 (represented by a dashed line in FIG. 3), please refer to Embodiment 1.

The actuating cylinder connection rod apparatus 4 includes an actuating cylinder barrel 4.3*d* and a universal hinge 4.2*e*. In this embodiment, the actuating cylinder barrel replaces the connection rod apparatus. In FIG. 4, the dashed line portion is deleted and replaced with an open loop embodiment.

5. The integral external connection apparatus 5.1 is installed on the ground foundation platform, and 5.2 is connected with the platform or piston rod (mission load).

Explanation of Several Design Issues:

For R1 and R2, the difference between R2 moment arm and Embodiment 1 is that because A2*a* is located on the arc of the pulley, an intersection point between the cable and the arc will change with the pitch angle. But the changes are small and can be ignored.

A distance between the center O of the universal hinge and the connection point A1*a* connected with the actuator is R1, and a distance between the horizontal axis pulley of the direction adaptation apparatus and a tangent point A2*a* of the first section of the cable is R2. R1 and R2 are basically equal. A maximum distance between A1*a* and A2*a* is a maximum deformation of the tension spring. A1*a* is located on an upper part of the actuating cylinder. There may be some minor errors, but they are acceptable.

For selection of the gravitational moment at the design point, please refer to Embodiment 1. For spring stiffness and spring deformation, please refer to Embodiment 1. In this embodiment, the gravitational moment at the neutral position of the piston is selected as the design point.

The vertical axis of the direction adaptation apparatus basically coincides with the axis of the second section of the cable.

Eccentricity e2 is a distance between the perpendicular line of the horizontal-axis connection point passing through the direction adaptation apparatus (provide a definition) and a perpendicular line passing through the center of the universal joint. e2 is greater than or equal to zero.

The effect of eccentricity e1: generally speaking, the pitch angle working space of the actuating cylinder is between 70 degrees and 80 degrees. Due to the installation of the force application apparatus on this space sector, the force application apparatus has a fixed length, which occupies the working space of the actuating cylinder. The eccentricity greater than zero can increase the effective working space of the actuating cylinder.

Embodiment 5

Please refer to FIG. 5, Embodiment 5 is basically the same as Embodiment 4, with the main change being that the force generation apparatus of the force application apparatus is changed into a torsion spring, the torsion spring generates a pulling force, and the direction adaptation apparatus is adjusted appropriately.

1. The base frame is basically the same as that of Embodiment 4, and will not be repeated.

2. The force application apparatus includes two parts, namely, the force generation apparatus and the force transmission apparatus. The force generation apparatus uses the torsion spring to generate a pulling force, and the force transmission apparatus is the same as that of Embodiment 4, and uses cable transmission. The torsion spring is installed below the universal joint (the direction adaptation apparatus). The axis of the second section of the cable is perpendicular to the horizontal plane (with appropriate error allowed).

The structure of the torsion spring refers to FIG. 3.1 and FIG. 3.2, and refers to Embodiment 3.

3. The direction adaptation apparatus 3 is similar to that of Embodiment 4. The difference is that the vertical axis is located below the horizontal axis, the vertical axis is hollow, and the cable passes through the center of the hollow axis. The pulley is provided with the groove, and the cable is wound inside the groove. A radius of the cable wound around the pulley is equal to or basically the same as e2. When the pulley swings, the hollow shaft rotates together to adapt to the yaw angle. The second section of the cable (a section connected with the force application apparatus) is always located in a hole of the hollow shaft. The actuating cylinder swings, and the pulley swings accordingly. The second section of the cable only twists to isolate the swing of the actuating cylinder. The torsion spring has only one rotational degree of freedom.

4. The universal swing rod apparatus 4 adopts a universal hinge being out-of-plane orthogonal, and the axis of the first revolute joint is perpendicular to the horizontal plane. There is eccentricity e3 between the two centers, which provides a large pitch space. The connection rod 4.3 uses a cylinder barrel.

The stiffness of the torsion spring is determined based on parameters such as pulling force and radius of the torsion spring. For the determination of spring stiffness and installation dimensions, please refer to Embodiment 1.

Improvement 1 of Embodiment 5

The torsion springs are installed on both sides and occupy a large space, and the installation of two adjacent UPS branch linkages may cause interference. It may be changed to placing the two springs on the same side. One spring has a larger diameter, the other has a smaller diameter, and the spring with the smaller diameter is relatively long. The two springs are nested together. One ends of the two torsion springs are fixed on the base, and the other ends are fixed to a rotating cylinder. There is still one cable. In this way, there is no torsion spring on the other side, and there is no disturbance space. The two adjacent UPS branch linkages are installed relatively close.

Working Process of Embodiment 5 the working process of Embodiment 5: when the actuating cylinder is subjected to pitch change and the pitch angle decreases, a length of the cable increases, the torsion spring rotates, the pulling force increases, and the anti-gravitational moment generated by the torsion spring increases. Otherwise, if the pitch angle increases, the anti-gravitational moment decreases. When the actuating cylinder is subjected to a yaw motion without changing the pitch angle, the length of the cable remains unchanged, and the anti-gravitational moment remains unchanged or changes within the error range. The actuating cylinder swings in yaw, the first cable swings and the second section of the cable rotates around its own axis, isolating the swing of the actuating cylinder. Therefore, the torsion spring is fixed on the base frame or the ground, and does not swing with the actuating cylinder.

Embodiment 6

Please refer to FIG. 6, this embodiment is a solution of a closed loop, having no pallet, and an ordinary tension spring cable turning for a second time. Compared with Embodiment 4, the cable changes the direction for the second time, and the axis of the tension spring is installed horizontally. The rest are similar to those of Embodiment 4.

1. The basic frame is similar to that of Embodiment 4, with the main changes being that a reversing pulley (or pulley block) is installed in the lower part, a protective cover is also installed in the lower part, and a protective cover is also installed in the direction adaptation apparatus on the upper part.

2. A pulley 2.3*e* (or pulley block) is added to the lower part of the force application apparatus. The cable changes the direction for the second time after passing through the pulley 2.3*e*. The pulley (or pulley block) is used for turning the cable for the second time. The cable changes the direction through a horizontal axis pulley of the direction adaptation apparatus, so as to form the second section of the cable. The axis of the second section of the cable (between the pulley 2.3*e* and the horizontal axis pulley of the direction adaptation apparatus) is perpendicular to the horizontal plane. The cable that changes the direction for the second time may select any direction. It provides great convenience for the installation of the cable spring. The force generation apparatus of the force application apparatus in this embodiment is installed on the foundation platform.

The force application apparatus is connected with the connection rod. The force application apparatus is connected with the connection rod through a hollow spherical hinge (refer to FIG. 1.6), and a cylinder barrel of the actuating cylinder is installed on a connecting seat through a hollow cross shaft. The hollow spherical hinge has a hollow cross shaft in three-axis orthogonal. A hollow-axis revolute joint of the hollow spherical hinge adapts to the rotation of the actuating cylinder, while the other revolute joint of the hollow spherical hinge adapts to the direction change of the force application apparatus.

3. Direction Adaptation Apparatus

The direction adaptation apparatus is installed above the base frame and right above the universal hinge (which may be eccentric) at the same time, with one axis perpendicular to the horizontal plane and one axis being horizontal. The horizontal axis is located below the vertical axis, and a pulley is installed on it. The pulley has a groove, and the cable passes through the groove of the pulley to change the direction. The horizontal axis and the vertical axis are out-of-plane orthogonal. The vertical axis of the direction adaptation apparatus coincides or basically coincides with the axis of the second section of the cable. The actuating cylinder drives the cable for yaw swing, and the cable drives the pulley to rotate around the vertical axis of the direction adaptation apparatus. The second section of the cable rotates around its own axis without swinging, so as to isolate yaw swing of the actuating cylinder, and the pitch swing changes into a linear motion of the cable.

4. Universal hinged support swing rod apparatus (the type of the universal hinge includes, but is not limited to: RR, U, RU, UR, RUR, and S.

The universal hinged support swing rod apparatus includes a universal hinge 4.2 (the axis of the first revolute joint is parallel to the horizontal plane), a connection rod 4.3, a connecting apparatus IVA 4.1, a connection rod apparatus IVB 4.4 and the like. The universal hinge 4.2 is fixedly connected with the connection rod 4.3, and the connection rod apparatus may be replaced by a cylinder body of the actuating cylinder (it may be achieved in various closed-loop embodiments). There is a connection seat on the connection rod (or the cylinder barrel), and a position of the connection seat on the connection rod may be adjusted to change a size of R1 (refer to FIG. 1.1). The function is to connect the actuating cylinder, provide a working space with two degrees of freedom for the actuating cylinder, and form a whole with the parallel mechanism.

5. The integral external connection apparatus is similar to that of Embodiment 4 and will not be repeated.

Improvement 1 of Embodiment 6

In Embodiment 6, a gearbox is added to the force transmission apparatus, and FIG. 6.1 is a top view of the tension spring and the gearbox. In the force application apparatus, a gearbox 2.8 is added to change output displacement of the spring, amplify the small displacement, and reduce a length of the spring. In FIG. 6.1, the force transmission apparatus and the force initial apparatus are installed on a transmission installation seat 2.2*m*, with the gearbox 2.8 on the right side, a large groove wheel 2.8*a* and a small groove wheel 2.8*b* are provided, and are fixedly connected together, with the axes overlapping. The two groove wheels are supported on a gearbox shell 2.8*e*. One end of the tension spring 2.2*a* is connected with one cable, the cable is wound around the small groove wheel, and the other end is fixed on a cable connector A 2.8*f*. The other cable 2.8*c* is wound around the large groove wheel, one end of the cable is fixed to the cable connector β2.8*g*, and the other end provides the direction adaptation apparatus connected to the actuating cylinder. This force application apparatus can amplify a stroke of the cable on the spring.

Improvement 2 of Embodiment 6

A metal spring in FIG. 6.1 is replaced with an air spring, and the rest are unchanged, so as to form improvement 2 of Embodiment 6. For a general air spring, the displacement is relatively small. In order to obtain a relatively large displacement, a transmission apparatus is applied to amplify output displacement of the air spring. One of the biggest advantages of the air spring is that it is suitable for the large load. It has a relatively small structure and can further adjust the air spring force. The spring force is changed by adjusting the air pressure, thereby being high in adaptability.

This solution may also use a permanent magnet spring or an electric spring, both of which require amplification of the original displacement.

Improvement 3 of Embodiment 6: there are upper and lower rows of tension springs, and two pulleys, and it is suitable for a heavy load.

In FIG. 6.1, between the cable spring seat and the installation seat, a gasket may be used for changing a length of the force application apparatus, pre-tighten the force application apparatus, or change a magnitude of an initial force. The gasket is the adjustment apparatus.

In embodiments 4-6, the spring does not swing with the actuating cylinder, reducing the inertia of the system. Meanwhile, the force application apparatus is located outside the working space of the actuating cylinder and will not interfere with the actuating cylinder. The structure is relatively simple.

Embodiment 7

Please refer to FIG. 7, it is a solution of a closed loop, a gravity pendulum generating a pulling force, indirect counterweight, having no pallet, and secondary turning of the direction of the cable.

The integral structure is basically the same as that of Embodiment 6, except for the force generation apparatus of the force application apparatus. The difference is that the force generation apparatus of the force application apparatus provides the pulling force through the gravity pendulum.

The gravity pendulum includes a gravity pendulum revolute joint 2.2*g*, a pendulum rod 2.2*d*, and a counterweight 2.2*e*. The pendulum rod 2.2*d* is connected to the gravity pendulum revolute joint 2.2*g*. The revolute joint is installed on the upper part of the main frame. The cable is connected to one end of a mass counterweight block. During swing of a gravity rod, the counterweight provides a pulling force. The cable is connected to the actuating cylinder through a fixed pulley and a horizontal pulley of the direction adaptation apparatus.

This gravity pendulum swings within a certain range of a to 90 degrees (a is an included angle between the pendulum rod and the horizontal plane and is usually greater than 20 degrees, and the larger a, the closer it is to linearity). A length of the gravity pendulum rod R3 is greater than R1, and a swing angle of the gravity pendulum rod is smaller than the pitch working space of the actuating cylinder. The swinging space of the pendulum rod is selected from a section of continuous space close to the vertical axis, and is usually not greater than 60 degrees. This section is already quite close to linear characteristics and can meet engineering requirements.

In this embodiment, the pitch working space of the actuating cylinder is taken as 15-85 degrees. The working space of the pendulum rod is taken as 50 degrees (40-90 degrees). The length of the pendulum rod is approximately 1.5R1. A distance between an initial position of a cable connection point on the pendulum rod and an endpoint position of the connection point is equal to a distance between an initial position of a cable connection point on the actuating cylinder and an endpoint position of an actuating cylinder connection point. The gravity pendulum provides an approximately linear tensile characteristic. The fixed pulley that fixes the direction of the second section of the cable is installed close to the direction adaptation apparatus, and the overall height is relatively small. For other parameters, please refer to Embodiment 6.

The initial position of the counterweight corresponds to a counterweight position at the minimum pitch angle of the actuating cylinder. The initial position of the counterweight is located directly below the fixed pulley. For the cable at the initial position, the axis of the second section of the cable coincides with the axis of the third section of the cable, or has a very small angle with the axis of the third section of the cable. The smaller the angle, the smaller the required counterweight weight. Due to space limitations, in FIG. 15, the first section of the cable and the second section of the cable have a relatively small angle, resulting in a relatively large counterweight weight. At the initial position, the included angle between the gravity pendulum rod and the horizontal plane is approximately 40 degrees, and the counterweight is swung to the bottom, providing an activity space of about 50 degrees. This 50-degree activity space corresponds to the entire pitch working space of the actuating cylinder.

Note: The universal swing connection rod apparatus is omitted in FIG. 7. FIG. 7 is an open loop structure diagram.

Embodiment 8

Please refer to FIG. 8, Embodiment 8 is a semi-closed loop structure. That is, one turntable bearing is shared. The common feature is that a revolute joint of the direction adaptation apparatus 3 and a revolute joint of the universal hinge of the universal swing rod apparatus 4 are replaced with one turntable bearing, the axis of the turntable bearing is perpendicular to the horizontal plane, and the turntable bearing forms a part of the base frame.

The base frame has one rotational degree of freedom. The pallet is fixedly connected to a rotatable plate of the turntable bearing, and other parts, such as a U-shaped seat, the force generation apparatus, and a branch bracket are installed on the pallet.

1. Base Frame:

The base frame 1 consists of one turntable bearing 4.2*a* and the branch bracket 1.2*b*. The turntable bearing 3.2*a* (4.2*a*) mainly includes a rotatable plate and a fixed plate. A fixed plate apparatus is fixedly connected to the ground, so as to form a connection apparatus 1.1. The pallet 3.2*b* is fixedly connected to the rotatable plate, and a branch bracket 1.2*b* (one or more) is fixedly connected to the pallet. The rotatable plate, the pallet, and the branch bracket form a rigid main frame 1.2. The axis of the turntable bearing is perpendicular to the ground (with an allowable error of approximately plus or minus 10 degrees). The turntable bearing 4.2*a*, the pallet 3.2*b*, and the branch bracket 1.2*b* form one base frame 1.

The pallet and the rotatable plate form a whole, and the pallet is an extension of the turntable bearing.

The turntable bearing is not limited to an engineering turntable bearing. This specification refers to bearings that can withstand not only axial force and radial force, but also significant overturning moment as the turntable bearings.

2. Force Application Apparatus

The force application apparatus is similar to that of Embodiment 6, and includes a force generation apparatus 2.2*a* and a force transmission apparatus 2.3*a*. The force generation apparatus is a tension spring 2.2*a*, and the force transmission apparatus is a cable 2.3*a*.

The connection between the force application apparatus and a connection rod of the actuating cylinder is achieved through a hollow revolute joint or a hollow universal joint. Similar to Embodiment 6, the cable 2.3*a* changes a direction for the second time through the fixed pulley 2.3*b*.

In this solution, the axis direction of the second section of the cable does not need to be perpendicular to the ground. The tension spring uses a combined spring or multiple springs connected in parallel, or multiple combined springs connected in parallel. The third section of the cable extends from one side of the pallet 3.2*b* to the other side, fully utilizing the length of the pallet and providing a relatively large installation space for the spring.

Please refer to Embodiment 1 for the size and spring stiffness of R1 and R2.

There are various choices for action points: the axis of the force application apparatus may be in the vertical plane passing through the hinged support point of the universal hinge and the connection point of the actuating cylinder, or in a plane parallel to the vertical plane.

3. Direction Adaptation Apparatus

The turntable bearing 3.2*a* is a vertical-axis revolute joint A3.2 of the direction adaptation apparatus 3, and a horizontal-axis revolute joint B3.3 of the direction adaptation apparatus 3 is installed at an upper end of the branch bracket 1.2*b* of the base frame 1. The revolute joint has a pulley, and the pulley is connected with the force application apparatus. The axis of the horizontal-axis revolute joint B3.3 and the vertical axis are coplanar orthogonal or out-of-plane orthogonal (being non parallel is sufficient, and being orthogonal is the optimal solution).

4. Universal Hinged Support Swing Rod Apparatus

It includes a universal hinge and an actuating cylinder connection rod.

The turntable bearing 4.2*a* serves as a first revolute joint of the universal hinge 4.2, and is the vertical axis of the universal hinge. A horizontal-axis revolute joint 4.2*b* is installed on the rotatable plate of the turntable bearing (in this embodiment, the horizontal revolute joint is installed on the branch bracket), and serves as the second revolute joint of the direction adaptation apparatus. The horizontal axis and the vertical axis are coplanar orthogonal or out-of-plane orthogonal. The horizontal revolute joint is used for installing the swing connection rod 4.3*a* (or actuating cylinder).

This is an assembly solution with two revolute joints combined in one. The first revolute joint of the universal hinge, the first revolute joint of the direction adaptation apparatus 3, and the lower part of the base frame 1 are combined into one.

The axes of the two revolute joints of the universal hinge 4.2 are coplanar orthogonal or out-of-plane orthogonal. The spring is arranged below the actuating cylinder, occupying the space below the actuating cylinder, which does not conflict with the disturbance space of other parts.

5: An integral external connection apparatus VA5.1 and an integral external connection apparatus VA5.2 each includes a connection between the fixed plate of the turntable bearing (also the connection part of the base frame) and the ground, a connection between the universal joint and the actuating cylinder, or a connection between the actuating cylinder and the platform.

The difference between this embodiment and Embodiment 6 is that: 1. the force generation apparatus is installed on the pallet (not on the foundation or the bottom of the base frame), and 2, the direction of the second section of the cable does not need to be perpendicular to the ground. 3. The distance between the two revolute joints of the direction adaptation apparatus is relatively large, and the two revolute joints are connected together through a branch bracket, that is, the base frame and the direction adaptation apparatus share a part of the structural parts.

Improvement Solution of Embodiment 8 the force application apparatus is replaced with a dual spring apparatus or a dual combined spring. Two sets of springs, two cables, and two sets of pulleys are used and respectively located on both sides of the actuating cylinder (as seen from the top view). In this way, the spring is not located directly below the actuating cylinder, thereby reducing the height, and reducing the structural dimension.

The pulling force of the anti-gravitational moment is only limited to a plane perpendicular to the ground and passing through the axis of the actuating cylinder, thereby being simple in force bearing.

If Embodiments 8, 9, and 10 are improved: the turntable bearing is hollow, the pallet is also hollow, and the first revolute joint of the universal swing connection rod is separate from the revolute joint of the direction adaptation apparatus. That is, the universal swing connection rod is independent, that is, it does not share the turntable bearing, then it becomes a solution of a large closed-loop structure. In this solution, the turntable bearing serves as a part of the base frame. That is, the base frame has one rotational degree of freedom.

Embodiment 9

This embodiment is a solution of a large closed loop, which has a turntable bearing, and two sets of springs on both sides, and a cable reversing for the first time.

This is an improvement solution based on Embodiment 8, which includes three main changes:

The first change is the change in a connection mode and position between the force application apparatus 2 and the connection rod. The connection rod 4.3*b* is perpendicular to the axis of the actuating cylinder. The connection rod is changed from being originally parallel to the axis of the actuating cylinder to being perpendicular to the axis of the actuating cylinder, and the positions of R1 and R2 are also changed (see FIG. 9). The connection rod 4.3*b* is connected with the cable 2.3*a* through a universal hinge (or a revolute joint or a spherical hinge).

The second change is that the horizontal axis 3.3 of the direction adaptation apparatus 3 is installed on one side instead of the upper part. On a plane perpendicular to the horizontal plane and passing through the axis of the actuating cylinder, the installation position is a distance R2 between a contact point A2*a* of the cable and the pulley and the center of the universal hinge, and R2=R1. Usually A2*a* is located on a horizontal plane passing through the center of the universal hinge. A1*a* is not near the axis of the actuating cylinder. A1*a* is on the connection rod, referring to FIG. 9.1.

The third change is that two sets of springs, two cables, and two sets of pulleys are used and respectively located on both sides of the actuating cylinder (as seen from the top view). In this way, the spring is not located directly below the cylinder, thereby reducing the height, and reducing a geometric scale. At the same time, the upper pulley is far away from the pitch working space range of the actuating cylinder, avoiding interference.

Except for the mentioned labels, the other labels are the same as those in Embodiment 8.

In Embodiments 8 and 9 (refer to FIG. 8 and FIG. 9), a force adjustment apparatus is connected in series with the force generation apparatus of the force application apparatus and the base frame. The force adjustment apparatus may be a regular bolt (2.5) or a turnbuckle, used for tensioning the force application apparatus. This embodiment uses a bolt 2.5, which is locked, such as self-locked, after being adjusted to meet the requirements.

The adjustment apparatus may also be achieved by adding the gasket to change the length of the cable, which means there are various ways. The length of the cable is changed. When a center of gravity of the actuating cylinder is not on the axis of the actuating cylinder (slightly offset), as in Embodiment 14, in this case, the initial force will change slightly, but the change is not significant. An initial force adjustment apparatus may meet this requirement. Of course, it is also possible not to arrange the adjustment apparatus, as it happens to meet the required value during designing or assembling.

Improvement 1 of Embodiment 9: Please refer to FIG. 9.2, it is changed to a large closed loop: the turntable bearing is hollow, the pallet is hollow, and the universal hinge of the universal swing connection rod is installed independently. The universal hinge and direction adaptation apparatus do not share the revolute joint. The universal hinged support connection rod is removed in FIG. 9.2.

Improvement 2 of Embodiment 9: a single-side spring is used instead. The disturbance space of the force application apparatus is reduced, the installation of adjacent two UPS branch linkages is facilitated, and interference is reduced.

In this embodiment, the length of the connection rod may further be adjusted.

Embodiment 10

Please refer to FIG. 10. This embodiment is a solution of having a turntable bearing, a semi-closed loop, and a torsion spring generating torque.

Compared with Embodiments 8 and 9, Embodiment 10 has the particularity that the force application apparatus provides the torque by a torsion spring. In this embodiment, the force generation apparatus is the torsion spring, and the force transmission apparatus is a rigid force-bearing rod. The rigid force-bearing rod is a straight rod or a curved rod. If there are some curved rods, interference may be prevented.

The base frame 1 refers to Embodiments 8 and 9, and two types of revolute joints are installed on the pallet 3.2*b*. One is the horizontal-axis revolute joint 4.2*b* of the universal hinge (the axis of the actuating cylinder is perpendicular to it). The other is the horizontal-axis revolute joint 3.3 of the direction adaptation apparatus 3, and the horizontal axis of the direction adaptation apparatus is a flexible motion pair. The axes of these two revolute joints are parallel (including coincidence). The axis of the turntable bearing 3.2*a* is coplanar orthogonal with one of the axes of the two revolute joints above, and is out-of-plane orthogonal with the other axis, or is out-of-plane orthogonal with the two axes. The horizontal axis is installed on the pallet through an installation seat, one end of the torsion spring 2.2*b* is fixed on one end of the horizontal axis 2.2*j*, and the adjustment apparatus 2.5 is positioned. The adjustment apparatus may change the initial moment of the torsion spring.

The axis of the torsion spring coincides with the horizontal axis of the direction adaptation apparatus, and the torsion spring may twist around the horizontal axis. The torsion spring forms the flexible revolute joint.

The other end of the torsion spring is connected with a section of connection rod. The connection rod 2.3*f* of the torsion spring is movably connected with the actuating cylinder, to form a sliding pair, thereby transferring force to the actuating cylinder.

There are multiple connection modes for the movable connection, such as a sliding connection, a rolling connection (a linear bearing), and a sliding pair formed by revolute joint connection. For example, in the first type, a radius of a moment arm of the actuating cylinder is a constant, while the connection point of the torsion spring is variable, which means that the radius of the moment arm of the torsion spring is variable, as shown in FIG. 10. In the second type, a radius of a moment arm of the torsion spring is a constant, while the connection point of the actuating cylinder is variable. That is to say, the length of the moment arm of the actuating cylinder is variable. In these two cases, the installation position of the torsion spring is roughly the same, and both in the second quadrant, the provided moment characteristics are similar, which can both provide a convex curve, and an error with a sine curve may be relatively small, and can both achieve the precision within 5% or higher.

The second type is the reverse of the first structure, where the pulley is fixed on a torsion spring rod and sliding rods are installed on both sides or directly above the actuating cylinder. A slide of the second structure is placed above the actuating cylinder, and a pulley is installed on the moment arm of the torsion spring. The pulley matches a rod on the actuating cylinder, and the pulley rolls on the rod. As the pulley rolls, the connection point between the torsion spring and the actuating cylinder changes, and the length of the moment arm on the actuating cylinder changes.

In FIG. 10, the connection rod **2.3*f*** is connected with the actuating cylinder through a grooved rotating wheel (which may also be slidably connected), so as to apply anti-gravitational moment to the actuating cylinder. When the actuating cylinder swings in pitch, the connection rod moves relative to the grooved rotating wheel. The length of the moment arm formed by the straight rod changes, which changes the torque characteristics of the torsion spring with respect to the horizontal axis of the universal hinge. The axis of a section of connection rod in contact with a maximum wheel with a groove is parallel or basically parallel to the axis of the actuating cylinder. In this embodiment, the length of the moment arm on the actuating cylinder remains unchanged.

The third structure is a linear bearing sleeving the connection rod, which transmits torque while achieving relative movement between the actuating cylinder and the connection rod.

For the installation position of the axis of the torsion spring in this embodiment:

a coordinate system in FIG. 10.2: a plane coordinate system is established in the vertical plane passing through the axis of the actuating cylinder, an origin is taken from the center of the universal hinge, and the X axis and the horizontal Z axis are perpendicular to the horizontal plane.

The coordinate position of the axis of the torsion spring, the torsion spring stiffness, and the initial torque (torque at an angle of zero) are properly designed, which can meet relatively high precision requirements.

The specific calculation process (see FIG. 10.2 and FIG. 10.3):

the torsion spring stiffness is taken as a constant. A gravitational moment curve (a sine curve in FIG. 10.3) of the actuating cylinder is made. A starting point (a point or origin corresponding to a minimum pitch angle, taken as M3 in the figure) and an ending point (the maximum pitch angle or a 90-degree point, taken as Ma in the figure) are connected to obtain a straight line, which is a minimum stiffness straight line La of the torsion spring.

A tangent line of the gravitational moment curve passing through the starting point is made to obtain a straight line, which is a maximum stiffness straight line of the torsion spring.

Usually, a stiffness straight line is selected between the maximum stiffness straight line and the minimum stiffness straight line as the stiffness characteristic of the torsion spring. For example, Lb in FIG. 10.2 (connected with M1 and M2), and Lc in FIG. 10.2 (connected with the origin M3).

In special cases, a straight line that is greater than the maximum stiffness (for example when gravity compensation requirements are high) or less than the minimum stiffness (for example when precision requirements are low) may be selected.

A stiffness value is selected within or near the outer side of the range. After optimization, the stiffness value, starting point torque, and the installation position of the torsion spring may be obtained.

The installation position of the torsion spring may be selected within the following rectangular interval: a coordinate point thereof on an X axis is a point located within a range of $0.05R_0$ to $-0.28R_0$, and a coordinate point thereof on a Y axis is a point located within a range of $-0.05R_0$ to $0.28R_0$. The installation point in this area changes the torque characteristic of the horizontal axis of the universal hinge from the original straight line characteristic to the convex curve characteristic (or most of them are a convex curve or a concave-convex curve, some cases are the straight line, but all are close to a sine curve). The specific position is optimized and designed based on the actual situation.

The optimal installation position of the torsion spring is within the following rectangular interval: the coordinate point thereof on the X axis is a point located within a range of $-0.18R_0$ to $-0.22R_0$, and the coordinate point thereof on the Y axis is a point located within a range of $0.18R_0$ to $0.22R_0$. There may be difference due to different stiffness and initial forces.

In this embodiment, the axis coordinates of the torsion spring are $(-0.2R_0, 0.2R_0)$ (the radius of the center of gravity of the design point of the actuating cylinder is $R_0$). The torsion spring stiffness curve is selected as Lb (FIG. 10.3). The design point takes the gravitational moment when the piston is neutral.

Method: for a determined service object, there is determined anti-gravitational moment and determined main parameters. Firstly, a stiffness value is taken for the torsion spring, after determination, a position with 0 torque (selecting an initial force) is selected, an installation position is selected, the torque is calculated throughout the entire working space, and the results are compared with the error (a difference value between an actual torque curve and the sine curve).

When a difference value between the gravitational moment and the anti-gravitational moment in all working spaces (mainly considering the pitch working space) can meet the error requirements, it may be stopped. Usually, the optimal result is when the upper deviation and the lower deviation are basically equal.

If not satisfied, the initial force, the installation position, and the stiffness are changed sequentially, and gradual iteration is performed until a satisfactory result is obtained. Usually, the results are not unique. Usually, throughout the pitch working space, the positive and negative deviations of the anti-gravitational moment from the gravitational moment are basically equal. The smaller the deviation, the better.

There are no restrictions on the order of selecting the initial force, the installation position, and the stiffness above. For example, the installation position may also be determined first, or the initial force may be determined first, and then other variables may be determined.

In Embodiment 10, a torsion spring initial torque adjustment apparatus is arranged. In FIG. 10, the adjustment apparatus is a bolt. The bolt is rotated to adjust the initial torsion of the torsion spring and is locked, such as self-locking, after adjustment. The initial torsion of the torsion spring is changed. In theory, generally speaking, when the axis of the actuating cylinder is perpendicular to the ground, the corresponding torsion spring torque is zero. The maximum pitch angle is usually less than 90 degrees. Errors, such as within 5%, are allowed.

In this embodiment, the initial force of the torsion spring may be adjusted by the adjustment apparatus 2.5 and locked.

Improvement 1 of Embodiment 10: it is changed into a large closed loop, which means that the turntable bearing is hollow, the pallet is hollow, and the UPS branch linkage is independent.

On the basis of Embodiment 10, the (RPS) part of the universal hinged support chain is removed, the pallet becomes hollow, and the turntable bearing remains hollow. The UPS branch linkage is installed on the hollow part, and the force application apparatus is connected with the UPS branch linkage. The branch linkage obtains anti-gravitational moment. A solution of improvement 1 of Embodiment 10 (FIG. 10.4) is obtained.

The others are basically the same as those of Embodiment 10. Please refer to Embodiment 9 for annotation.

Improvement of torsion spring: a combined spring (a spring with a large diameter and a spring with a small diameter are nested together) or a single-side spring is used.

The common feature of Embodiments 8, 9, and 10 is a semi-closed loop structure. That is, one turntable bearing is shared. The common feature is that a revolute joint of the direction adaptation apparatus 3 and a revolute joint of the universal hinge of the universal swing rod apparatus 4 are replaced with one turntable bearing, the axis of the turntable bearing is perpendicular to the horizontal plane, and the turntable bearing forms a part of the base frame. The base frame has one rotational degree of freedom. The pallet is fixedly connected to a rotatable plate of the turntable bearing, and other parts, such as a U-shaped seat, the force generation apparatus, and a branch bracket are installed on the pallet.

Embodiment 11

Please refer to FIG. 11 and FIG. 11.1, and it is a solution of using a counterweight as a force application apparatus.

On the basis of Embodiment 10, the force application apparatus is removed, and a horizontal axis U-shaped seat of the universal hinge is heightened. The connection rod is connected to the cylinder barrel. The connection rod extends in an opposite direction of the axis of the actuating cylinder, a counterweight is arranged on the connection rod, and the counterweight forms anti-gravitational moment on the actuating cylinder (the connection rod on the left side of the horizontal axis in the figure is connected with the counterweight). The counterweight is fixedly installed on the position in the opposite direction of the axis of the actuator. Its weight just balances or partially balances the gravitational moment. The two sets of counterweights are respectively located on both sides of the axis of the actuating cylinder (as seen from the top view 11.1). The counterweights do not interfere with the universal hinge.

In this embodiment, the connection between the counterweight and the actuating cylinder is a fixed connection. The fixed connection is also a type of transmission apparatus.

The force application apparatus 2 is a counterweight 2.2*e*. The base frame 1, the direction adaptation apparatus 3, and the universal hinge 4.2 share one horizontal revolute joint, and the turntable bearing and the horizontal revolute joint together form one base frame. This is an assembly solution with three in one. The structure is relatively simple. The U-shaped fork in this solution is relatively high and has a relatively large overall height.

Embodiment 12

Please refer to FIG. 12 and FIG. 12.1, it is another counterweight solution, namely, a counterweight solution using a symmetrical transmission mode. The counterweight is located on the same side of the actuating cylinder, as shown in FIG. 12 and FIG. 12.1.

By using one transmission apparatus, the counterweight is transferred to the same side of the actuating cylinder to achieve symmetrical movement of the axis of the actuating cylinder and the counterweight with respect to the horizontal plane (see from the side view). The actuating cylinder is a driving side, and the counterweight is a driven side. The counterweight provides the anti-gravitational moment.

This kind of symmetrical transmission may be achieved in multiple ways. For example, a pair of gears with the same number of teeth and radius (or fewer teeth gears), or a pair of wheels connected by a steel cable are used for achieving reverse synchronous rotation, and so on.

Gear transmission is taken as an example below.

The structures of the base frame 1, the direction adaptation apparatus 3, and the universal hinge are the same as those of Embodiment 10. The difference from Embodiment 10 is an installation mode of the counterweights. The counterweights are engaged together through a pair of gears 2.3*c* that are engaged with each other and have the same number of teeth. One of the gears is connected with an actuating cylinder shaft (the horizontal axis of the universal hinge), is synchronously transmitted, and is a driving gear. The other of the gears is connected with the counterweights, and is a driven gear. The counterweight installed on the driven gear through a connection rod is on the inner side of the platform. In this embodiment, the driven gear is installed above the driving gear, which results in a small increase in overall height. Both the driving gear and the driven gear are arranged on both sides of the actuating cylinder. Each side of the actuating cylinder is provided with one counterweight.

The two gears move symmetrically relative to the horizontal plane to achieve balance between the gravitational moment and the anti-gravitational moment. The overall height of the solution is relatively small, but the inertia increases significantly. The working spaces of the two counterweights are located on both sides of the actuating cylinder and do not interfere with each other. The overall height will also decrease significantly. An external space is also saved.

Improvement 1 of Embodiment 12: it becomes a large closed loop with the counterweight on one side, and the gear on the other side. There is no disturbance space on one side of the actuating cylinder, and the installation distance between two adjacent UPS branch linkages is relatively small.

Embodiment 13

Please refer to FIG. 13, which is a closed loop solution, having a turntable bearing and the cable reversing for a third time. FIG. 13.1 is a partial view of the pulley during reversing for the second and third time (a section C2-C2 in FIG. 13).

Based on Embodiment 8, this embodiment adds a new pulley 2.3*i* (or a pair of pulleys, one on the left and one on the right) on the pallet, and the axis of the newly added pulley 2.3*i* is perpendicular to the horizontal plane. The horizontal-axis reversing pulley 2.3*e* and the axis of the vertical-axis reversing pulley 2.3*i* are perpendicular to each other. The rest are the same as those of Embodiment 8.

The cable passing through the second pulley 2.3*e* may change the direction again through the third pulley 2.3*i*. The cable 2.3*a* is wound around a fan-shaped surface of the pulley, and an initial contact point C (refer to FIG. 13.1) between the cable and the pulley 2.3*i* is on the axis of the turntable bearing. The rotatable plate 3.2*b* rotates, the second pulley rotates, and the initial contact point C remains unchanged. The third pulley rotates around the turntable bearing, and a fourth section of the cable will swing slightly without affecting its operation. The connected force generation apparatus 2.2*a* may be installed on the ground. However, because when the rotatable plate rotates, the angle of the cable wound around the sector perpendicular to the pulley will change, resulting in a small change in the length of the cable. This will cause some errors, because the diameter of the pulley is small and the rotating angle is small, the error is very small and completely acceptable in engineering.

In this embodiment, the tension spring has an organ protective cover.

Embodiment 14

Please refer to FIG. 14, Embodiment 14 is a solution of having a pallet, a closed loop and hybrid force application by gravity and a cable spring, and FIG. 14.1 is a top view thereof.

This is the superposition of Embodiment 11 and Embodiment 8. Based on Embodiment 11, when a counterweight of a motor is insufficient to balance the gravitational moment, in order not to increase the inertia too much, the spring is used for balancing a part of gravitational moment. Two sets of tension springs are configured on both sides (or only one set is configured on one side). The cable is connected to an opposite end of the axis of the actuating cylinder (below the motor in the figure), and the axis of the spring is perpendicular to a plane of the foundation platform.

The second revolute joint of the direction adaptation apparatus is located below the universal hinge. Positions of R1 and R2 also have changed (as shown in FIG. 14). Please refer to FIG. 8 and FIG. 10 for relevant annotations.

Embodiment 15

Please refer to FIG. 15, which is a solution of an open loop, the tension spring matching the cable, and the cable reversing for the second time.

Embodiment 15 is a modification of Embodiment 6. In FIG. 6, the universal hinge connection rod 4 (including the actuating cylinder) is removed, which means that the dashed part in FIG. 15 is removed, so as to form an open loop solution.

The vertical axis of the direction adaptation apparatus 3 in Embodiment 15 is located below the horizontal axis, and a revolute joint to which the vertical axis is perpendicular is a hollow shaft. Eccentricity e1 and the pulley are equal in radius. The cable penetrates through the hollow shaft. The radius of the pulley refers to a minimum radius of the pulley plus a radius of the cable. When the pulley swings, the axis of the second section of the cable remains unchanged, and is always at the center of the hollow shaft.

For the convenience of transportation, the base frame of Embodiment 15 is changed into a foldable type. In the middle part of the main frame of the base frame, the main frame is divided into an upper part and a lower part, and the middle part of the main bracket is provided with a revolute joint 1.5 and a locking apparatus. The main frame is unfolded and locked with a fixing bolt to form a rigid frame. After folding, the base frame is convenient for transportation. For details such as annotations, please refer to Embodiment 6 and FIG. 6

Embodiment 16

Please refer to FIG. 16, which is a solution of a semi-open loop, having a pallet and a torsion spring generating a pulling force.

On the basis of Embodiment 8, the force application apparatus is removed, and the universal swing connection rod is installed on the pallet. The force application apparatus is changed into the force application apparatus of Embodiment 3, so as to form Embodiment 16.

In Embodiment 16: the torsion spring is installed above the base frame, and a point A2*a* is located above the universal hinge, allowing for a certain degree of eccentricity.

Improvement 1 of Embodiment 16 (refer to FIG. 16.1): based on Embodiment 16, the pallet is made hollow, the turntable bearing remains hollow, and the hollow position is used for installing the universal hinge of the universal swing connection rod. A U-shaped shifting fork 6 is added on the pallet directly below the actuating cylinder. The actuating cylinder is in movable cooperation with the U-shaped shifting fork in the U-shaped shifting fork (the part in cooperation with the U-shaped shifting fork 6, and the cross-section of the actuating cylinder or connection rod is circular). This is a generalized coupling. The actuating cylinder drives the U-shaped shifting fork to rotate around the horizontal axis, and drives the pallet to rotate to achieve synchronous rotation. When the actuating cylinder rotates in pitch, the U-shaped shifting fork does not move.

Embodiment 17

Please refer to FIG. 17, which is a solution of a semi-open loop, and torsion spring generating torque.

Embodiment 17 is a deformation of Embodiment 10. The actuating cylinder (i.e. the swing connection rod) is removed, the horizontal axis and installation seat of the universal hinge are removed, and others remain unchanged, which forms Embodiment 17. This is a semi-open loop solution that shares one turntable bearing (the universal hinge and the direction adaptation apparatus share one revolute joint, and meanwhile, the revolute joint forms a part of the base frame, simplifying the structure, and the force application apparatus will not generate a component force perpendicular to the axis passing through the actuating cylinder and perpendicular to the horizontal plane).

Improvement of Embodiment 17 (refer to FIG. 17.1): based on Embodiment 18, in addition to removing the actuating cylinder, the horizontal axis of the universal hinge, and the installation seat, the pallet becomes a hollow pallet, and the middle part of the turntable bearing remains hollow. The hollow part is used for installing the universal hinge of the universal swing connection rod. This is a large open loop solution.

As an open-loop solution, the universal swing connection rod apparatus should be removed in FIG. 16, FIG. 16.1, and FIG. 17.

Embodiment 18

FIG. 18 is a top view of Embodiment 18. Embodiment 18 is an open-loop, and gravity counterweight solution.

A main view refers to FIG. 12, and FIG. 18 is a top view of FIG. 12. The actuating cylinder in Embodiment 12 drives the counterweight through the horizontal axis of the universal hinge, referring to FIG. 12.1. This axis is a long axis used. In Embodiment 18, the axis is disconnected and connected with two (or three) coaxial axes through a coupling 5.2*b* in the middle, so as to replace the original long axis, resulting in FIG. 18. Two U-shaped seats are installed on an outer circumference of the turntable bearing (pallet), the U-shaped seats are provided with a horizontal-axis rotating shaft, the axis of the rotating shaft and the horizontal axis of the universal hinge coincide and are connected by a coupling. The counterweight is installed on a shaft of the U-shaped seat of the turntable bearing (pallet). In FIG. 18, the counterweight is connected through a gear. The actuating cylinder swings in pitch to drive the coupling to rotate, and the shaft on the U-shaped seat rotates to drive the counterweight to swing. The actuating cylinder and the counterweight connection rod move symmetrically relative to the horizontal plane, and the counterweight provides suitable anti-gravitational moment.

The turntable bearing becomes hollow, and the center of the pallet also becomes hollow. The hollow position is an installation space for a U pair of the UPS branch linkage. A universal swing connection rod apparatus is depicted in FIG. 18. The large open loop solution does not have the universal swing connection rod apparatus.

During use, a universal hinge is installed in the center of the turntable bearing, the universal hinge is connected with the actuating cylinder, in this way, the universal hinge and the actuating cylinder form a UPS branch linkage. The branch linkage may be independent, so as to form a large force closed-loop structure.

Below, several embodiments of a parallel mechanism with six degrees of freedom using a lateral force reduction apparatus are presented as representatives, and the parallel mechanism is called a parallel mechanism with minimal positive pressure. Other parallel mechanisms with low degrees of freedom may also be applied.

Embodiment 19

The parallel mechanism with minimal positive pressure uses a 6-UPS (or 6-UCS, 6-UCU) parallel mechanism matching with an open-loop lateral force reduction apparatus (Embodiment 6). The parallel mechanism with minimal positive pressure has three symmetrical axes (FIG. 19 only depicts one third of the parallel mechanism system, and FIG. 20 and FIG. 21 are also the same). The P pair uses a directly-connected electric cylinder. The solution may be used for transforming an existing parallel mechanism or to design a new parallel mechanism system with minimal lateral force.

For an installation position of the lateral force reduction apparatus, the sliding pair has a conical working space, and a projection of a boundary of the conical working space on the horizontal plane forms an angle, and the angle may have a symmetry axis (called a bisector). Generally speaking, the installation position of the symmetry axis (called the bisector) is related to the symmetry axis, and it is better to be on the axis of the symmetry axis, such as right above the hinged support point, or the hinged support point is on the axis, or it is right above the axis on the outer side of the hinged support point. This installation position is a relatively ideal position. When it is deflected to the left side and to the right side, the force is basically the same. This means that when there is eccentricity, a force state with eccentricity is better. If it is not on the axis, then the eccentric-type force on one side may be relatively large. However, it does not affect normal use. In this case, the force should be considered in the dynamic analysis.

The base is installed on the outer side of the universal hinge. The connection point between the force application apparatus and the frame is located above the universal hinge.

Embodiment 20

The parallel mechanism with minimal positive pressure uses a 6-UPS (or 6-UCS, 6-UCU) parallel mechanism matching with a closed-loop lateral force reduction apparatus (Embodiment 10). The force application apparatus uses a single-side torsion spring or a double-sided torsion spring. The P pair uses a hydraulic cylinder.

Embodiment 21

The parallel mechanism with minimal positive pressure takes a 6-UPS6-DOF parallel mechanism as an example, and the lateral force reduction apparatus uses a three-in-one solution of Embodiment 10.

The solution is mainly used for designing a new parallel mechanism system with minimal lateral force (which can also be used for transforming an existing hydraulic parallel mechanism). Any parallel mechanism containing a UPS branch linkage may be applied, including a parallel mechanism with low degrees of freedom, such as 3-UPU and 4-UPU. Applications include transforming the existing parallel mechanism and designing a new parallel mechanism.

Embodiments 19, 20, and 21 are actually the parallel mechanism system with minimal lateral force. These three embodiments apply the above lateral force reduction apparatus (open loop solution) to the parallel mechanism. Specifically speaking, the open-loop lateral force reduction apparatus further includes a parallel mechanism, the parallel mechanism has at least one UPS branch linkage, a cylinder barrel of a sliding pair of the UPS branch linkage is connected with one end of the force application apparatus, to apply appropriate anti-gravitational moment to the actuating cylinder so as to form a parallel mechanism system with minimal lateral force (the friction force is very small and there is a certain weight compensation ability). Usually, the number of the open-loop lateral force reduction apparatus depends on the number of the UPS branch linkages of the parallel mechanism, the lateral force reduction apparatuses are located on the lower side and outer side of the parallel mechanism, and there is no interference between the motion parts.

Embodiments 19, 20, and 21 may also be seen as the parallel mechanism composed of several (one to six, which may be equipped with an ordinary branch linkage) closed-loop lateral force reduction apparatus (with a complete UPS branch linkage). For example, the six apparatuses shown in FIG. 1 install a motion platform and a fixed platform for the six UPS branch linkages according to the configuration of the parallel mechanism. The six UPS branch linkages form a parallel mechanism with six degrees of freedom, which can form a parallel mechanism system with minimal positive pressure. The parallel mechanism system has a very low friction force and further has a certain weight compensation ability. In an aspect of assembling, the lateral force reduction apparatuses usually are located on the lower side and outer side of the parallel mechanism, and there is no interference between the motion parts.

Similarly, all the closed-loop lateral force apparatuses may form the corresponding parallel mechanism system.

Embodiments 1-14 mainly involve a closed loop solution. Embodiments 15-21 are open loop embodiments, including a large open loop embodiment and a semi-open loop embodiment. According to Embodiments 1-6, the universal swing rod apparatus is removed, and a large open loop solution is provided. In Embodiments 8, 9, and 10, in addition to removing the horizontal axis of the universal hinge and the actuating cylinder, the middle part of the pallet and the middle part of the turntable bearing are further maintained to be hollow, and the connecting apparatus of the force application apparatus become the external connection apparatus, so that a large open-loop implementation solution is also obtained. According to Embodiments 8, 9, and 10, the horizontal axis of the universal hinge and the actuating cylinder are removed, and a semi-open loop implementation solution is provided (the direction adaptation apparatus and the universal hinge share one revolute joint, that is, share one turntable bearing).

Several Explanations about the Embodiments as for the essence of the method: in all embodiments, it reflects such an overall method. That is, the method of reducing the lateral force is essentially to provide a reduction apparatus, a force is applied between the actuating cylinder and a foundation, and this force has a component that may eliminate the anti-gravitational moment, and further has an upward component that may provide weight compensation. The anti-gravitational moment and gravity compensation provide appropriate anti-gravitational moment and gravity compensation when the pitch angle changes. When the yaw angle changes, the anti-gravitational moment and gravity compensation do not change or only have changes allowed by engineering errors. So, this method is to provide suitable anti-gravitational moment and gravity compensation. The so-called appropriate anti-gravitational moment refers to that the anti-gravitational moment provided by the force application apparatus can meet the design requirements at different pitch angles.

As for iteration of the method: an iterative process is completed through comparison according to specific requirements in the specific implementation solutions. For example, for a specific design solution, that is, with specific anti-gravitational moment and specific weight compensation requirements, whether the design purpose has been achieved may be checked. At this point, repeated iteration may be carried out. The embodiments are all the results of simple iterations.

As for the order of A and B in the first step of the method: B. If there is a specific application object, that is, a customer has given a specific flight simulator motion system (for pilot training), they have determined structural parameters, determined gravitational moment and weight compensation requirements, and specific design requirements, and then, a certain structure is selected to apply to the motion system with six degrees of freedom. So the main parameters are determined first, and then the structure is determined, which means that A is followed by B. Embodiment 6 adopts this method.

If an embodiment structure is pre-selected, and then the embodiment is applied to a specific parallel mechanism with multiple degrees of freedom, the force application mode and structure are determined first, and then the parameters, including requirements for anti-gravitational moment and gravity compensation are determined. For example, Embodiment 1 uses this method for a car driving simulator, which is that B is followed by A.

So in the embodiments, the order of A and B may be arbitrarily selected, including simultaneous performing.

The Pulley and the Cable in the Force Application Apparatus

In multiple embodiments, the force transmission apparatus of the force application apparatus applies the pulley and the cable, and the direction of the first section of the cable is determined by the installation position of the first pulley. The specific solution is one of the following three cases: a, a solution with one pulley is included, wherein the pulley is installed on the base frame and shares one horizontal-axis revolute joint with the direction adaptation apparatus to fix the direction of the first section of the cable, a direction of a second section of the cable is determined by an installation position of the force generation apparatus of the force application apparatus, and the direction of the second section of the cable is perpendicular to the horizontal plane (with an allowable error of about 10 degrees). b, a solution with two pulleys is included, wherein a first pulley is installed on the base frame and shares one horizontal-axis revolute joint with the direction adaptation apparatus to fix the direction of the first section of the cable, a second pulley is installed on the base frame, the first and two pulleys cooperate to determine the direction of the second section of the cable, and a direction of a third section of the cable is determined by the installation position of the force generation apparatus. c, a solution with three or more pulleys is included, wherein a first pulley is installed on the base frame and shares one horizontal-axis revolute joint with the direction adaptation apparatus to fix the direction of the first section of the cable, a second pulley is installed on the base frame, the first pulley and the second pulley cooperate to determine the direction of the second section of the cable, and a third pulley or more pulleys are used for changing the direction of an additional section of the cable in an arbitrary manner.

Expression of the Structure

In all the embodiments, the basic components of each part include two major parts: a functional structure body and an external connection unit. As a whole, it is also composed of two major parts: the functional structure body and the external connection unit. Therefore, from this perspective, 1. all parts are self similar, and the whole and parts are also self similar.

2. The two parts that can be connected are connected to each other through their respective connection apparatuses, which is their commonality. If detailed descriptions and labeling references are provided for every two connecting parts, it will make the specification lengthy and dilute the focus. Therefore, for simplicity and clarity, there is no detailed explanation or label reference for the connecting part.

The foundation, a fixed device or apparatus, must be installed on the foundation or ground, which is the inherent meaning of a relatively fixed apparatus or device. In this case, the base frame needs to be installed on the foundation, the foundation platform of the parallel mechanism needs to be installed on the foundation, the UPS branch linkage needs to be installed on the foundation, and the force generation apparatus in Embodiment 16 needs to be installed on the foundation. According to the convention of mechanical principles, the foundation is a large component, and the component installed on the foundation is a relatively fixed component. Alternatively, the plurality of relatively fixed components are actually one large component. The mechanism mentioned in the literature does not specifically include the foundation. Therefore, in this case, the basic composition does not mention the foundation, and in various embodiments, the foundation is not always mentioned. This is not without the foundation, it is just an expression habit.

The present invention provides a special parallel mechanism, the parallel mechanism has two or three rotational degrees of freedom, and the parallel mechanism includes a foundation platform, two branch linkages, and a motion platform. A first branch linkage includes a base frame, a force application apparatus, and a direction adaptation apparatus. A second branch linkage is a universal hinge (or a spherical hinge), and the motion platform is a swing rod apparatus. Its particularity lies in the fact that between ends of the two branch linkages, the first branch linkage generates a force on a connection rod, the force has a component that may generate anti-gravitational moment on the connection rod and its weight installed on the connection rod, and can further generate an upward component force on the connection rod to balance part of the weight of the connection rod and its weight installed on the connection rod. In the embodiments, it corresponds to the closed loop structure.

Alternatively, the present invention provides a series mechanism (sometimes containing hybrid components). The series mechanism has two or three degrees of freedom, and the series mechanism includes a base platform, a base frame, a force application apparatus, a direction adaptation apparatus, and a motion platform (i.e. an actuator). The base frame, the direction adaptation apparatus, the force application apparatus, and the actuator form a series branch linkage. Its particularity lies in the fact that when the series mechanism is applied to a universal connection rod and forms a parallel mechanism with the universal connection rod, a force is applied to the connection rod on a universal hinge and its accessories, the force has a component that may generate an anti-gravitational moment on the connection rod and its weight installed on the connection rod, balance a gravitational moment, and can further generate an upward component force on the motion platform to balance part of the weight of the connection rod and its additional apparatus.

The external connection unit in the specification not only includes two connection apparatuses A and B, but sometimes includes multiple connection apparatuses. Sometimes A and B may also have multiple connections themselves. This is an expression corresponding to input and output. Sometimes there are multiple outputs and multiple inputs, then there are multiple connections.

The above is only a schematic implementation of the present invention and is not intended to limit the scope of the present invention. Any skilled in the art who make equivalent changes and modifications without departing from the concept and principles of the present invention shall fall within the scope of protection of the present invention.

The invention claimed is:

1. A method for reducing a positive pressure of an actuating cylinder of a universal hinged support, the method being applied to the actuating cylinder of the universal hinged support, wherein a device used in the method comprises: a base frame, a force application apparatus, a direction adaptation apparatus, a universal swing rod apparatus, and an integral external connection apparatus;

wherein, the direction adaptation apparatus is mounted on the base frame;

one end of the force application apparatus is connected to the base frame through the direction adaptation apparatus, and the other end of the force application apparatus is connected to the universal swing rod apparatus via an connection apparatus, the integral external connection apparatus is connected to the actuating cylinder;

the method comprises:

providing a force between the actuating cylinder of the universal hinged support and the base frame using the force application apparatus, to form an anti-gravitational moment and weight compensation.

2. The method for reducing the positive pressure of the actuating cylinder of the universal hinged support of claim 1, further comprising:

step 1, determining main design parameters and a type of the force application apparatus, comprising:

A, determining the main design parameters, wherein the main design parameters comprise an amount of reducing a maximum positive pressure of the actuating cylinder, a maximum gravitational moment and a ratio of gravitational moment to be eliminated therefrom, a maximum anti-gravitational moment, and an amount of weight compensation;

B, determining the type and structural form of the force application apparatus:

determining the type of the force application apparatus comprising: determining a force application mode used for providing an anti-gravitational moment, wherein the force application mode comprises: a tension spring, a torsion spring, a gravity counterweight, a gravity pendulum, an air spring, or an electromagnetic force, and one of the force application modes or a combination of two or more modes can be selected;

determining the structural form, wherein the structural form comprises an open loop structure, a closed loop structure, a semi-open loop structure, a semi-closed loop structure, or a hybrid structure, and one of the structural forms can be selected;

the above steps A and B can be performed with no particular orders or be performed simultaneously;

step 2, performing structural design for the device: designing a structure of the device after determining the main design parameters and the type of the force application apparatus, comprising: structure designing, manufacturing, assembling, and debugging; wherein the structure designing comprises designing of the base frame, designing of the force application apparatus, designing of the direction adaptation apparatus, and designing of the integral external connection apparatus; and step 3, calculating, testing and evaluating an actual gravitational moment or positive pressure and an effect of weight compensation, determining whether design requirements are met, calculating or testing the evaluated gravitational moment and a reduction ratio thereof, calculating or testing the evaluated weight compensation effect, and stopping, in a case of meeting the design requirements, and taking the obtained design solution as a design result; and in a case of not meeting the requirements, adjusting the parameters, repeating the above steps, and redesigning until it meets the design requirements.

3. The method for reducing the positive pressure of the actuating cylinder of the universal hinged support of claim 1, wherein the method comprises designing main parameters of the universal swing rod apparatus, designing a structure of the universal swing rod apparatus, and adjusting and iterating the parameters and structure of the universal swing rod apparatus; and the universal swing rod apparatus is installed on a foundation or at a bottom of the base frame, and the universal swing rod apparatus or a cylinder barrel of the actuating cylinder of the universal hinged support is connected with an opposite end of the force application apparatus through the integral external connection apparatus, so as to form a closed loop.

4. The method for reducing the positive pressure of the actuating cylinder of the universal hinged support of claim 2, wherein the step 2 of the method further comprises a process of arranging an axis of a first revolute joint of the direction adaptation apparatus to be perpendicular to a horizontal plane and installing the first revolute joint on a foundation, the first revolute joint is a turntable bearing, a fixed plate of the turntable bearing is fixed on the foundation, a pallet is fixed on a movable plate thereof, the pallet is fixedly installed on the turntable bearing, and the turntable bearing serves as a part of the base frame.

5. The method of claim 3, wherein, in the step 2 of the method, the universal swing rod apparatus and the direction adaptation apparatus share one revolute joint, the shared revolute joint is a revolute joint for connecting a universal hinge on a universal swing rod to a foundation, the shared revolute joint is formed by a turntable bearing, an axis of the turntable bearing is perpendicular to a horizontal plane, a fixed plate of the turntable bearing is fixed on the foundation, a pallet is fixed on a movable plate thereof, and the turntable bearing serves as a part of the base frame.

6. The method for reducing the positive pressure of the actuating cylinder of the universal hinged support of claim 3, wherein the ratio of gravitational moment to be eliminated is within a range from 95% to 105%.

7. A device for reducing a positive pressure of an actuating cylinder of a universal hinged support, configured to perform the method for reducing the positive pressure of the actuating cylinder of the universal hinged support of claim 1, wherein the device comprises:

a base frame, a force application apparatus, a direction adaptation apparatus, and an integral external connection apparatus;

the base frame comprises an external connection unit IA, a main frame, and an external connection unit IB, the force application apparatus comprises a force generation apparatus, a force transmission apparatus, an external connection unit IIA, and an external connection unit IIB, wherein a force generated by the force generation apparatus comprises gravity, a metal spring force, an air spring force, or an electromagnetic force;

the direction adaptation apparatus comprises two revolute joints that are not coaxial and not parallel, an external connection unit IIIA, and an external connection unit IIIB, the two revolute joints are fixedly coupled together to achieve rotation with two degrees of freedom; and the integral external connection apparatus comprises an external connection unit VA and an external connection unit VB.

8. The device for reducing the positive pressure of the actuating cylinder of the universal hinged support of claim 7, further comprising a universal swing rod apparatus, wherein the universal swing rod apparatus comprises a universal hinge, a swing connection rod, an external connection unit IVA and an external connection unit IVB, wherein the universal hinge is connected with one swing connection rod; and the universal swing rod apparatus is installed on a foundation or at a bottom of the base frame, and the universal swing rod apparatus or a cylinder barrel of the actuating cylinder of the universal hinged support is connected with an opposite end of the force application apparatus through the integral external connection apparatus, so as to form a closed loop.

9. The device for reducing the positive pressure of the actuating cylinder of the universal hinged support of claim 8, wherein a first revolute joint of the direction adaptation apparatus is installed on the ground, an axis of the first revolute joint is perpendicular to the ground, and the first revolute joint is a turntable bearing.

10. The device for reducing the positive pressure of the actuating cylinder of the universal hinged support of claim 8, wherein the direction adaptation apparatus and a universal swing rod share one revolute joint, this shared revolute joint is a first revolute joint of a connection rod of the universal hinged support, an axis of the revolute joint is perpendicular to the ground, the revolute joint is formed by a turntable bearing, a fixed plate of the turntable bearing is fixed on the foundation, a pallet is fixedly on a movable plate thereof, and the turntable bearing serves as a part of the base frame at the same time, so as to from a base frame with a single rotational degree of freedom.

11. The device for reducing the positive pressure of the actuating cylinder of the universal hinged support of claim 7, wherein the force generation apparatus of the force application apparatus is one tension spring or a set of tension springs, and the force transmission apparatus of the force application apparatus is a universal joint or a combination of universal joints.

12. The device for reducing the positive pressure of the actuating cylinder of the universal hinged support of claim 7, wherein the force transmission apparatus of the force application apparatus is composed of a cable or a cable in cooperation with a pulley or a cable in cooperation with a gearbox, and the force generation apparatus of the force application apparatus is one of the following: one tension spring or a set of tension springs, one torsion spring or a set of torsion springs that generate a pulling force, an air spring equipped with a gearbox, a single pendulum apparatus or a counterweight, an electromagnetic spring, or a torque motor.

13. The device for reducing the positive pressure of the actuating cylinder of the universal hinged support of claim 9, wherein the force generation apparatus of the force application apparatus is one torsion spring or a set of torsion springs that generate torque, the torsion spring is installed on the turntable bearing, an axis of the torsion spring is horizontal and parallel to a horizontal axis of the universal hinge, and a connection rod of the torsion spring is connected with the actuating cylinder of the universal hinged support through a sliding pair.

14. The device for reducing the positive pressure of the actuating cylinder of the universal hinged support of claim 9, wherein a fixed plate of the turntable bearing is fixed on the foundation, a pallet is fixedly on a rotatable plate of the turntable bearing, the turntable bearing forms a part of the base frame, and the other parts of the base frame are installed on the pallet, so as to form a base frame with a single rotational degree of freedom.

15. The device for reducing the positive pressure of the actuating cylinder of the universal hinged support of claim 7, wherein the main frame of the base frame has an apparatus capable of adjusting a height or a width of the main frame or an apparatus capable of adjusting both the height and the width of the main frame, and the main frame is fixed after adjustment to form a rigid frame.

16. The device for reducing the positive pressure of the actuating cylinder of the universal hinged support of claim 7, wherein the swing connection rod in the universal swing rod apparatus comprises a mechanism capable of adjusting a distance from the external connection unit IVB to a center of the universal hinge of the universal swing rod apparatus, and the swing connection rod is fixed after adjustment to form a rigid rod.

17. The device for reducing the positive pressure of the actuating cylinder of the universal hinged support of claim 13, wherein an installation position of the torsion spring is within the following rectangular interval: a coordinate point thereof on an X axis is a point located within a range of 0.05 $R_0$ to $-0.28$ $R_0$, and a coordinate point thereof on a Y axis is a point located within a range of $-0.05$ $R_0$ to 0.28 $R_0$.

18. The device for reducing the positive pressure of the actuating cylinder of the universal hinged support of claim 7, wherein the force application apparatus comprises a tensioning adjustment apparatus, and the tensioning adjustment apparatus is connected in series with the force generation apparatus, the force transmission apparatus and the base frame.

19. The device for reducing the positive pressure of the actuating cylinder of the universal hinged support of claim 7, further comprising a parallel mechanism, wherein the parallel mechanism has at least one UPS branch linkage, a cylinder barrel of a sliding pair of the UPS branch linkage is connected with one end of the force application apparatus, for applying an appropriate anti-gravitational moment to the actuating cylinder so as to form a parallel mechanism system with minimal lateral force.

20. A method for reducing a positive pressure of an actuating cylinder of a universal hinged support, using the device for reducing the positive pressure of the actuating cylinder of the universal hinged support of claim 7, wherein the number of devices for reducing the positive pressure of the actuating cylinder of the universal hinged support that are used ranges from 2 to 6, and a universal swing rod apparatus thereof has a complete UPS branch linkage system;

a motion platform and a foundation platform are installed for the UPS branch linkage system according to a configuration of a parallel mechanism; and the UPS branch linkage system, the motion platform, and the foundation platform together form a parallel mechanism, so as to form a parallel mechanism system with minimal positive pressure.

* * * * *